(12) United States Patent
Tsuru et al.

(10) Patent No.: US 11,983,914 B2
(45) Date of Patent: May 14, 2024

(54) INFORMATION PROCESSING DEVICE AND INFORMATION PROCESSING METHOD FOR POINT CLOUD DATA COMPRESSION

(71) Applicant: SONY GROUP CORPORATION, Tokyo (JP)

(72) Inventors: Takumi Tsuru, Tokyo (JP); Toshiya Hamada, Tokyo (JP); Mitsuhiro Hirabayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 4 days.

(21) Appl. No.: 17/633,286

(22) PCT Filed: Jul. 2, 2020

(86) PCT No.: PCT/JP2020/026046
§ 371 (c)(1),
(2) Date: Feb. 7, 2022

(87) PCT Pub. No.: WO2021/029155
PCT Pub. Date: Feb. 18, 2021

(65) Prior Publication Data
US 2022/0351484 A1 Nov. 3, 2022

(30) Foreign Application Priority Data
Aug. 14, 2019 (JP) .................. 2019-148892

(51) Int. Cl.
*G06V 10/26* (2022.01)
*G06V 20/64* (2022.01)

(52) U.S. Cl.
CPC .............. *G06V 10/26* (2022.01); *G06V 20/64* (2022.01)

(58) Field of Classification Search
USPC ......................................... 382/181, 232–233
See application file for complete search history.

(56) References Cited

U.S. PATENT DOCUMENTS

| 11,200,700 | B2* | 12/2021 | Wang | ........................ G06T 9/00 |
| 11,711,544 | B2* | 7/2023 | Tourapis | .............. H04N 19/467 |
| | | | | 375/240.08 |
| 2019/0087978 | A1* | 3/2019 | Tourapis | ................... G06T 9/00 |

(Continued)

FOREIGN PATENT DOCUMENTS

| AU | 2017387754 A | 7/2019 |
| BR | 112019012886 A2 | 11/2019 |

(Continued)

OTHER PUBLICATIONS

International Search Report and Written Opinion of PCT Application No. PCT/JP2020/026046, dated Aug. 11, 2020, 09 pages of ISRWO.

(Continued)

*Primary Examiner* — Ishrat I Sherali
(74) *Attorney, Agent, or Firm* — CHIP LAW GROUP

(57) ABSTRACT

Provided is a generation unit that generates an identification region map indicating whether or not each divided object data is visible from each position in a three-dimensional space by using information regarding orientation of a normal vector dividing an object in the three-dimensional space and information regarding an outline of the object.

11 Claims, 35 Drawing Sheets

(56) References Cited

U.S. PATENT DOCUMENTS

| | | | |
|---|---|---|---|
| 2019/0268612 A1 | 8/2019 | Fukuyasu et al. | |
| 2019/0347760 A1 | 11/2019 | Takahashi et al. | |
| 2020/0314435 A1* | 10/2020 | Tourapis | G06T 7/74 |
| 2023/0059516 A1* | 2/2023 | Schwarz | H04N 21/816 |

FOREIGN PATENT DOCUMENTS

| | | |
|---|---|---|
| CA | 3041858 A1 | 7/2018 |
| CN | 110115041 A | 8/2019 |
| EP | 3565260 A1 | 11/2019 |
| JP | 2011-233141 A | 11/2011 |
| KR | 10-2019-0100193 A | 8/2019 |
| WO | 2018/025660 A1 | 2/2018 |
| WO | 2018/123646 A1 | 7/2018 |
| WO | 2019/055963 A1 | 3/2019 |

OTHER PUBLICATIONS

"Study Text of ISO/IEC CD 23090 5: Video-based Point Cloud Compression", International Organization for Standardization, w18180, Mar. 2019.

* cited by examiner

- ◎ POINT DATA REPRESENTING OBJECT(PROJECTED ON X-PROJECTION PLANE)
- ● POINT DATA REPRESENTING OBJECT(PROJECTED ON Y+PROJECTION PLANE)
- ◌ SHAPE OF OBJECT
- ← NORMAL VECTOR

FIG.13

```
<MPD>
<Period>
<AdaptationSet id="vpcc0"mimeType="video/mp4">
<SupplementalProperty schemeIdUri="urn:mpeg:mpegI:pc_proj_direction:14div:2019" value="X+" />
 ...
<Representation>
  <BaseURL>vpcc0_1.mp4</BaseURL>
</Representation>
 ...
</ AdaptationSet>
 ...
</Period>
</MPD>
```

- REGION HANDLED AS SWITCHING MARGIN REGION OF FIRST LAYER
- REGION HANDLED AS SWITCHING MARGIN REGION OF SECOND LAYER
- REGION HANDLED AS FULL ACQUISITION REGION
- BOUNDARY LINE OF TWO LAYERS WITH DIFFERENT REDUCTION RATE

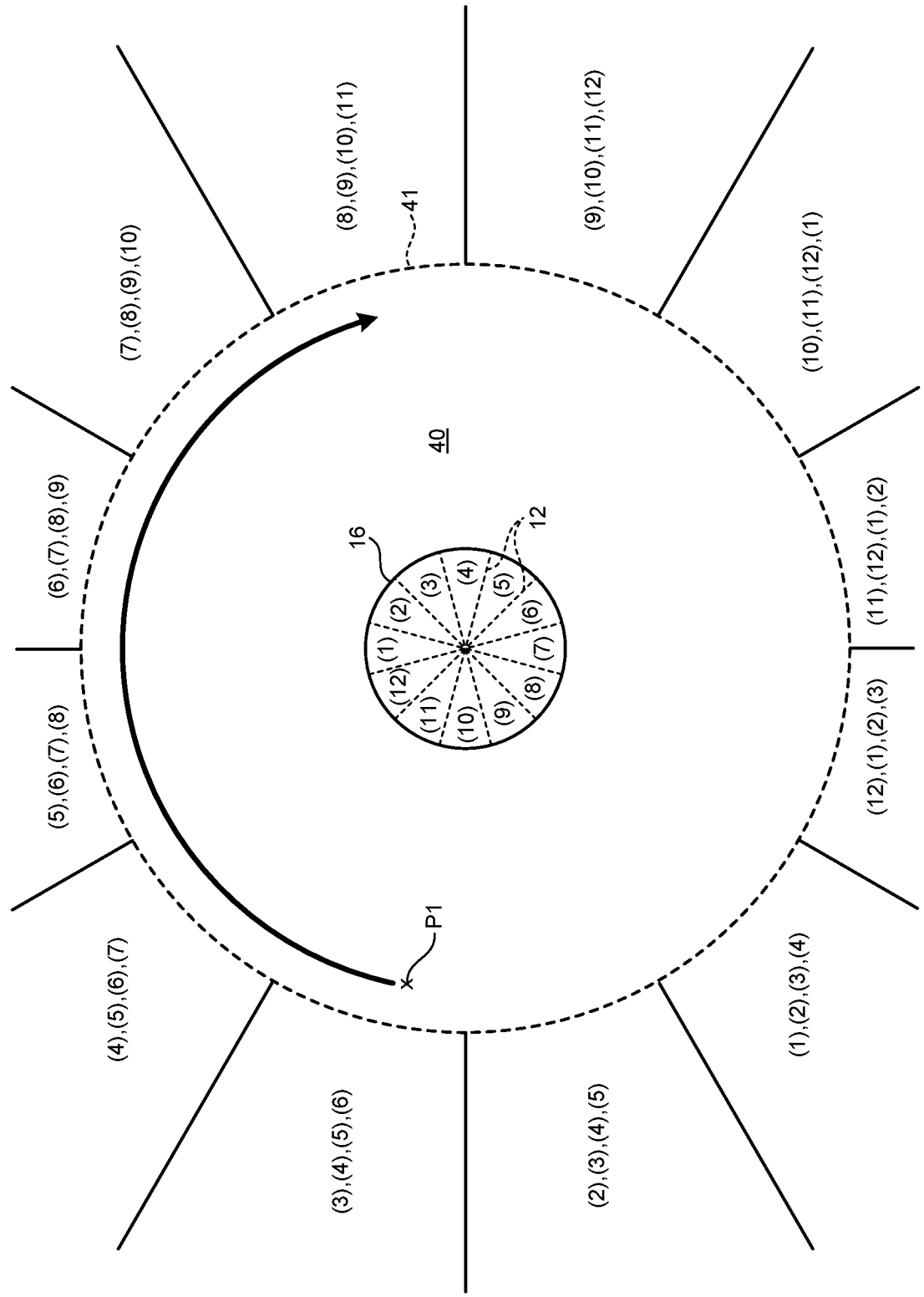

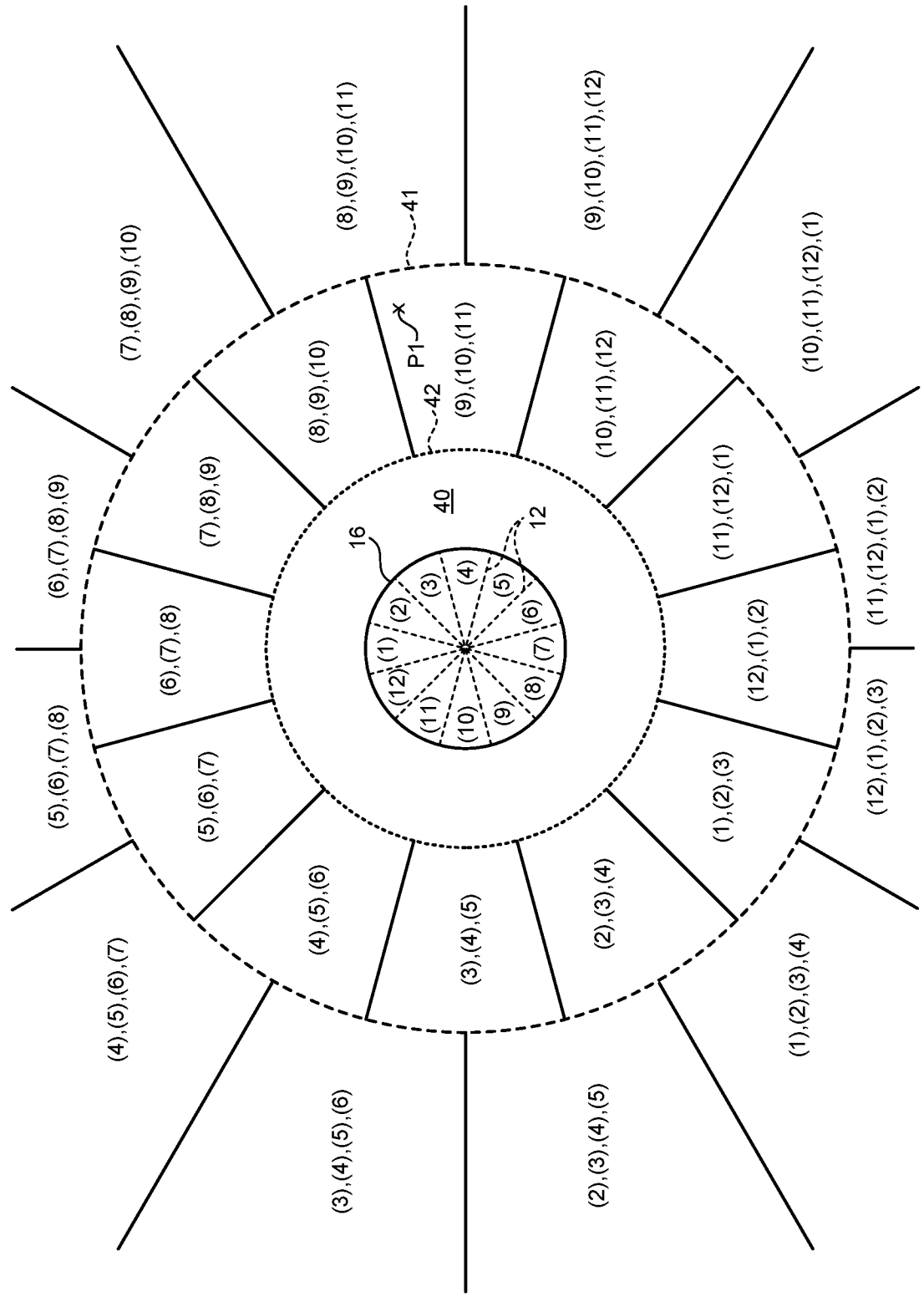

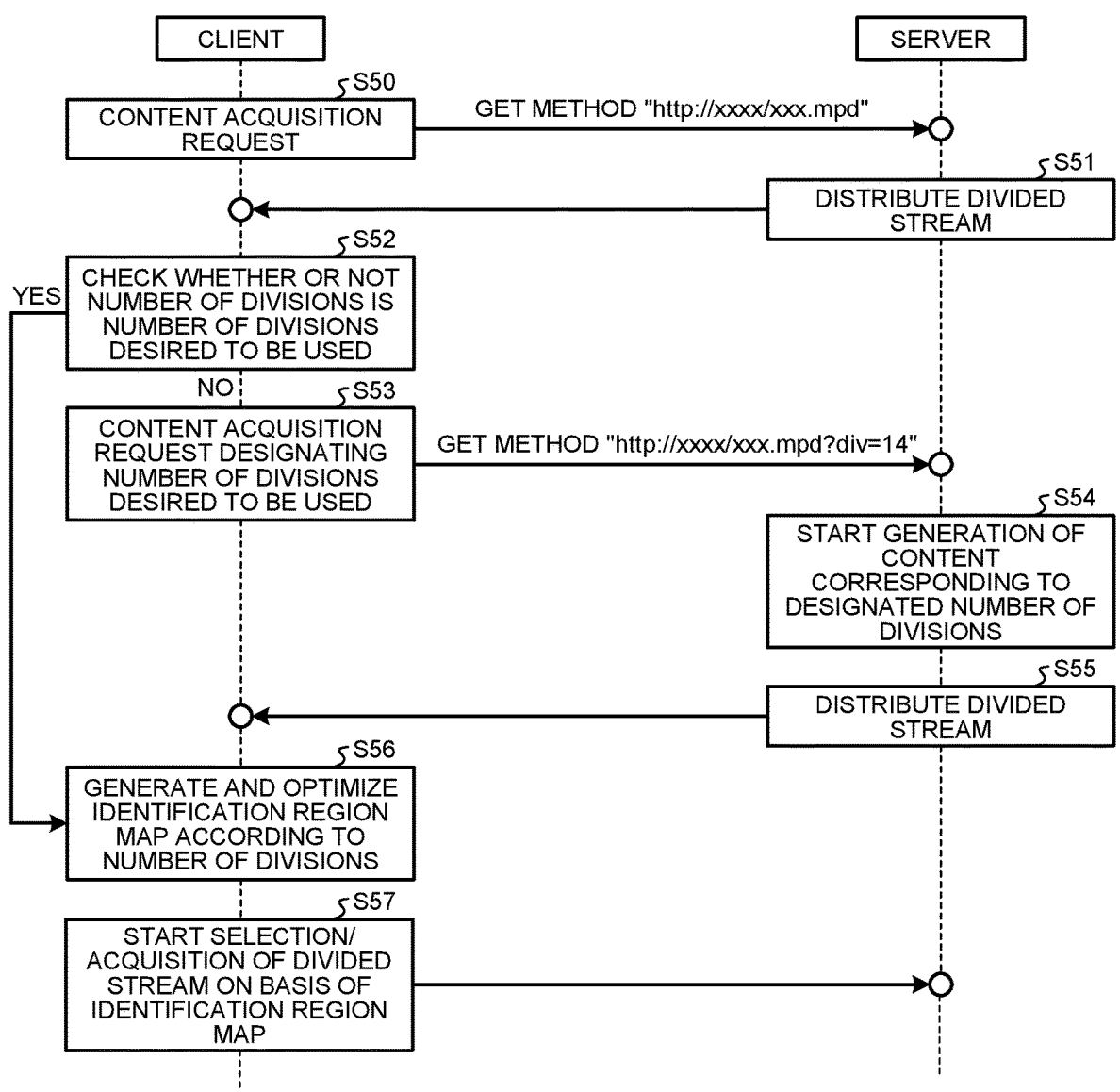

INFORMATION PROCESSING DEVICE AND INFORMATION PROCESSING METHOD FOR POINT CLOUD DATA COMPRESSION

CROSS REFERENCE TO RELATED APPLICATIONS

This application is a U.S. National Phase of International Patent Application No. PCT/JP2020/026046 filed on Jul. 2, 2020, which claims priority benefit of Japanese Patent Application No. JP 2019-148892 filed in the Japan Patent Office on Aug. 14, 2019. Each of the above-referenced applications is hereby incorporated herein by reference in its entirety.

FIELD

The present invention relates to an information processing device, an information processing method, and an information processing program.

BACKGROUND

In Moving Picture Experts Group (MPEG)-I Part 5, a technology of compressing point cloud data, which is a set of points simultaneously having position information and attribute information (for example, color information or reflectance information) in a three-dimensional space, has been studied. Non Patent Literature 1 proposes video-based point cloud compression (V-PCC) as one of compression methods for point cloud data. The V-PCC is under standardization in MPEG-I Part 5.

CITATION LIST

Non Patent Literature

Non Patent Literature 1: w18180 Study Text of ISO/IEC CD 23090 5: Video-based Point Cloud Compression.

SUMMARY

Technical Problem

In the V-PCC as the compression method, an object in a three-dimensional space is projected on a plurality of projection planes in a divided manner, and pieces of data of all the projection planes are compressed into one stream. In a V-PCC distribution technology, since one stream obtained by uniformly compressing the pieces of data of all the projection planes is distributed, definition in all directions is equal. Therefore, in the V-PCC distribution technology, when high-definition display is to be performed, it is necessary to acquire the entire object including a portion that is invisible (not viewed) to the user with high definition, which results in an unnecessary increase in bit rate and deterioration in utilization efficiency of a network band.

Therefore, a viewing direction adaptive distribution technology as described below has been discussed. In the viewing direction adaptive distribution technology, the stream of the V-PCC is divided into divided streams for each projection plane by performing compression for each projection plane, and projection direction information is signaled to the divided streams and then distribution is performed. A client specifies a divided stream corresponding to a direction invisible from a viewing position of the user from among the distributed divided streams on the basis of the signal information of each distributed divided stream. The client does not acquire the divided stream corresponding to the invisible direction, or selects/acquires a low-definition (low-rate) divided stream, and selects/acquires a high-definition (high-rate) divided stream corresponding to another direction that may be visible. As a result, the network band can be effectively used without affecting a viewing video.

In the viewing direction adaptive distribution technology, the network band is reduced without affecting the viewing video by reducing the definition of the invisible portion. Therefore, in the viewing direction adaptive distribution technology, it is a point to identify the divided stream corresponding to the direction invisible from the viewing position on the client side.

Therefore, the present disclosure proposes an information processing device, an information processing method, and an information processing program capable of identifying a divided stream corresponding to a direction invisible from a viewing position.

Solution to Problem

An information processing device according to an embodiment of the present disclosure includes a generation unit that generates an identification region map indicating whether or not each divided object data is visible from each position in a three-dimensional space by using information regarding orientation of a normal vector dividing an object in the three-dimensional space and information regarding an outline of the object.

BRIEF DESCRIPTION OF DRAWINGS

FIG. 13 is a diagram illustrating an example of syntax in a case of 14-plane division.

FIG. 29B is a diagram for describing dynamic switching of the identification region map.

FIG. 29C is a diagram for describing dynamic switching of the identification region map.

FIG. 33 is a sequence diagram for describing a change of the number of divisions according to a fifth embodiment.

DESCRIPTION OF EMBODIMENTS

Hereinafter, embodiments of the present disclosure will be described in detail with reference to the drawings. Note that, in each of the following embodiments, the same reference signs denote the same portions, and an overlapping description will be omitted.

Further, the present disclosure will be described in the following order.

Figure 1:
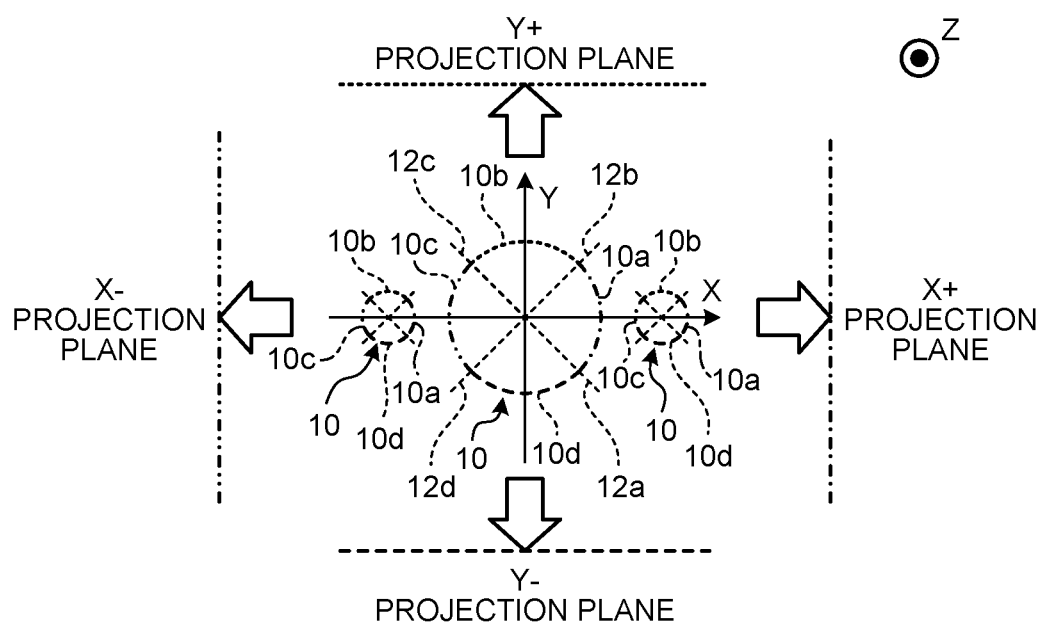
FIG. 1 is a diagram for describing projection of a point cloud.

1. First Embodiment
1-1. Compression Method of Viewing Direction Adaptive Distribution Technology
1-2. Identification Region Map According to First Embodiment
1-3. Generation of Identification Region Map
1-4. Identification Region Map of Ten Planes
1-5. Identification Region Map of 10-Plane Division
1-6. Identification Region Map of 14-Plane Division
1-7. Example of Signaling for Number of Divisions
1-8. Example of Configuration of Data Reproduction Device
1-9. Flow of Reproduction Processing
1-10. Effects of First Embodiment
2. Second Embodiment
2-1. Identification Region Map According to Second Embodiment
2-2. Another Example of Identification Region Map According to Second Embodiment
2-3. Example of Configuration of Data Reproduction Device
2-4. Flow of Reproduction Processing
2-5. Effects of Second Embodiment
3. Third Embodiment
3-1. Characteristics of Identification Region Map
3-2. Dynamic Switching of Identification Region Map
3-3. Example of Configuration of Data Reproduction Device
3-4. Flow of Reproduction Processing
3-5. Effects of Third Embodiment
4. Fourth Embodiment
4-1. Example of Configuration of Data Reproduction Device
4-2. Flow of Reproduction Processing
4-3. Effects of Fourth Embodiment
5. Fifth Embodiment
5-1. Change Sequence of Number of Divisions
5-2. Effects of Fifth Embodiment 1. First Embodiment 1-1. Compression Method of Viewing Direction Adaptive Distribution Technology First, a compression method of a viewing direction adaptive distribution technology will be described. In video-based point cloud compression (V-PCC) using the viewing direction adaptive distribution technology, on a server side that provides a content, an object in a three-dimensional space is projected on a plurality of projection planes, and compression is performed for each projection plane to distribute a divided stream for each projection plane. A file of the divided stream corresponds to divided object data of the present disclosure. For example, a normal vector is calculated for each point data of a point cloud which is the object in the three-dimensional space. Then, each point is classified into six classes, X+, X−, Y+, Y−, Z+, and Z−, depending on a positive or negative direction of three-dimensional X/Y/Z axes in which the normal vector of each point is strongly oriented. Then, each point is projected in parallel to six projection planes, X+, X−, Y+, Y−, Z+, and Z−, in the classified direction to be converted into projection plane data of a two-dimensional (2D) image. Then, the projection plane data is compressed for each projection plane by using a video compression codec such as advanced video coding (AVC) or high efficiency video coding (HEVC). FIG. 1 is a diagram for describing projection of the point cloud. FIG. 1 illustrates a two-dimensional XY plan view obtained by cutting the three-dimensional space at a specific position in a Z-axis direction. In FIG. 1, an object 10 as the point cloud is illustrated near the center. In addition, FIG. 1 illustrates division boundary vectors 12a to 12d serving as references on which projection plane among the projection planes, X+, X−, Y+, and Y−, a region of a surface of the object 10 is to be projected. The division boundary vectors 12a to 12d are boundaries for indicating which projection plane among the projection planes, X+, X−, Y+, and Y−, the region of the surface of the object 10 is to be projected. Each point of a portion 10a between the division boundary vector 12a and the division boundary vector 12b of the object 10 is projected on the X+ projection plane because the normal vector is strongly oriented in an X+ direction. Each point of a portion 10b between the division boundary vector 12b and the division boundary vector 12c of the object 10 is projected on the Y+ projection plane because the normal vector is strongly oriented in a Y+ direction. Each point of a portion 10c between the division boundary vector 12c and the division boundary vector 12d of the object 10 is projected on the X-projection plane because the normal vector is strongly oriented in an X− direction. Each point of a portion 10d between the division boundary vector 12d and the division boundary vector 12a of the object 10 is projected on the Y− projection plane because the normal vector is strongly oriented in a Y-direction. The division boundary vectors 12a including the division boundary vectors 12 to 12d correspond to boundary vectors of the present disclosure.

Figure 2:
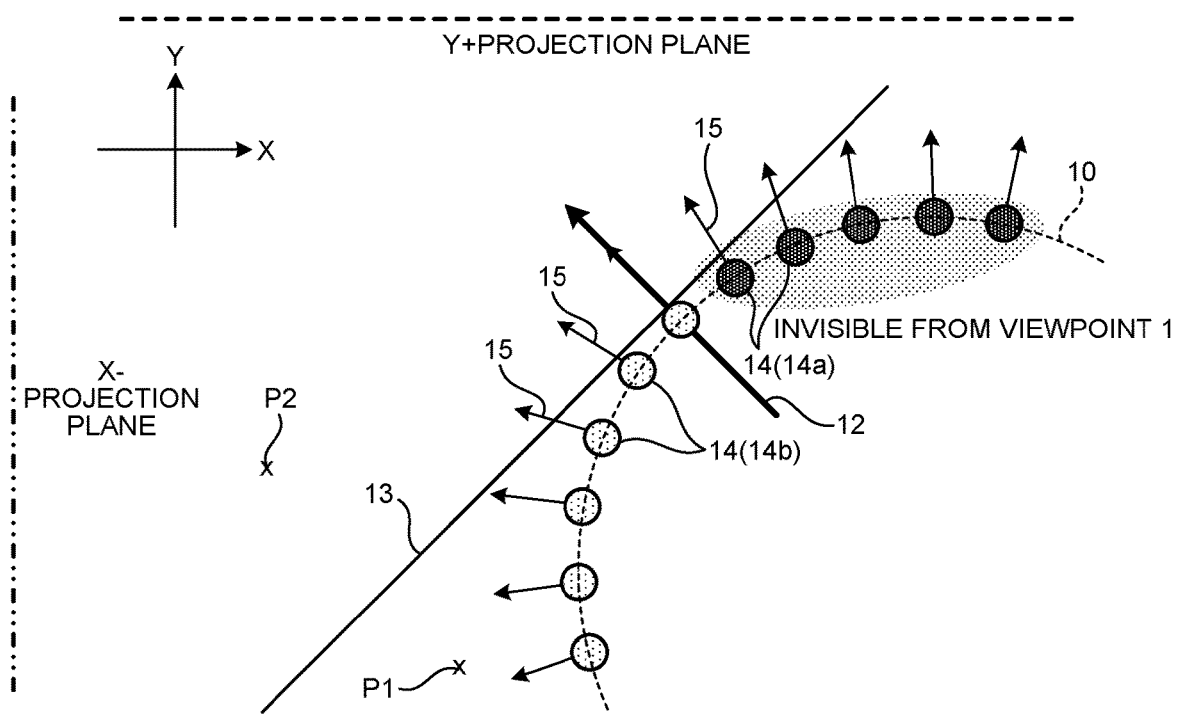
FIG. 2 is a diagram for describing an invisible direction.

In the V-PCC as a compression method, each point data of the point cloud is projected in a direction in which the normal vector is strongly oriented. In the present disclosure, the divided stream corresponding to an invisible direction is identified by using "a rule of a relationship of visibility according to a normal vector direction and a viewing position" as described below. Hereinafter, "the rule of a relationship of visibility according to a normal vector direction and a viewing position" is also referred to as "a rule of a relationship of visibility". FIG. 2 is a diagram for describing the invisible direction. FIG. 2 illustrates a two-dimensional XY plan view obtained by cutting the three-dimensional space at a specific position in the Z-axis direction in order to simplify the description. Furthermore, FIG. 2 illustrates a plurality of pieces of circular point data 14 representing the object 10 as the spherical point cloud. In FIG. 2, a normal vector 15 of each point data 14 is indicated by an arrow. Further, FIG. 2 illustrates the division boundary vector 12 which is a boundary between the Y+ direction and the X− direction. The point data 14 has a different pattern depending on whether the point data is projected on the Y+ projection plane or the X− projection plane. Among the pieces of point data 14, point data 14a is projected on the Y+ projection plane because the normal vector 15 is oriented in the Y+ direction with respect to the division boundary vector 12. Among the pieces of point data 14, point data 14b is projected on the X− projection plane because the normal vector 15 is oriented in the X− direction with respect to the division boundary vector 12.

Here, there is a rule that the point data 14 facing the opposite side with the division boundary vector 12 as a boundary is invisible unless the viewing position is located beyond a tangent 13 of the object 10 orthogonal to the division boundary vector 12. This rule is the rule of a relationship of visibility according to a normal vector direction and a viewing position. For example, the point data 14a on the opposite side of the tangent 13 is invisible from a position P1 that is not located beyond the tangent 13. On the other hand, the point data 14a is visible at a position P2 beyond the tangent 13.

However, in order to use the rule of a relationship of visibility, it is necessary to specify the tangent 13 of the object 10. However, detailed shape information of the object 10 cannot be known without decoding the object data. In addition, even in a case where the detailed shape information of the object 10 can be specified, for example, curves exist at every position in the object 10 having a complicated shape such as a human, and it is troublesome to specify the tangent 13 of the object 10 orthogonal to the division boundary vector 12 for each curve.

Figure 3:
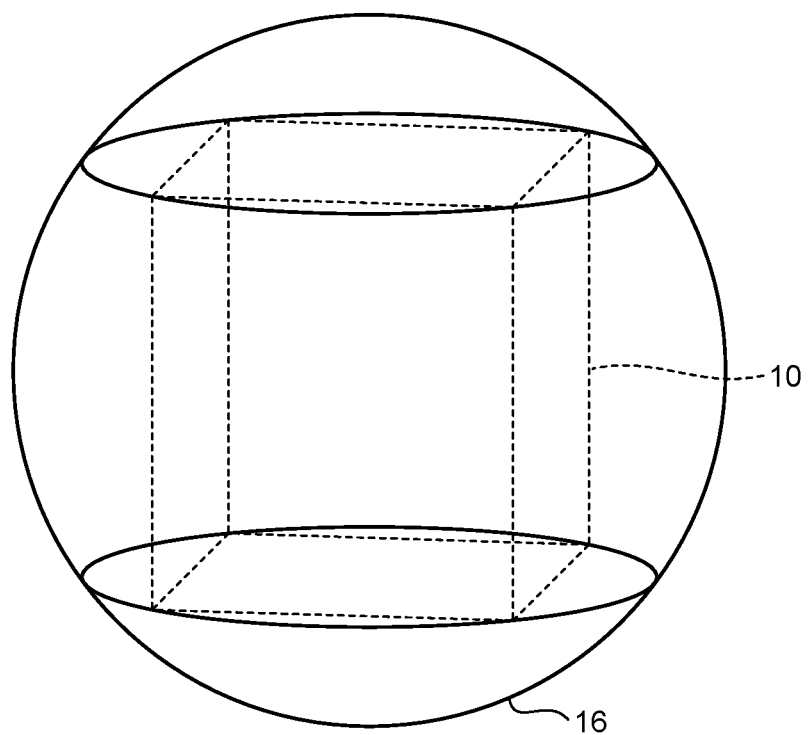
FIG. 3 is a view illustrating an example of a sphere containing an object.

Therefore, in the present disclosure, a direction invisible from the viewing position is identified using a sphere containing the object 10. FIG. 3 is a view illustrating an example of the sphere containing the object 10. A circumscribed sphere 16 of the object 10 is illustrated as the sphere containing the object 10. The circumscribed sphere 16 of the object 10 is a sphere having a size necessary to surround the object 10, and circumscribed sphere information includes information regarding a center point of the circumscribed sphere 16 (for example, coordinates (x,y,z)) and information regarding a radius of the circumscribed sphere 16. Note that although the sphere containing the object 10 is the minimum-sized circumscribed sphere 16 surrounding the object 10 in FIG. 3, the present disclosure is not limited thereto, and there may be some space between the object 10 and the sphere.

By using the tangent of the circumscribed sphere 16 of the object 10 to identify the direction invisible from the viewing position, a client can adapt the law of a relationship of visibility for all pieces of point data 14 of the object 10 in the circumscribed sphere 16. The client creates an identification boundary map for identifying the divided stream corresponding to the direction invisible from the viewing position by using the tangent of the circumscribed sphere 16 as a boundary line. Then, the client specifies the divided stream corresponding to the invisible direction according to a region of the identification boundary map in which the viewing position is located by using the identification boundary map.

1-2. Identification Region Map According to First Embodiment

Figure 4A:
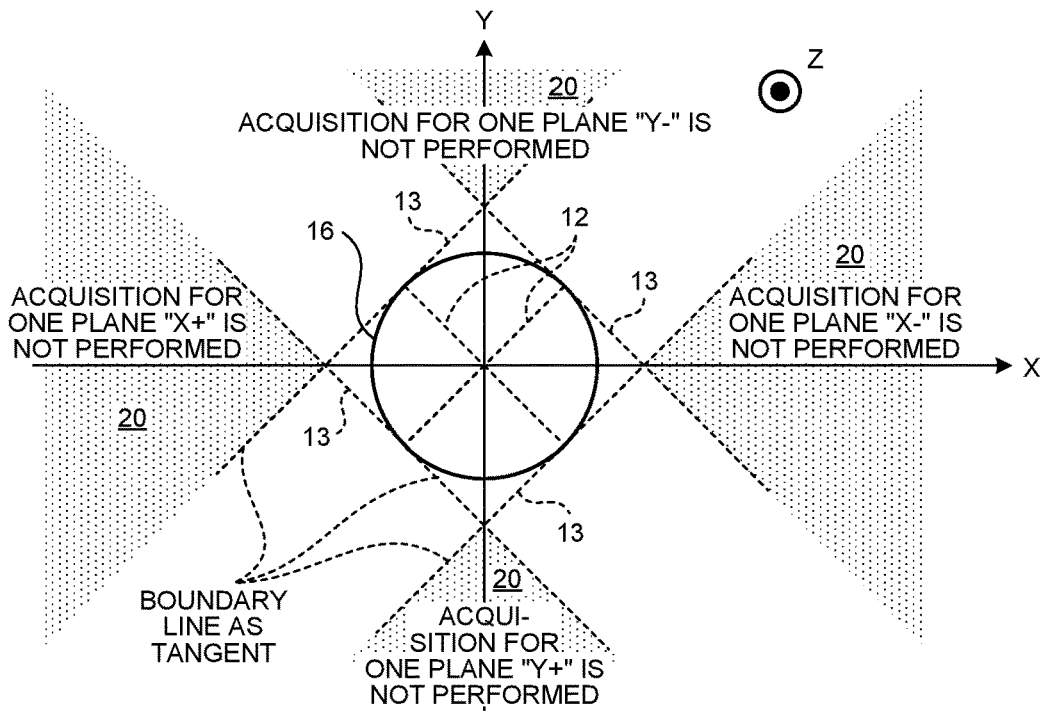
FIG. 4A is a diagram illustrating an example of an identification region map in a case of 6-plane division.
Figure 4B:
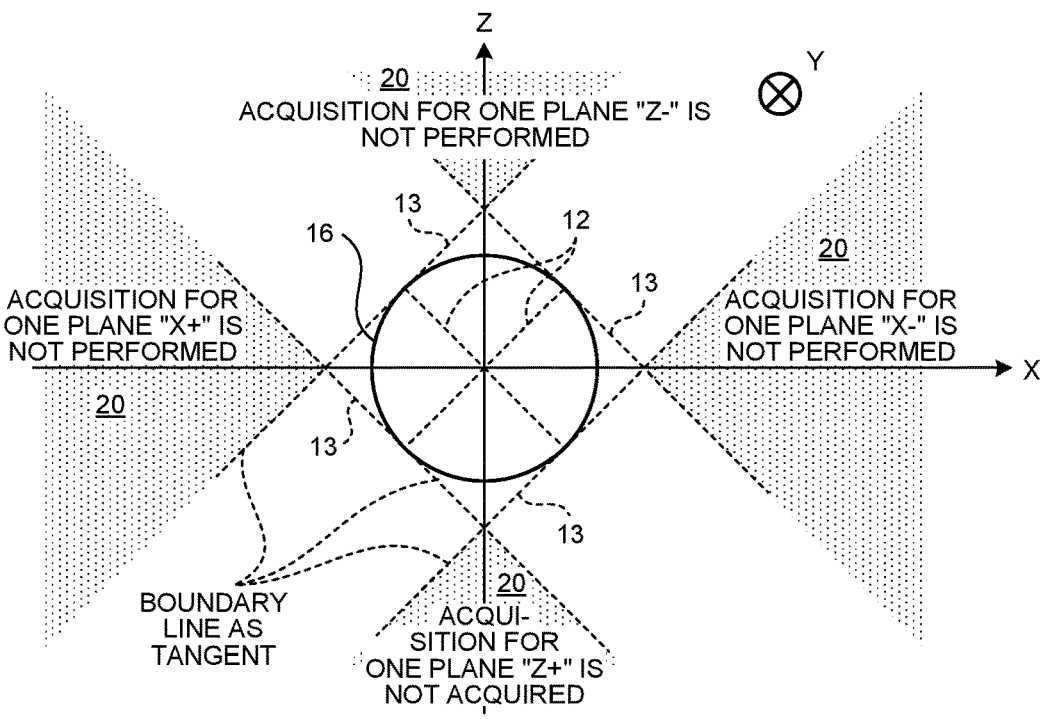
FIG. 4B is a diagram illustrating an example of the identification region map in a case of 6-plane division.
Figure 4C:
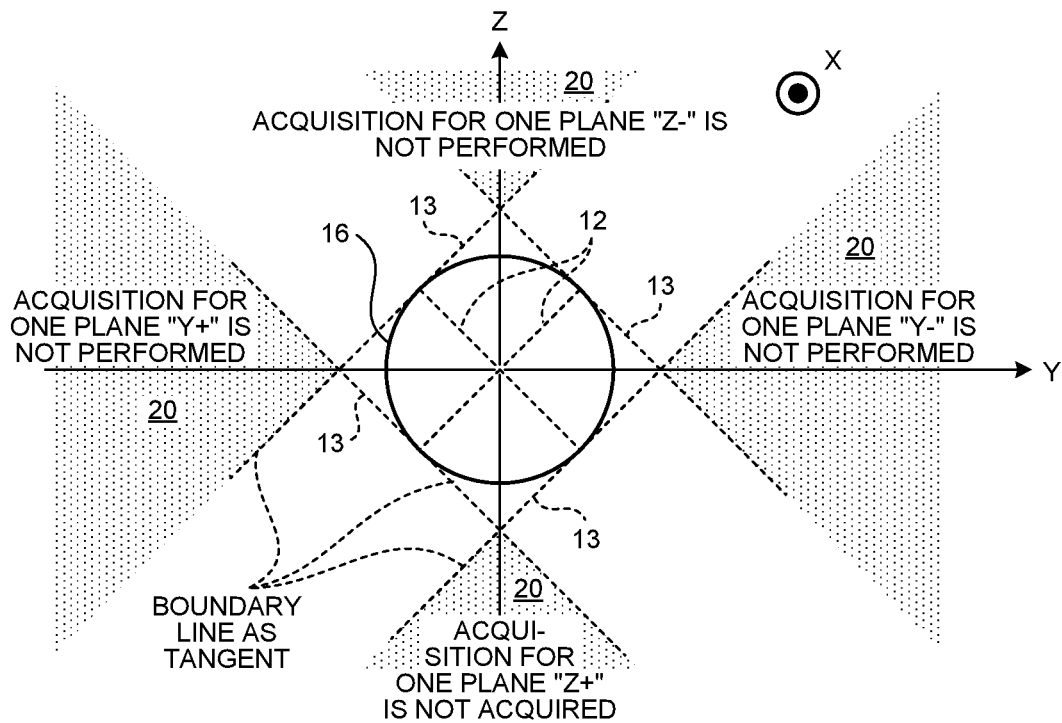
FIG. 4C is a diagram illustrating an example of the identification region map in a case of 6-plane division.

Next, an identification region map according to the first embodiment will be described. First, the identification region map in a case of 6-plane division in which respective pieces of point data of the point cloud are divided for six projection planes, X+, X−, Y+, Y−, Z+, and Z−, will be described. FIGS. 4A, 4B and 4C are diagrams each illustrating an example of the identification region map in a case of 6-plane division. FIG. 4A illustrates the identification region map on an XY plane where a Z axis of the three-dimensional space is 0. FIG. 4B illustrates the identification region map on an XZ plane where a Y axis of the three-dimensional space is 0. FIG. 4C illustrates the identification region map on a YZ plane where an X axis of the three-dimensional space is 0.

The client generates the identification boundary maps illustrated in FIGS. 4A 4B and 4C on the basis of the circumscribed sphere information of the object 10 and the above-described rule of a relationship of visibility, and specifies the divided stream corresponding to the invisible direction according to a region of the identification boundary map in which the viewing position is located.

In a case of 6-plane division, when the viewing position is located in a region 20 indicated by a dot pattern of the identification region maps illustrated in FIGS. 4A 4B and 4C, it can be determined from the above-described rule of a relationship of visibility that the divided stream projected on the plane on the opposite side from the region 20 is invisible. The client does not acquire the divided stream corresponding to the invisible direction, or selects to acquire the divided stream with low definition. Furthermore, in a case where the viewing position is located in a region other than the region 20, there is no stream that can be determined to be invisible, and thus the client acquires the entire streams with high definition.

1-3. Generation of Identification Region Map

Figure 5:
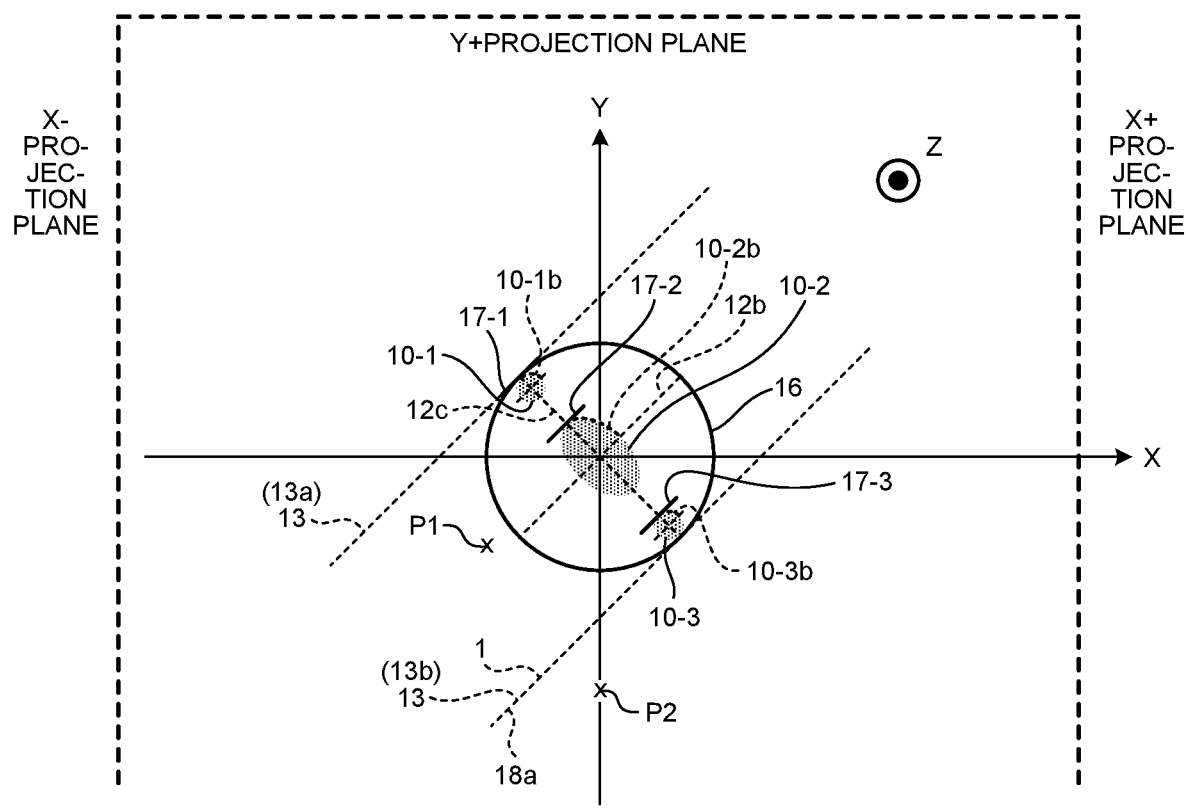
FIG. 5 is a diagram for describing generation of the identification region map.

A method of generating such an identification region map will be described below. FIG. 5 is a diagram for describing generation of the identification region map. FIG. 5 illustrates a case where the viewing position is on the X− side. FIG. 5 illustrates the circumscribed sphere 16. It is assumed that there are three objects 10-1 to 10-3 in the circumscribed sphere 16. For example, the object 10-2 is a torso of a person. The objects 10-1 and 10-3 are arms of the person. FIG. 5 illustrates real tangents 17-1 to 17-3 of the objects 10-1 to 10-3 orthogonal to the division boundary vector 12c as a boundary for projection on the X− projection plane and projection on the Y+ projection plane.

In a case where the objects 10-1 to 10-3 are at the positions illustrated in FIG. 5, a position P1 is located on the opposite side of the real tangents 17-1 and 17-2 from the Y+ projection plane, and is not located beyond the real tangents 17-1 and 17-2. Therefore, pieces of point data 10-1$b$ and 10-2$b$ of the objects 10-1 and 10-2 projected on the Y+ projection plane are invisible from the position P1 due to the above-described rule of a relationship of visibility. However, the position P1 is located more adjacent to the Y+ projection plane side than the real tangent 17-3 is, and is located beyond the real tangent 17-3. Therefore, the position P1 is visible from point data 10-3$b$ of the object 10-3 projected on the Y+ projection plane. That is, there is a certain position P1 visible from the point data 10-3$b$ projected on the Y+ projection plane. In this case, a Y+ projection stream needs to be acquired with high definition. In FIG. 5, in a case where the viewing position is not located beyond the real tangent 17-3, it can be determined that the point data 10-3$b$ of the object 10-3 is invisible. In actual implementation, a position and a shape of the object 10 in the circumscribed sphere 16 are not known. As illustrated in FIG. 5, the boundary line by which it can be determined that all pieces of data projected on the Y+ projection plane are invisible is not a tangent 13$a$ on the Y+ projection plane side with respect to the circumscribed sphere 16 as described with the original rule described above, but a tangent 13$b$ on the opposite side of the circumscribed sphere 16 from the Y+ projection plane. On the opposite side of the circumscribed sphere 16 from the Y+ projection plane, the tangent 13$b$ of the circumscribed sphere 16 orthogonal to the X− side division boundary vector 12$c$ for indicating whether or not data is projected on the Y+ projection plane is a visibility boundary line 18$a$ for indicating whether or not data projected on the Y+ projection plane is visible. In a case where the viewing position is a position not located beyond the boundary line 18$a$ toward the Y+ projection plane, such as a position P2, it can be determined that all pieces of data projected on the Y+ projection plane are invisible.

Figure 6:
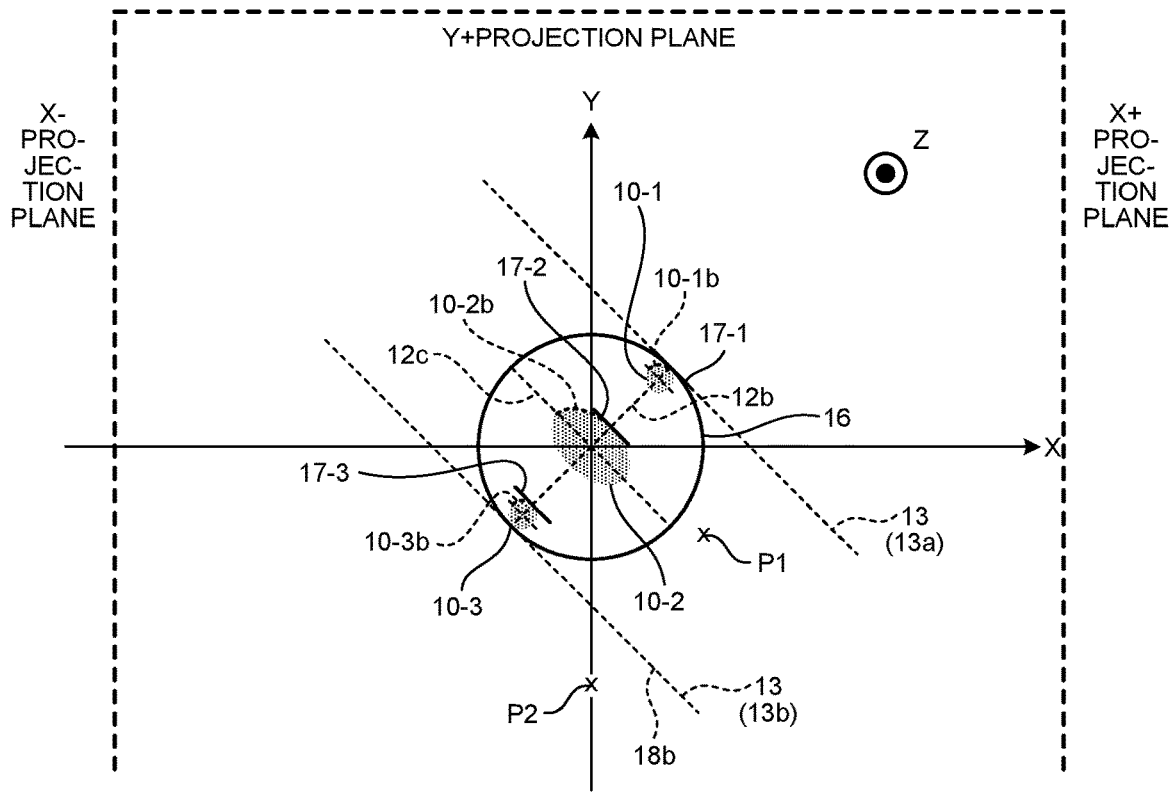
FIG. 6 is a diagram for describing generation of the identification region map.

FIG. 6 is a diagram for describing generation of the identification region map. FIG. 6 illustrates a case where the viewing position is on the X+ side. FIG. 6 also illustrates the circumscribed sphere 16. It is assumed that there are three objects 10-1 to 10-3 in the circumscribed sphere 16. FIG. 6 illustrates real tangents 17-1 to 17-3 of the objects 10-1 to 10-3 orthogonal to the division boundary vector 12$b$ as a boundary for projection on the X+ projection plane and projection on the Y+ projection plane. Similarly, in a case where the viewing position is on the X+ side, a position P1 is located on the opposite side of the real tangents 17-1 and 17-2 from the Y+ projection plane, and is not located beyond the real tangents 17-1 and 17-2. Therefore, the pieces of point data 10-1$b$ and 10-2$b$ of the objects 10-1 and 10-2 projected on the Y+ projection plane are invisible from the position P1. However, the position P1 is located more adjacent to the Y+ projection plane side than the real tangent 17-3 is, and is located beyond the real tangent 17-3. Therefore, point data 10-3$b$ of the object 10-3 projected on the Y+ projection plane is visible from the position P1. That is, there is a certain position P1 visible from the point data 10-3$b$ projected on the Y+ projection plane. In this case, the stream of the Y+ projection plane needs to be acquired with high definition. As illustrated in FIG. 6, the boundary line by which it can be determined that all pieces of data projected on the Y+ projection plane are invisible is not a tangent 13$a$ on the Y+ projection plane side with respect to the circumscribed sphere 16, but a tangent 13$b$ on the opposite side of the circumscribed sphere 16 from the Y+ projection plane. On the opposite side of the circumscribed sphere 16 from the Y+ projection plane, the tangent 13$b$ of the circumscribed sphere 16 orthogonal to the X+ side division boundary vector 12$b$ for indicating whether or not data is projected on the Y+ projection plane is a visibility boundary line 18$b$ for indicating whether or not data projected on the Y+ projection plane is visible. In a case where the viewing position is a position not located beyond the boundary line 18$b$ toward the Y+ projection plane, such as a position P2, it can be determined that all pieces of data projected on the Y+ projection plane are invisible.

Figure 7:
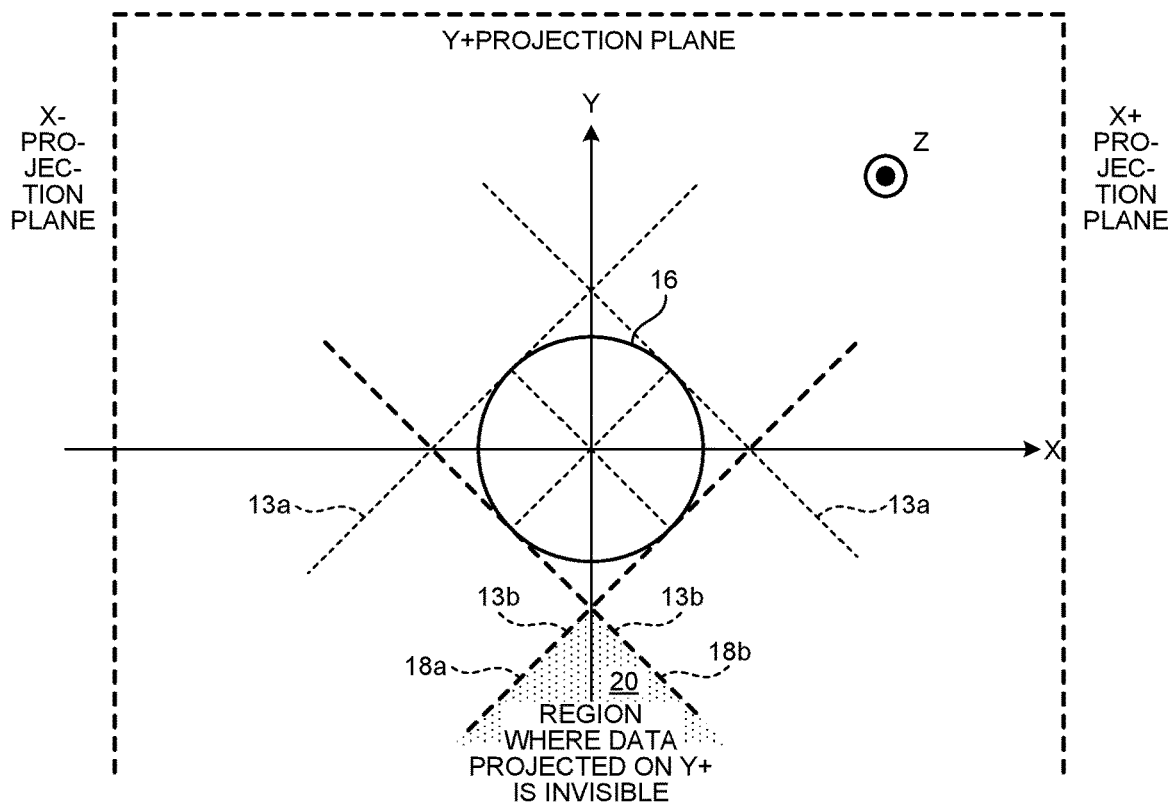
FIG. 7 is a diagram for describing generation of the identification region map.

FIG. 7 is a diagram for describing generation of the identification region map. FIG. 7 illustrates the boundary lines 18$a$ and 18$b$ of FIGS. 5 and 6. It can be determined that the point data projected on the Y+ projection plane is invisible from the region 20 on the opposite side of the two boundary lines 18$a$ and 18$b$ from the Y+ projection plane. For the region 20, the divided stream of the Y+ projection plane is the divided stream corresponding to the invisible direction.

The region 20 is a two-dimensional region surrounded by the two boundary lines 18 when being displayed in two dimensions. However, since the region 20 is a three-dimensional space, the region is a three-dimensional region. For example, as illustrated in FIGS. 5 and 6, on the XY plane, boundaries of the region 20 are two tangential planes of the circumscribed sphere 16 orthogonal to the division boundary vectors 12b and 12c, on the opposite side of the circumscribed sphere 16 from the Y+ projection plane. Similarly, on the YZ plane, boundaries of the region 20 are two tangential planes of the circumscribed sphere 16 orthogonal to the division boundary vector 12, on the opposite side of the circumscribed sphere 16 from the Y+ projection plane. The region 20 is a three-dimensional region surrounded by such four tangential planes. In a case where the viewing position is in the region 20 where the data projected on the Y+ projection plane is invisible, the client does not acquire the stream of the Y+ projection plane or acquires the stream with low definition.

In this manner, the identification region map can be generated by using the circumscribed sphere information of the object 10 and the above-described rule of a relationship of visibility. For example, in a case of 6-plane division (X+, X−, Y+, Y−, Z+, and Z−), the identification region map is a three-dimensional map obtained by combining the three plan views illustrated in FIGS. 4A 4B and 4C. The identification region map is a map obtained by dividing a region into six regions 20 in which the divided stream of the projection plane on the opposite side of the circumscribed sphere 16 does not have to be acquired and other regions in which the entire streams are obtained with high definition.

The client can identify the divided stream corresponding to the invisible direction by specifying a region of the identification region map in which the viewing position is located by using the identification region map. The client does not acquire the invisible divided stream or acquire the invisible divided stream with low definition, thereby making it possible to reduce the amount of information without affecting the viewing video.

1-4. Identification Region Map of Ten Planes

Due to characteristics of the division method that division is made in the normal vector direction in the V-PCC, the 6-plane division has poor information amount reduction efficiency, and the number of planes on which data that does not have to be acquired is projected among six planes is only one at the maximum, and there is also a region where the amount of information is not reduced when pieces of data of all the six planes are acquired with high definition. In order to increase a reduction rate, it is necessary to increase the number of divisions.

Figure 8:
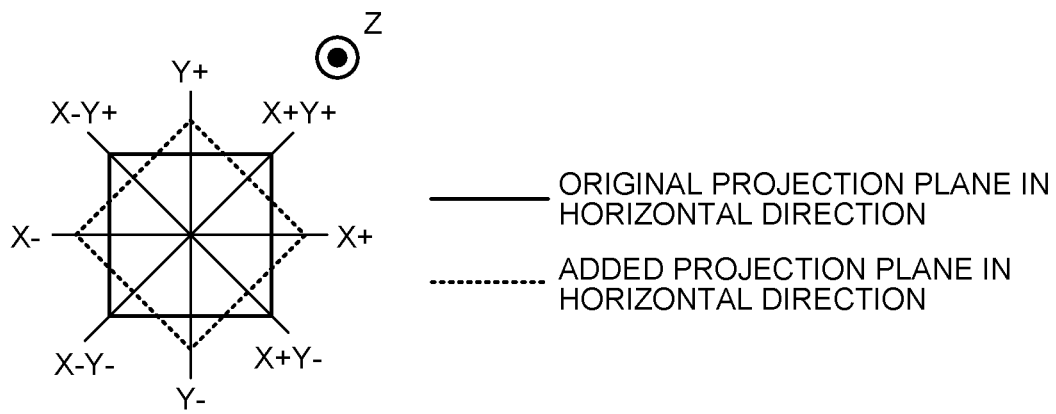
FIG. 8 is a diagram illustrating eight planes in a horizontal direction.

The projection planes for the V-PCC stream are six planes, X+, X−, Y+, Y−, Z+, and Z−. In MPEG-I Part 5, a plan to add four planes, X+Y+, X+Y−, X−Y+, and X−Y−, shifted by 45° in the horizontal direction to the six planes to make ten planes (eight planes in the horizontal direction and two planes in a vertical direction) in the field of standardization activity has been studied. FIG. 8 is a diagram illustrating eight planes in the horizontal direction. The content of this plan is to add four planes, X+Y+, X+Y−, X−Y+, and X−Y−, independently of X+, X−, Y+, and Y−, which are horizontal planes of 6-plane division.

In a case where the viewing direction adaptive distribution is used for distribution of the V-PCC streams of ten planes obtained by adding four planes, the following two divided stream groups [1] and [2] are selectively used according to the viewing position.

[1] A file of the divided stream in the viewing direction is selected from the divided streams of the six planes, X+, X−, Y+, Y−, Z+, and Z−.

[2] A file of the divided stream in the viewing direction is selected from the divided streams of the six planes, X+Y+, X+Y−, X−Y+, X−Y−, Z+, and Z−.

Figure 9A:
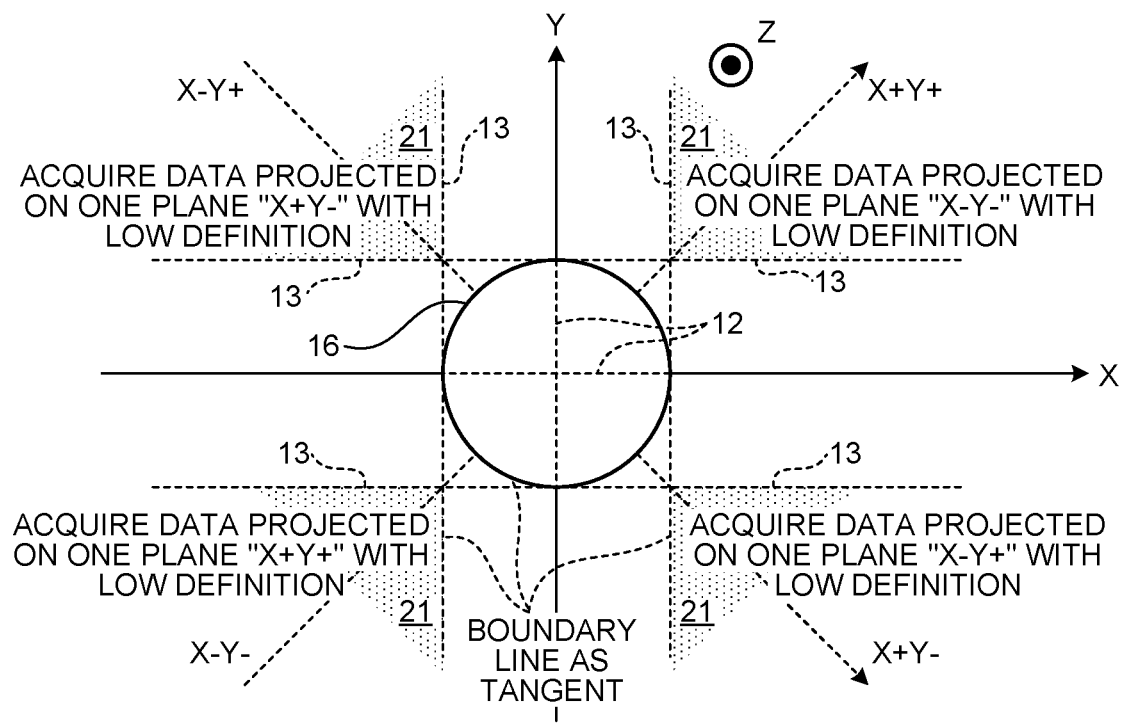
FIG. 9A is a diagram illustrating an example of the identification region map in a case where respective pieces of point data of the point cloud are divided for six projection planes, X+Y+, X+Y−, X−Y+, X−Y−, Z+, and Z−.
Figure 9B:
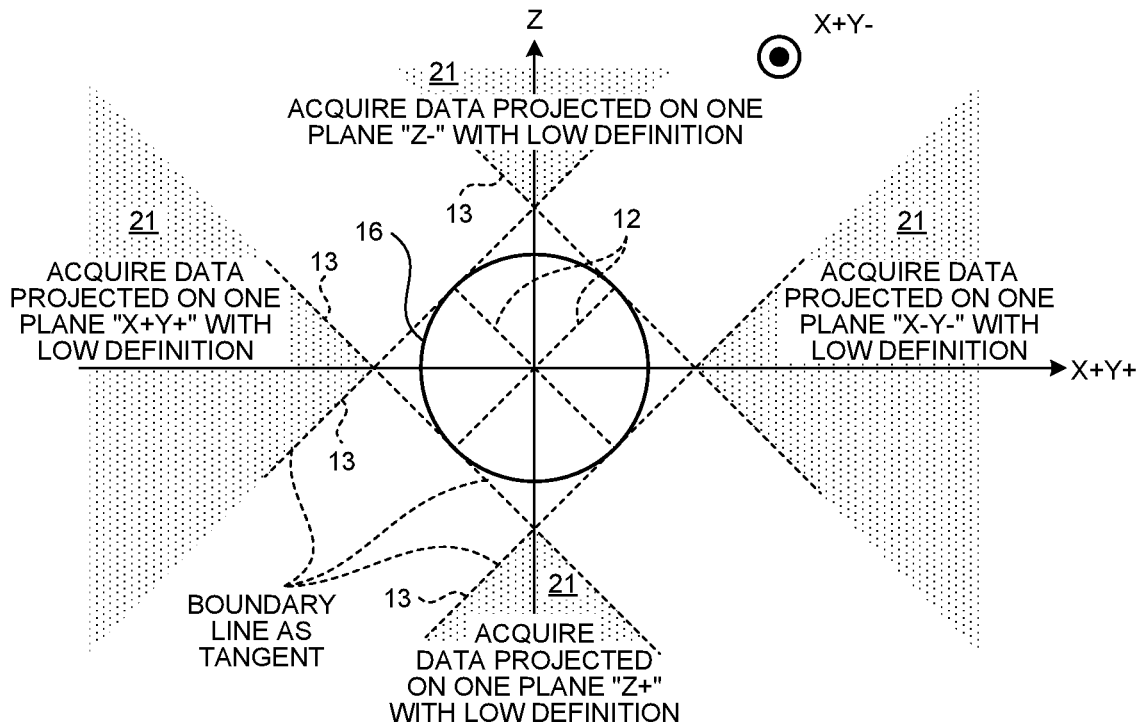
FIG. 9B is a diagram illustrating an example of the identification region map in a case where respective pieces of point data of the point cloud are divided for six projection planes, X+Y+, X+Y−, X−Y+, X−Y−, Z+, and Z−.
Figure 9C:
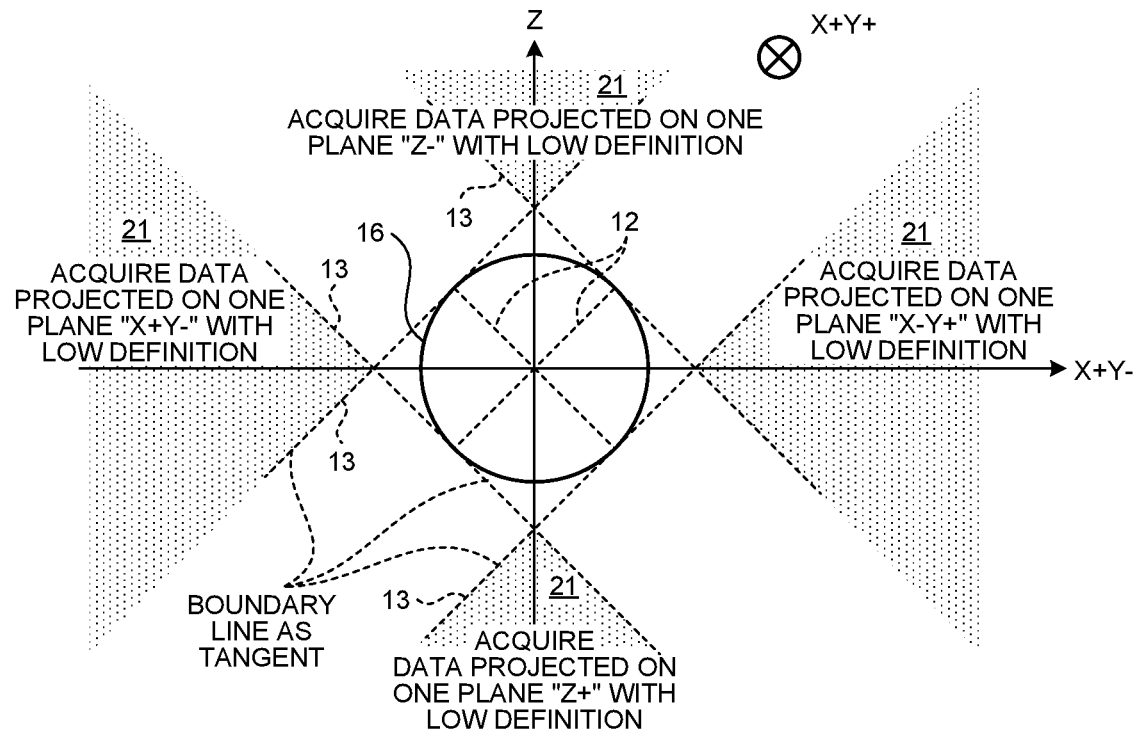
FIG. 9C is a diagram illustrating an example of the identification region map in a case where respective pieces of point data of the point cloud are divided for six projection planes, X+Y+, X+Y−, X−Y+, X−Y−, Z+, and Z−.

For both [1] and [2], the client generates the identification region map by using the circumscribed sphere information of the object 10 and the rule of a relationship of visibility. The identification region maps of the divided streams of the six planes of [1] are as illustrated in FIGS. 4A 4B and 4C. The identification region maps of the divided streams of the six planes (X+Y+, X+Y−, X−Y+, X−Y−, Z+, and Z−) of [2] shifted by 45° in the horizontal direction can be generated by the above-described method as illustrated in FIGS. 9A, 9B and 9C. FIGS. 9A, 9B and 9C are diagrams each illustrating an example of the identification region map in a case where respective pieces of point data of the point cloud are divided for six projection planes, X+Y+, X+Y−, X−Y+, X−Y−, Z+, and Z−. FIG. 9A illustrates the identification region map on the XY plane where the Z axis of the three-dimensional space is 0. FIG. 9B illustrates the identification region map on a plane of an X+Y+ axis and the Z axis (a plane where X=Y) of the three-dimensional space. FIG. 9C illustrates the identification region map on a plane of an X−Y+ axis and the Z axis (a plane where X=−Y) of the three-dimensional space. In a case where the viewing position is in a region 21 indicated by a dot pattern in the identification region maps illustrated in FIGS. 9A 9B and 9C, it can be determined from the above-described rule of a relationship of visibility that the divided stream projected on the plane on the opposite side of the circumscribed sphere 16 from the region 21 is invisible.

Figure 10:
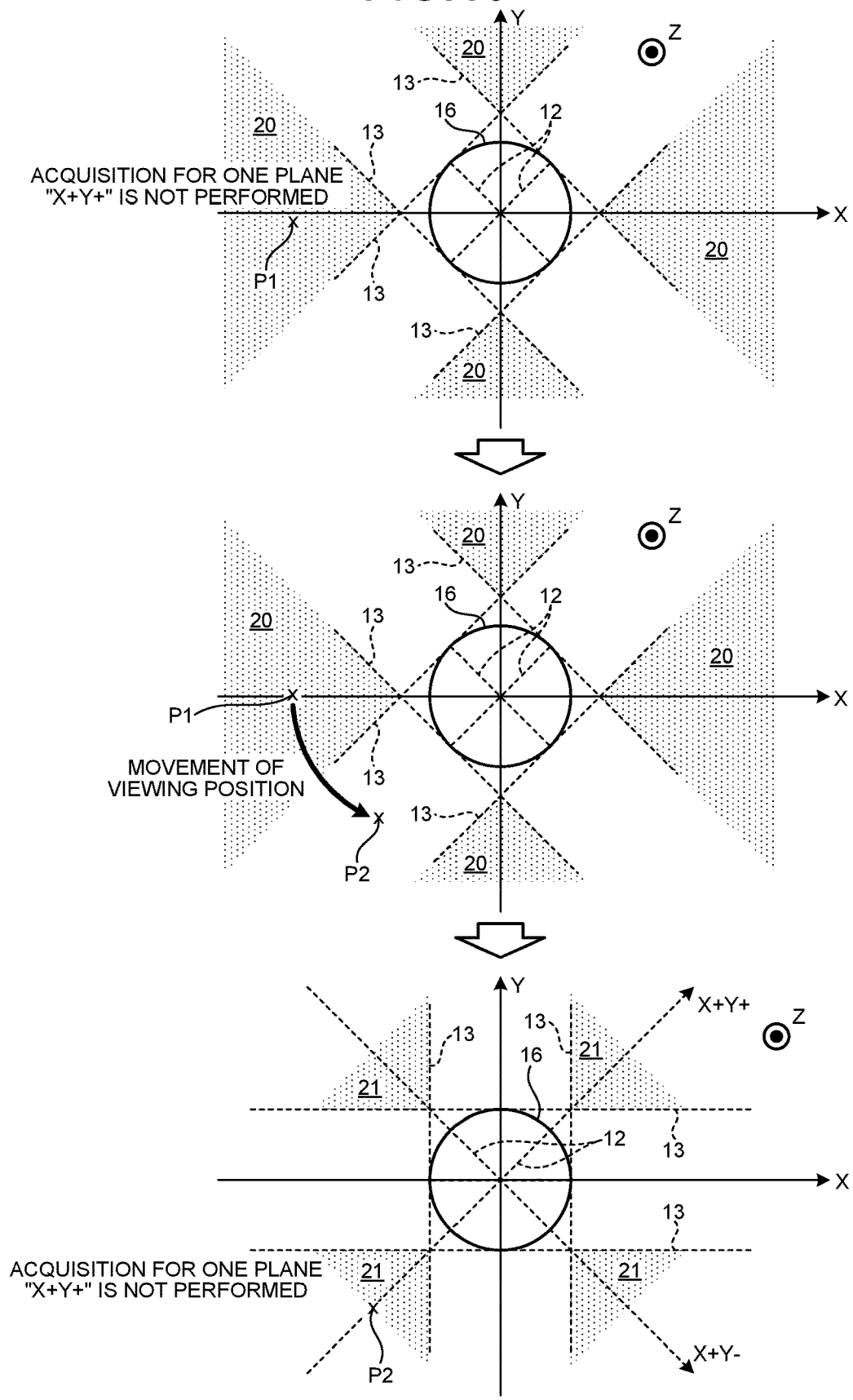
FIG. 10 is a diagram for describing switching of a divided stream group.

The identification region maps of the six planes (X+Y+, X+Y−, X−Y+, X−Y−, Z+, and Z−) illustrated in FIGS. 4A 4B and 4C and the identification region maps of the six planes (X+Y+, X+Y−, X−Y+, X−Y−, Z+, and Z−) illustrated in FIGS. 9A 9B and 9C compensate each other for the regions in which full acquisition is made. The client switches the divided stream group to be used among the divided stream groups [1] and [2] according to the viewing position. Further, the client switches the used identification region map to the identification region map corresponding to the divided stream group. Then, the client identifies the divided stream corresponding to the invisible direction according to a region in which the viewing position is located in the used identification region map. The client does not acquire the invisible divided stream, or acquires the invisible divided stream with low definition. FIG. 10 is a diagram for describing switching of the divided stream group. For example, in a case of the divided streams of the six planes of [1], at a position P1, the divided streams of X+ do not have to be acquired. Therefore, the client uses the divided stream group [1]. In a case where the viewing position is moved from the position P1 to a position P2, full acquisition is made in the divided stream group [1]. In a case of the divided streams of the six planes of [2], at the position P2, the divided streams of X+Y+ do not have to be acquired. Therefore, when the viewing position is the position P2, the client switches to use the divided stream group [2]. In this manner, the client can switch the identification region map to an appropriate one according to the viewing position and use the identification region map, thereby making it possible to reduce the region in which full acquisition for the six planes is made. In the method in which the divided stream groups [1] and [2] are used, the number of divisions in the horizontal direction is not increased, but individual divided stream groups that cannot be used at the same time in generating one object 10 are added. Therefore, there is no change in the situation that the number of planes on which the divided streams of the divided stream groups [1] and [2] that do not have to be acquired are projected among six planes is only one at the maximum, and the reduction efficiency is poor.

1-5. Identification Region Map of 10-Plane Division

Figure 11:
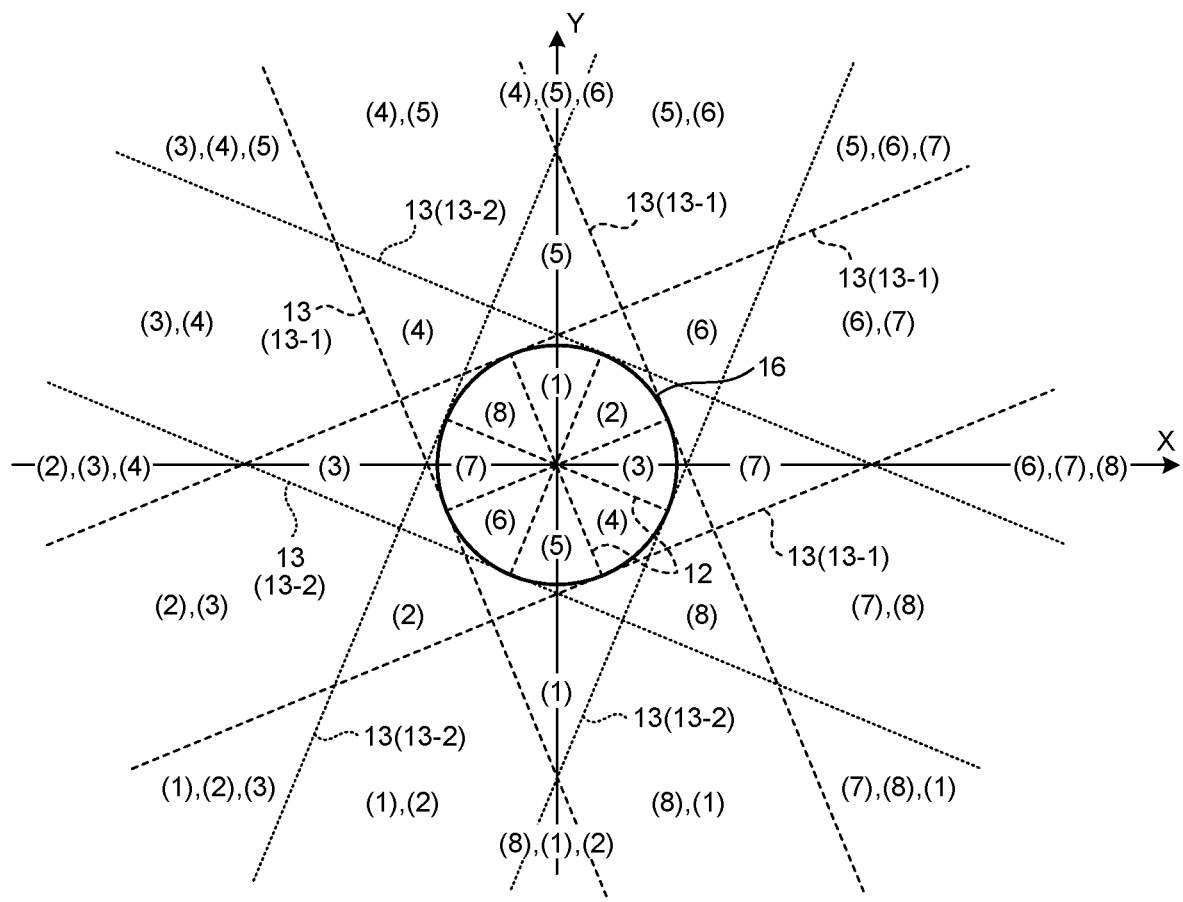
FIG. 11 is a diagram illustrating an example of the identification region map in a case where the number of divisions in the horizontal direction is increased from four to eight.

Next, a case where the number of projection planes for the V-PCC stream is further increased will be described. First, a case where another four planes (X+Y+, X+Y−, X−Y+, and X−Y−) shifted by 45° in the horizontal direction are added to the above-described six planes (X+, X−, Y+, Y−, Z+, and Z−), and the number of divisions in the horizontal direction is increased from four to eight will be described. That is, in the horizontal direction, depending on a direction among X+, X−, Y+, Y−, X+Y+, X+Y−, X−Y+, and X−Y− the normal vector 15 of each point is strongly oriented, the projection is performed in parallel on eight projection planes, X+, X−, Y+, Y−, X+Y+, X+Y−, X−Y+, and X−Y−. FIG. 11 is a diagram illustrating an example of the identification region map in a case where the number of divisions in the horizontal direction is increased from four to eight. FIG. 11 illustrates the circumscribed sphere 16. Numbers (1) to (8) indicating eight divided streams corresponding to eight projection planes, X+, X−, Y+, Y−, X+Y+, X+Y−, X−Y+, and X−Y−, in the horizontal direction are illustrated in the circumscribed sphere 16. For example, the number (1) indicates the divided stream of the Y+ projection plane. The number (2) indicates the divided stream of the X+Y+ projection plane. The number (3) indicates the divided stream of the X+ projection plane. The division boundary vector 12 serving as a boundary for projection on the respective projection planes is illustrated between the numbers (1) to (8) illustrated in the circumscribed sphere 16.

When the number of divisions is increased, the number of division boundary vectors 12 is increased. When the number of the division boundary vectors 12 is increased, the number of tangential planes that are orthogonal to the division boundary vectors 12 and are used in the above-described rule of a relationship of visibility is increased. In FIG. 11, the tangential plane orthogonal to the division boundary vector 12 is indicated as the tangent 13. For example, the number of tangents 13 is four in the 6-plane division (four planes in the horizontal direction) as illustrated in FIG. 4A. In the 10-plane division (eight planes in the horizontal direction), as illustrated in FIG. 11, four tangents 13-2 are added to four tangents 13-1 similar to those in FIG. 4A. The identification boundary map can be generated using the same method as described above. For example, a region from which the divided stream on the opposite side is invisible is specified by region division using the four tangents 13-1. Next, a region from which the divided stream on the opposite side is invisible is specified by region division using the four tangents 13-2. In FIG. 11, regions from which the divided streams of the numbers (1) to (8) are invisible are denoted by (1) to (8), respectively. The regions from which the divided streams of the numbers (1) to (8) are invisible partially overlap. In the overlapping region, none of the divided streams that are invisible from the respective regions are visible. That is, in the overlapping region, the number of streams that do not have to be acquired is increased. For example, in the regions denoted by (6), (7), and (8) on the X axis, it is sufficient to be able to acquire the divided streams of (1) to (6), and the divided streams of (6) to (8) do not have to be acquired.

The client uses the identification region map to identify the divided stream corresponding to the invisible direction according to a region in which the viewing position is located. Then, the client does not acquire the invisible divided stream or acquires the invisible divided stream with low definition.

As described above, in a case where the number of divisions in the horizontal direction is increased from four to eight to achieve the 10-plane division, the number of planes on which the divided stream that does not have to be acquired is projected among ten planes is three at the maximum, that is, the reduction rate is improved.

1-6. Identification Region Map of 14-Plane Division

Figure 12:
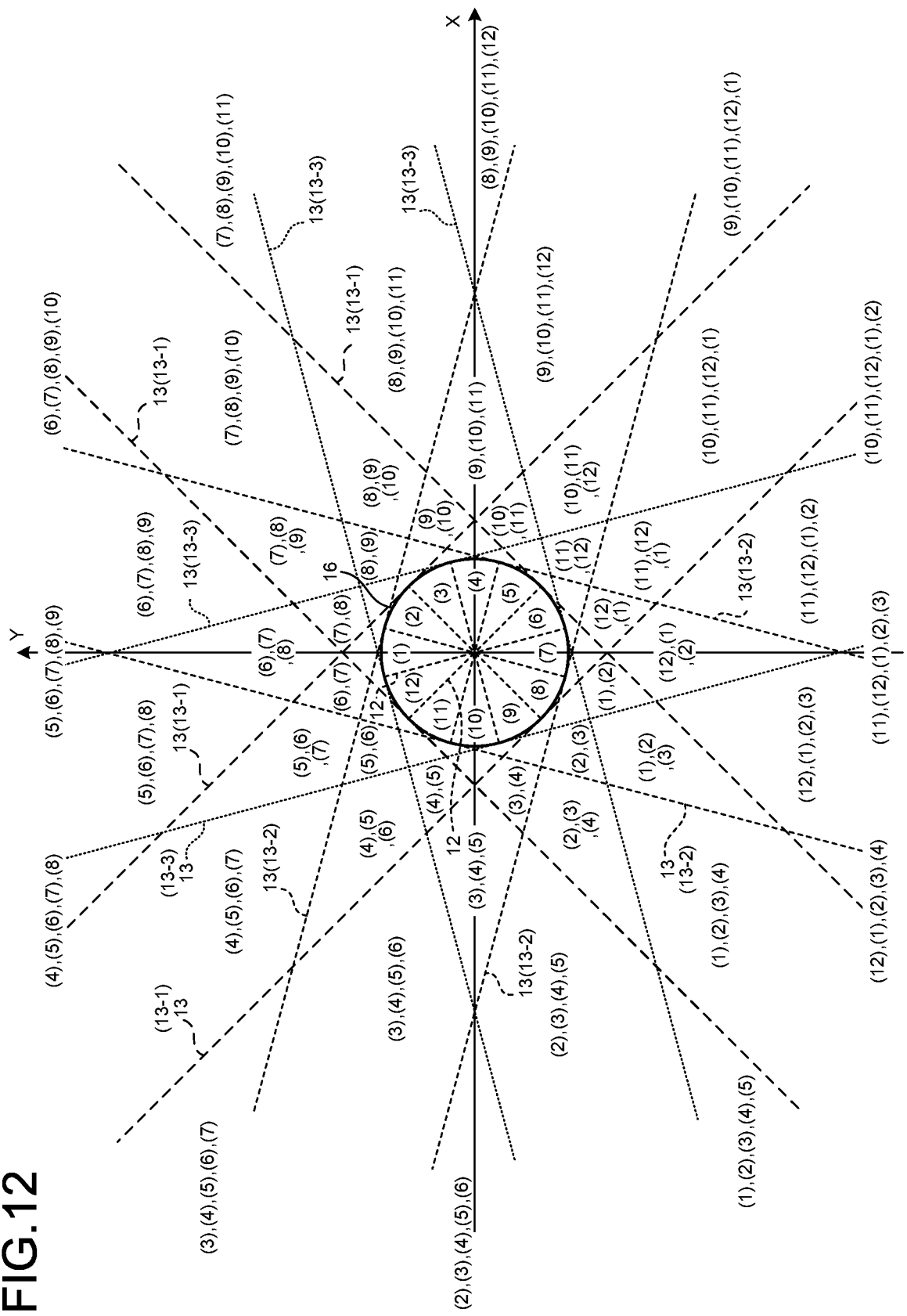
FIG. 12 is a diagram illustrating an example of the identification region map in a case where the number of divisions in the horizontal direction is increased from four to twelve.

Next, a case where the number of divisions in the horizontal direction is increased from four to twelve to achieve 14-plane division will be described. FIG. 12 is a diagram illustrating an example of the identification region map in a case where the number of divisions in the horizontal direction is increased from four to twelve. FIG. 12 illustrates the circumscribed sphere 16. Numbers (1) to (12) indicating 12 divided streams corresponding to 12 projection planes in the horizontal direction are illustrated in the circumscribed sphere 16. The division boundary vector 12 serving as a boundary for projection on the respective projection planes is illustrated between the numbers (1) to (12) illustrated in the circumscribed sphere 16.

When the number of divisions is increased, the number of division boundary vectors 12 is increased accordingly. When the number of the division boundary vectors 12 is increased, the number of tangential planes that are orthogonal to the division boundary vectors 12 and are used in the above-described rule of a relationship of visibility is increased. Also in FIG. 12, the tangential plane orthogonal to the division boundary vector 12 is indicated as the tangent 13. For example, the number of tangents 13 is four in the 6-plane division (four planes in the horizontal direction) as illustrated in FIG. 4A. In the 14-plane division (12 planes in the horizontal direction), as illustrated in FIG. 12, four tangents 13-2 and four tangents 13-3 are added to four tangents 13-1 similar to those in FIG. 4A. The identification boundary map can be generated using the same method as described above. For example, a region from which the divided stream on the opposite side is invisible is specified by region division using the four tangents 13-1. Next, a region from which the divided stream on the opposite side is invisible is specified by region division using the four tangents 13-2. Next, a region from which the divided stream on the opposite side is invisible is specified by region division using the four tangents 13-3. In FIG. 12, regions from which the divided streams of the numbers (1) to (12) are invisible are denoted by (1) to (12), respectively. The regions from which the divided streams of the numbers (1) to (12) are invisible partially overlap. In the overlapping region, none of the divided streams that are invisible from the respective regions are visible. That is, in the overlapping region, the number of streams that do not have to be acquired is increased. For example, in the regions denoted by (8), (9), (10), (11), and (12) on the X axis, it is sufficient to be able to acquire the divided streams of (1) to (7), and the divided streams of (8) to (12) do not have to be acquired.

The client uses the identification region map to identify the divided stream corresponding to the invisible direction according to a region in which the viewing position is located. Then, the client does not acquire the invisible divided stream or acquires the invisible divided stream with low definition.

As described above, in a case where the number of divisions in the horizontal direction is increased from four to twelve to achieve the 14-plane division, the number of planes on which the divided stream that does not have to be acquired is projected among 14 planes is five at the maximum, that is, the reduction rate is further improved as compared with the 10-plane division in which the number of divisions in the horizontal direction is eight.

In a case where the number of divisions is increased in this manner, the identification region map becomes complicated, but the reduction rate is improved. Even in a case where the number of divisions is increased in order to improve the reduction rate, the client can generate the identification region map by a method similar to the 6-plane division based on the circumscribed sphere 16 and the rule of a relationship of visibility, and can identify the invisible stream by using the identification region map.

1-7. Example of Signaling for Number of Divisions

Next, an example of signaling in a case where the number of divisions is increased in the V-PCC will be described. On the server side that provides the content, the projection direction in a case where the number of variations of the division is increased, for example, the number of divisions is increased, is signaled. For example, a descriptor indicating projection direction information is newly defined for each number of divisions by Dynamic Adaptive Streaming over HTTP Media Presentation Description (DASH MPD) extension. Then, @schemeIdUri indicates the descriptor of the projection direction information and the corresponding number of divisions, and @value indicates the projection direction.

For example, in the 6-plane division, the number of projections and the projection direction are signaled as follows.

schemeIdUri="urn:mpeg:mpegI:pc_proj_direction:6 div: 2019"
value="X+" or "X−" or "Y+" or "Y−" or "Z+" or "Z−"

In addition, for example, in a case where four planes shifted by 45° in the horizontal direction are added to the 6-plane division, the number of projections and the projection direction are signaled as follows.

schemeIdUri="urn:mpeg:mpegI:pc_proj_direction:6+4 div:2019"
value="X+" or "X−" or "Y+" or "Y−" or "Z+" or "Z−" or "X+Y+", "X+Y−", "X−Y+", "X−Y−"

Furthermore, for example, in the 10-plane division in which the number of horizontal planes is eight, and the number of vertical planes is two, the number of projections and the projection direction are signaled as follows.

schemeIdUri="urn:mpeg:mpegI:pc_proj_direction:10 div:2019"
value="X+" or "X−" or "Y+" or "Y−" or "Z+" or "Z−" or "X+Y+", "X+Y−", "X−Y+", "X−Y−"

Furthermore, for example, in the 14-plane division in which the number of horizontal planes is twelve, and the number of vertical planes is two, the number of projections and the projection direction are signaled as follows.

schemeIdUri="urn:mpeg:mpegI:pc_proj_direction:14 div:2019"
value="X+" or "X−" or "Y+" or "Y−" or "Z+" or "Z−" or "X+X+Y+" or "X+Y+Y+" or "X−Y+Y+" or "X−X−Y+" or "X−X−Y−" or "X− Y−Y−" or "X+Y−Y−" or "X+X+Y−"

FIG. 13 is a diagram illustrating an example of syntax in a case of the 14-plane division. In FIG. 13, the fact that the 14-plane division is used is signaled with @schemeIdUri.

1-8. Example of Configuration of Data Reproduction Device

Figure 14:
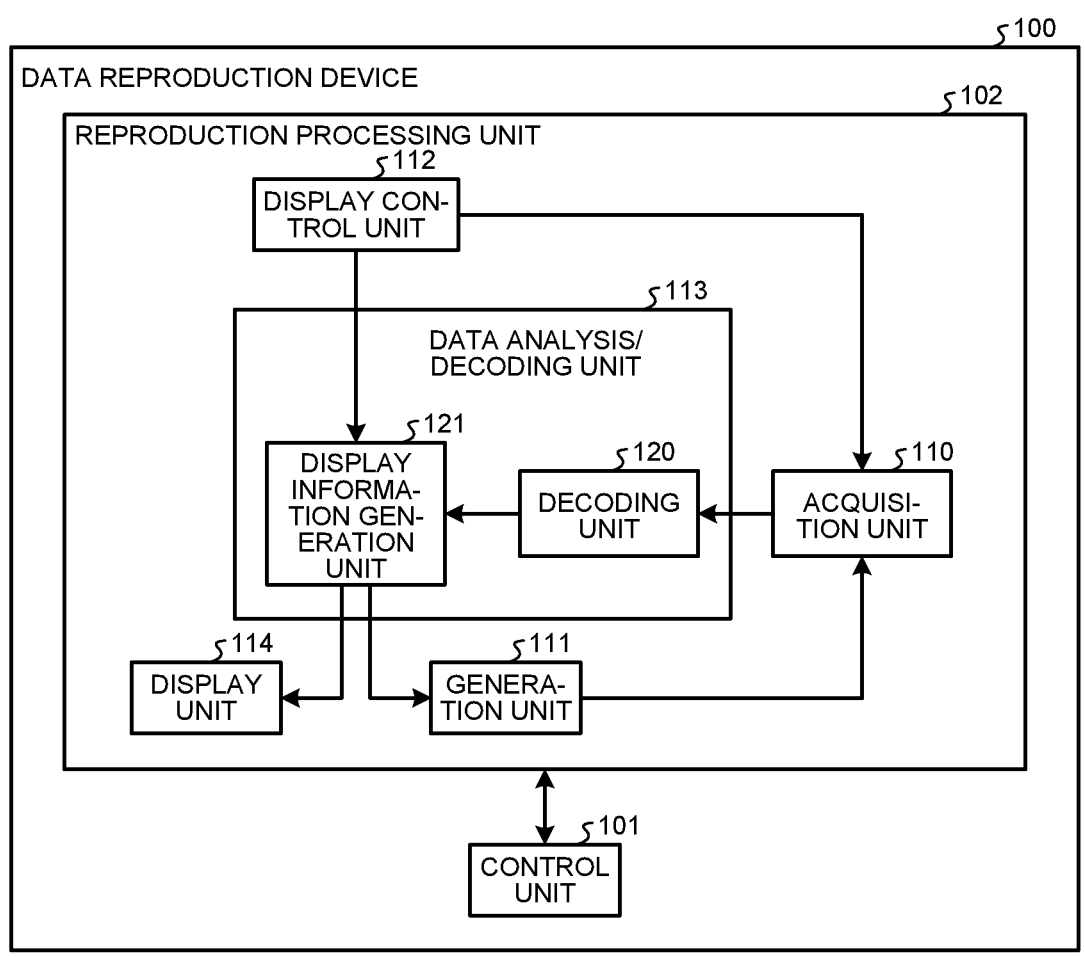
FIG. 14 is a diagram illustrating a schematic configuration of a data reproduction device according to a first embodiment.

Next, an example of a configuration of a data reproduction device 100 that reproduces the divided stream as described above will be described. FIG. 14 is a diagram illustrating a schematic configuration of the data reproduction device 100 according to a first embodiment. The data reproduction device 100 corresponds to the information processing device of the present disclosure. FIG. 14 illustrates a functional configuration of the data reproduction device 100, but the data reproduction device 100 has a configuration of a general computer such as a central processing unit (CPU) and a memory. In the data reproduction device 100, a series of processing may be performed in a manner in which a program is operated on the CPU, or the processing may be performed by hardware.

The data reproduction device 100 illustrated in FIG. 14 is a DASH client, and includes a control unit 101 and a reproduction processing unit 102.

The control unit 101 controls an overall operation of the data reproduction device 100. For example, the control unit 101 controls the reproduction processing unit 102 to acquire the file of the divided stream from the server and to reproduce point cloud data on the basis of the file of the divided stream.

The reproduction processing unit 102 reproduces the point cloud data under the control of the control unit 101. The reproduction processing unit 102 includes an acquisition unit 110, a generation unit 111, a display control unit 112, a data analysis/decoding unit 113, and a display unit 114.

The acquisition unit 110 acquires various data necessary for reproducing the point cloud data from the server, and supplies the acquired various data to the data analysis/decoding unit 113. For example, the acquisition unit 110 acquires the divided stream, information regarding the number of divisions, and information regarding the plane in the projection direction from the server, and supplies them to the data analysis/decoding unit 113. Furthermore, the acquisition unit 110 selects the divided stream of the V-PCC necessary for reproducing the point cloud data, acquires a file of the selected divided stream from the server, and supplies the file to the data analysis/decoding unit 113 of the divided stream. In selecting the divided stream to be acquired, the identification region map generated by the generation unit 111 and a visual field direction (the viewing position, a line-of-sight direction, a viewing angle, and the like) of the user supplied from the display control unit 112 are appropriately used.

The display control unit 112 controls reproduction (display) of the point cloud data. For example, the display control unit 112 acquires a result of detection of the visual field direction of the user viewing the point cloud, and supplies the detection result to the acquisition unit 110 and the data analysis/decoding unit 113.

The data analysis/decoding unit 113 generates an image of a 3D model, which is the point cloud data, on the basis of the information regarding the number of divisions, the information regarding the plane in the projection direction, and the file of the divided stream supplied from the acquisition unit 110, and supplies the image to the display unit 114. The data analysis/decoding unit 113 includes a decoding unit 120 and a display information generation unit 121.

The decoding unit 120 extracts and decodes encoded data of the divided stream supplied from the acquisition unit 110, and supplies the V-PCC stream obtained by decoding to the display information generation unit 121.

The display information generation unit 121 reconfigures the object 10, which is the point cloud data, in the three-dimensional space on the basis of the V-PCC stream supplied from the decoding unit 120. Then, the display information generation unit 121 sequentially generates data of the image of the object 10 according to the visual field direction of the user on the basis of the result of detection of the visual field direction of the user supplied from the display control unit 112, and supplies the data to a display unit 115.

The display unit 115 includes, for example, a liquid crystal display panel or the like, and displays a video of the point cloud on the basis of the image data supplied from the display information generation unit 121.

The generation unit 111 generates the identification region map by using information regarding the orientation of the normal vector 15 dividing the object 10 in the three-dimensional space reconfigured in the data analysis/decoding unit 113 and information regarding an outline of the object 10.

First, the generation unit 111 specifies a sphere containing the object 10 as the information regarding the outline of the object 10. For example, the generation unit 111 specifies the circumscribed sphere 16 of the object 10 as the sphere containing the object 10. The object 10 may be moved. Therefore, the generation unit 111 may specify the circumscribed sphere 16 in a movement range of the object 10 for a certain period of time. For example, the generation unit 111 may periodically obtain the movement range of the object 10 during the latest predetermined number of frames to be distributed, and periodically specify the circumscribed sphere 16 in the movement range. Note that, in a case where the server distributes the circumscribed sphere information of the object 10, the generation unit 111 may specify the circumscribed sphere 16 of the object 10 by using the distributed circumscribed sphere information.

The generation unit 111 uses the above-described "rule of a relationship of visibility according to a normal vector direction and a viewing position" to generate the identification region map indicating whether or not each divided stream is visible from each position in the three-dimensional space. For example, the generation unit 111 generates, for each projection plane on which the object 10 is projected, the identification region map indicating a region where viewing of the divided stream projected on the projection plane is not necessary. For example, the generation unit 111 generates the identification region map with the tangential plane orthogonal to the boundary vector 12 of the sphere containing the object 10 as a boundary. For example, for each projection plane, the generation unit 111 specifies, on the opposite side of the sphere containing the object 10 from the projection plane, each tangential plane of the sphere containing the object orthogonal to each boundary vector 12 serving as a reference for projection on the projection plane. The generation unit 111 generates the identification region map in which a region on the opposite side of each tangential plane from the projection plane is specified as a region where viewing of the divided stream of the projection plane is not necessary.

For example, the generation unit 111 generates the identification boundary map on the basis of the circumscribed sphere 16 of the specified object 10 and the above-described rule of a relationship of visibility. For example, in a case of the 6-plane division that division into six projection planes, X+, X−, Y+, Y−, Z+, and Z−, is made, the generation unit 111 generates the identification boundary maps illustrated in FIGS. 4A 4B and 4C. The generation unit 111 outputs the generated identification boundary map to the acquisition unit 110.

In a case where the identification boundary map is not input from the generation unit 111, the acquisition unit 110 acquires all the divided streams from the server with high definition. On the other hand, in a case where the identification boundary map is input from the generation unit 111, the acquisition unit 110 selects and acquires the divided stream according to the viewing position by using the identification region map. For example, the acquisition unit 110 uses the identification region map to identify the divided stream corresponding to the invisible direction according to a region in which the viewing position is located. Then, the acquisition unit 110 acquires the visible divided stream with high definition, and does not acquire the invisible divided stream or acquires the invisible divided stream with low definition.

1-9. Flow of Reproduction Processing

Figure 15:
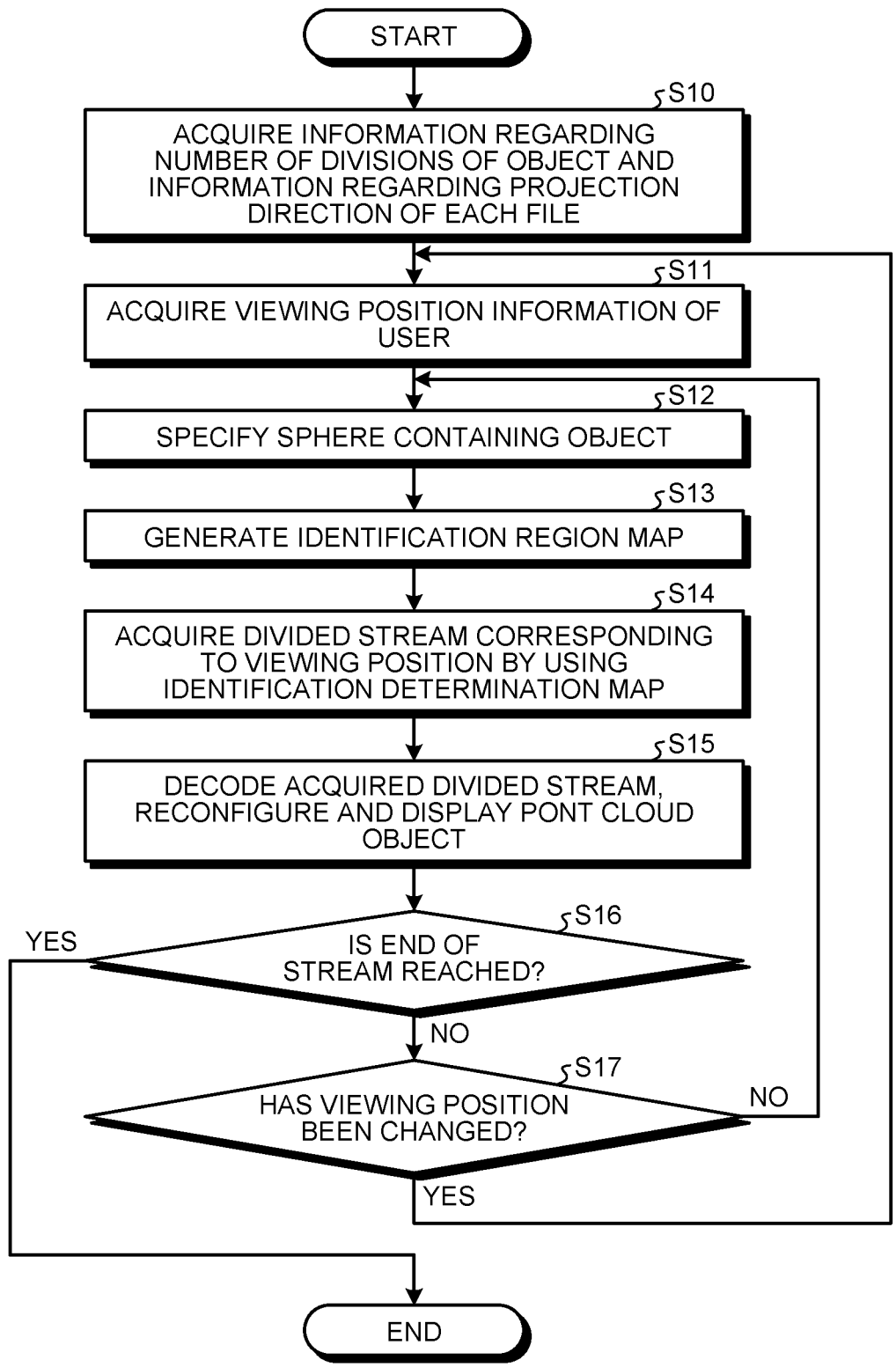
FIG. 15 is a flowchart for describing reproduction processing according to the first embodiment.

Next, a flow of reproduction processing in which the data reproduction device 100 of FIG. 14 reproduces the point cloud data will be described. FIG. 15 is a flowchart for describing the reproduction processing according to the first embodiment.

The acquisition unit 110 acquires the information regarding the number of divisions of the object 10 and the information regarding the plane in the projection direction from the server (Step S10). Furthermore, the acquisition unit 110 acquires the viewing position from the display control unit 112 (Step S11).

The generation unit 111 specifies the sphere containing the object 10 (Step S12). For example, the generation unit 111 specifies the circumscribed sphere 16 of the object 10 as the sphere containing the object 10.

The generation unit 111 generates the identification region map indicating whether or not each divided stream is visible from each position in the three-dimensional space by using the information regarding the orientation of the normal vector 15 dividing the object 10 and the information regarding the outline of the object 10 (Step S13). For example, for each projection plane, the generation unit 111 specifies, on the opposite side of the circumscribed sphere 16 from the projection plane, each tangential plane of the circumscribed sphere 16 orthogonal to each boundary vector 12 serving as a reference for projection on the projection plane. The generation unit 111 generates the identification region map in which a region on the opposite side of each tangential plane from the projection plane is specified as a region where viewing of the divided stream of the projection plane is not necessary. For example, the generation unit 111 generates the identification boundary map on the basis of the circumscribed sphere 16 of the specified object 10 and the above-described rule of a relationship of visibility.

The acquisition unit 110 selects and acquires the divided stream of each projection plane according to the viewing position in the three-dimensional space by using the identification region map. For example, the acquisition unit 110 uses the identification region map to identify the divided stream corresponding to the invisible direction according to a region in which the viewing position is located. Then, the acquisition unit 110 acquires the visible divided stream with high definition, and does not acquire the invisible divided stream or acquires the invisible divided stream with low definition.

The data analysis/decoding unit 113 generates an image of the 3D model, which is the point cloud data, on the basis of the information regarding the number of divisions, the information regarding the plane in the projection direction, and the file of the divided stream supplied from the acquisition unit 110, and supplies the image to the display unit 114 (Step S15).

The data analysis/decoding unit 113 determines whether or not an end of the stream is reached (Step S16). In a case where the end of the stream is reached (Step S16: Yes), the processing ends.

In a case where the end of the stream is not reached (Step S16: No), the display control unit 112 determines whether or not the viewing position has been changed (Step S17). In a case where the viewing position has been changed (Step S17: Yes), the processing proceeds to Step S11 described above. On the other hand, in a case where the viewing position has not been changed (Step S17: No), the processing proceeds to Step S12 described above.

1-10. Effects of First Embodiment

As described above, the data reproduction device 100 according to the first embodiment includes the generation unit 111. The generation unit 111 generates the identification region map indicating whether or not each divided stream (divided object data) is visible from each position in the three-dimensional space by using the information regarding the orientation of the normal vector 15 dividing the object 10 in the three-dimensional space and the information regarding the outline of the object 10. As a result, the data reproduction device 100 can identify the divided stream that is invisible from the viewing position and does not need to be viewed only by identifying a region of the identification region map in which the viewing position is located.

The generation unit 111 generates, for each projection plane on which the object 10 is projected, the identification region map indicating a region where viewing of the divided stream of the projection plane is not necessary. As a result, the data reproduction device 100 can identify the divided stream that does not need to be viewed, from the identification region map.

Furthermore, the information regarding the outline of the object 10 is sphere information regarding the sphere containing the object 10 in the three-dimensional space. The generation unit 11 generates the identification region map with the tangential plane of the sphere indicated by the sphere information orthogonal to the boundary vector 12 serving as a reference for which projection plane a region of the surface of the object 10 is to be projected, as a boundary. As a result, the data reproduction device 100 can generate the identification region map appropriately defining the boundary where the divided stream of each projection plane is invisible. Furthermore, by using the information regarding the outline of the object 10 as the sphere information regarding the sphere including the object 10 in the three-dimensional space, the shape of the object 10 can be appropriately simplified even in a case where the actual shape of the object 10 is complicated. As a result, the data reproduction device 100 can generate the identification region map in a simple shape symmetrical with respect to the X/Y/Z axes for the object 10, and thus, it is possible to speed up computation in the divided stream selection processing using the identification region map.

For each projection plane, the generation unit 111 specifies, on the opposite side of the sphere indicated by the sphere information from the projection plane, each tangential plane of the sphere orthogonal to each boundary vector 12 serving as a reference for projection on the projection plane. The generation unit 111 generates the identification region map in which a region on the opposite side of each tangential plane from the projection plane is specified as a region where viewing of the divided stream of the projection plane is not necessary. As a result, the data reproduction device 100 can generate the identification region map in which the region where the divided stream of the projection plane is invisible is appropriately identified for each projection plane.

Further, the acquisition unit 110 selects and acquires the divided stream of each projection plane according to the viewing position in the three-dimensional space by using the identification region map. As a result, the data reproduction device 100 does not have to perform the acquisition of the divided stream that does not need to be viewed, at the viewing position, and can reduce the amount of information to be acquired without affecting the viewing video.

2. Second Embodiment

Next, a second embodiment will be described. In the second embodiment, a case where the identification region map is optimized by introducing a "switching margin region" and a "full acquisition region" as described later will be described.

By the way, in a case where the divided stream is switched according to the viewing position by using the identification region map obtained by performing region division on the basis of the visibility boundary line as described in the first embodiment, image quality degradation may occur during a switching response delay.

Therefore, in the second embodiment, a new identification region map obtained by applying the following two measures, (a) and (b), to the identification region map described in the first embodiment is generated, and switching of the divided stream is performed using the new identification region map.

(a) Instead of performing region division according to the visibility boundary line, the switching margin region is provided, and the boundary line is redrawn so that the switching is performed in the switching margin region. The switching margin region is set so that a divided stream that does not have to be acquired in a certain region because it is not yet visible from the region, and becomes visible when the viewing position is moved to an adjacent region is acquired in advance in preparation for movement of the viewing position.

(b) A short distance region or the like of the object 10 that cannot be covered with the switching margin region provided by the measure (a) and easily wraps around is handled as a full acquisition region 40.

2-1. Identification Region Map According to Second Embodiment

Figure 16A:
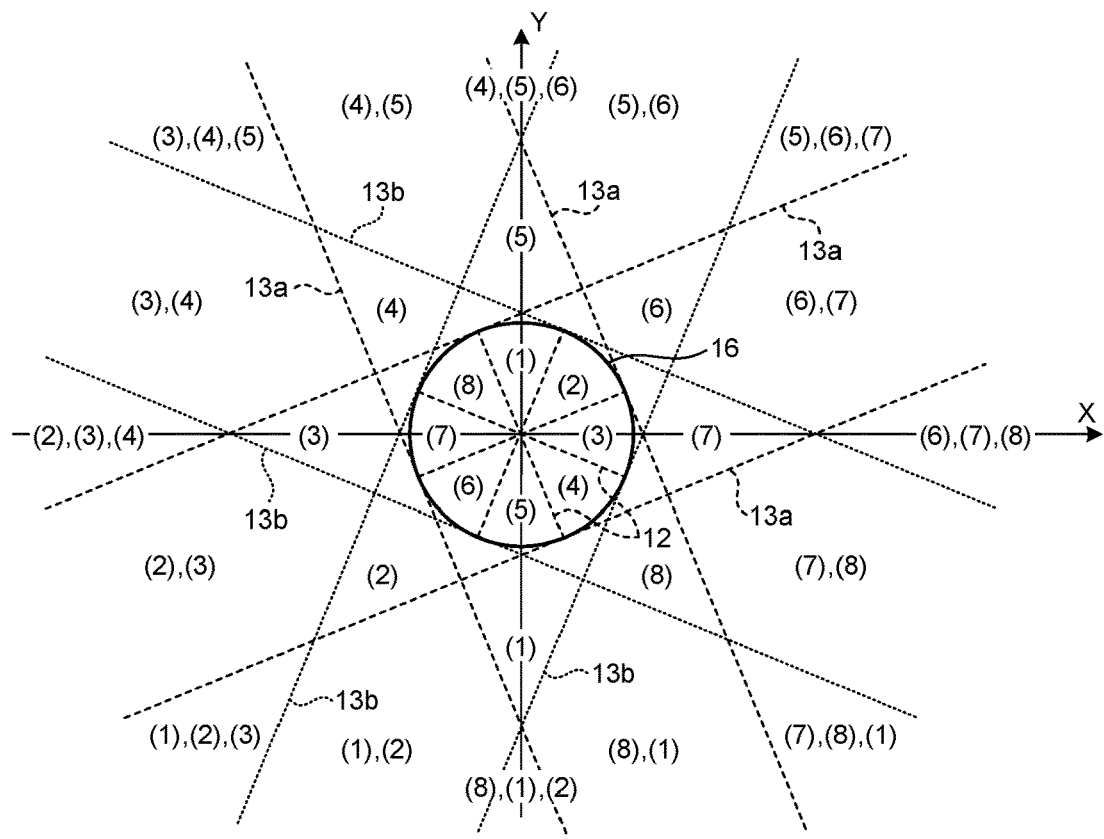
FIG. 16A is a diagram for describing an identification region map according to a second embodiment.
Figure 16B:
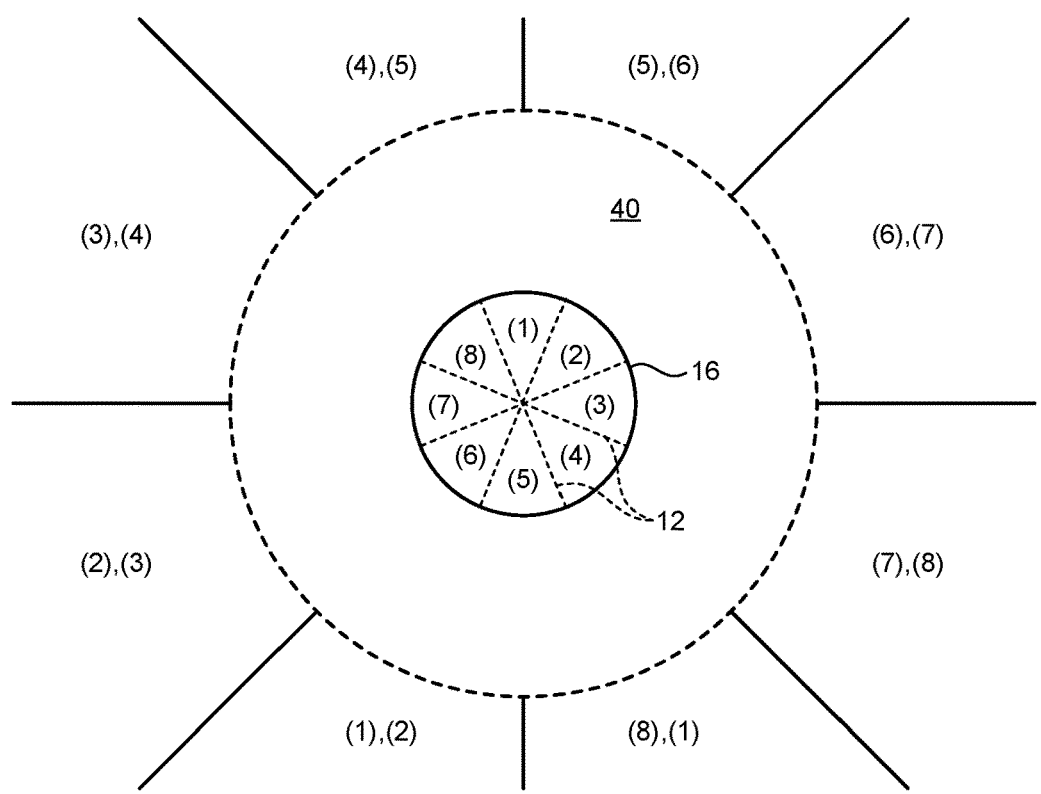
FIG. 16B is a diagram for describing the identification region map according to the second embodiment.

The identification region map according to the second embodiment will be described. FIGS. 16A and 16B are diagrams for describing the identification region map according to the second embodiment. FIG. 16A illustrates the identification region map according to the first embodiment for the 10-plane division illustrated in FIG. 11. FIG. 16B illustrates the identification region map according to the second embodiment obtained by optimizing the identification region map of FIG. 16A. FIGS. 16A and 16B illustrate a circumscribed sphere 16. Numbers (1) to (8) indicating eight divided streams corresponding to eight projection planes, X+, X−, Y+, Y−, X+Y−, X+Y−, X-Y+, and X-Y−, in the horizontal direction are illustrated in the circumscribed sphere 16. A division boundary vector 12 serving as a boundary for projection on the respective projection planes is illustrated between the numbers (1) to (8) illustrated in the circumscribed sphere 16. In FIG. 16A, regions from which the divided streams of the numbers (1) to (8) are invisible are denoted by (1) to (8), respectively.

Figure 17:
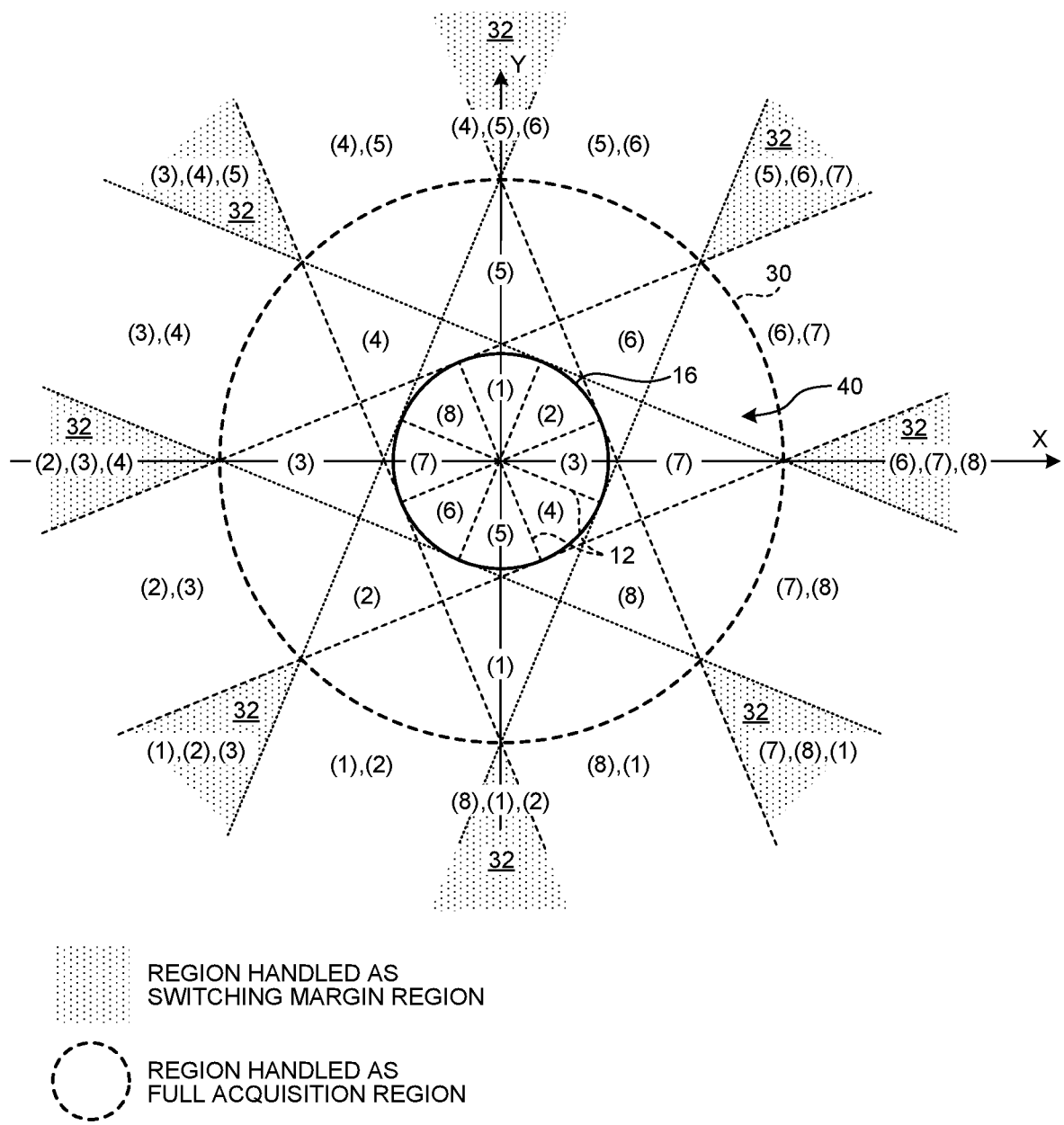
FIG. 17 is a diagram for describing generation of the identification region map according to the second embodiment.

A portion set as the full acquisition region 40 and a portion set as the switching margin region in the identification region map illustrated in FIG. 16A will be described with reference to FIG. 17. FIG. 17 is a diagram for describing generation of the identification region map according to the second embodiment. FIG. 17 illustrates the identification region map illustrated in FIG. 16A.

Figure 18:
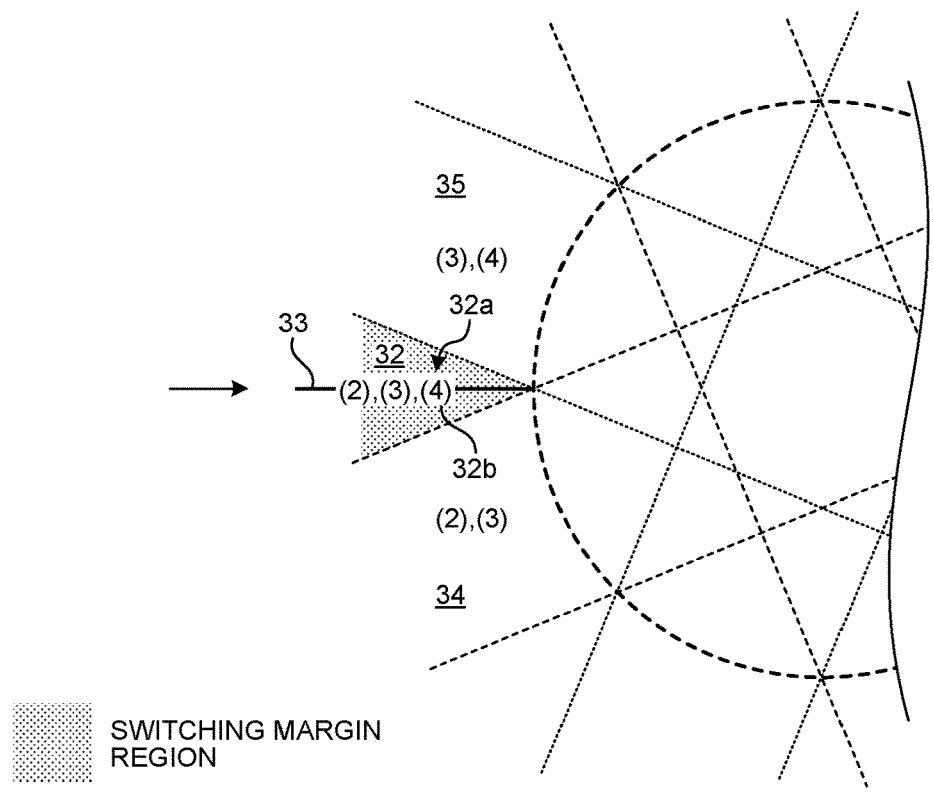
FIG. 18 is a diagram for describing a method of creating a switching margin region.
Figure 19:
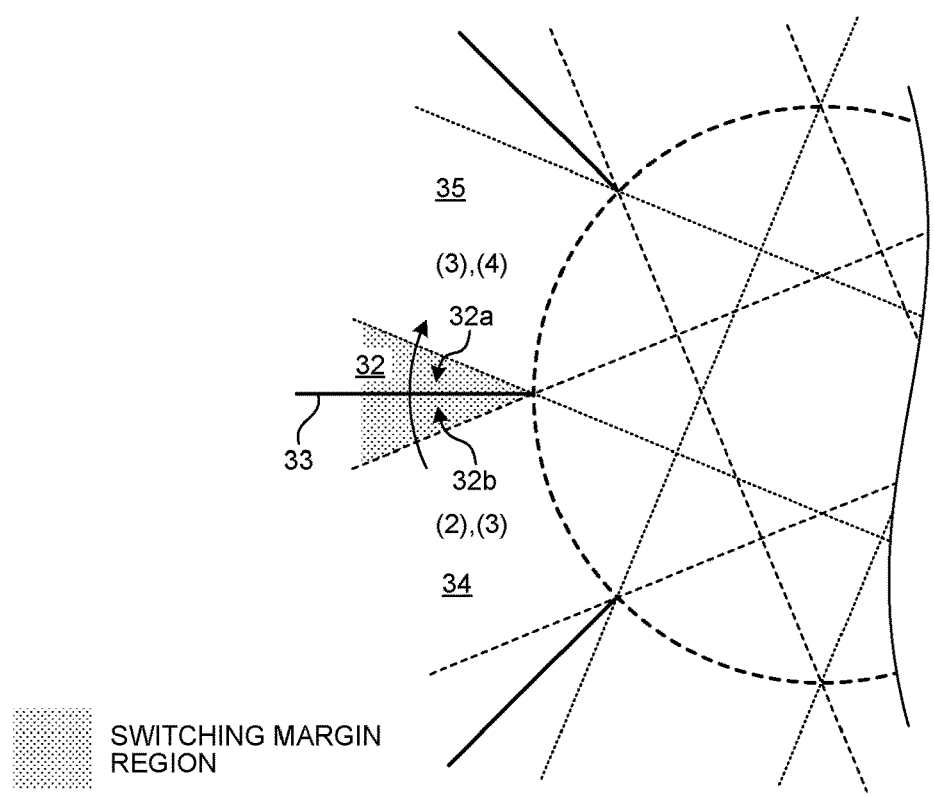
FIG. 19 is a diagram for describing an example of movement of a viewing position.

In the second embodiment, a region surrounded by a dotted line 30 is set as the full acquisition region 40 as illustrated in FIG. 17 in the identification region map according to the first embodiment. For example, a region near the circumscribed sphere 16 is set as the full acquisition region 40. In addition, in the second embodiment, a region where the number of divided streams that do not have to be acquired is the largest in the identification region map is set as the switching margin region. In FIG. 17, a region 32 where the number of divided streams that do not have to be acquired is the largest is indicated by a dot pattern. The region 32 is a region where the number of divided streams that do not have to be acquired is three and the reduction rate is higher than that of an adjacent region. The high reduction rate of the region 32 is used. A method of setting the region 32 having a high reduction rate as the switching margin region will be described below with reference to FIG. 18. FIG. 18 is a diagram for describing a method of creating the switching margin region. As illustrated in FIG. 18, a new boundary line 33 is drawn on a middle line of the region 32 indicated by the dot pattern. Then, the region 32 is divided into divided regions 32a and 32b with the boundary line 33 as a boundary, and the divided stream that does not have to be acquired in the divided regions 32a and 32b are the same as that in the adjacent region. For example, FIG. 18 illustrates a region 34 where the divided streams of the numbers (2) and (3) do not have to be acquired, a region 32 where the divided streams of the numbers (2), (3), and (4) do not have to be acquired, and a region 35 where the divided streams of the numbers (3) and (4) do not have to be acquired. The new boundary line 33 is drawn on the middle line of the region 32, and the region 32 is divided into the divided regions 32a and 32b with the boundary line 33 as a boundary. In the upper divided region 32a, the divided streams of the numbers (3) and (4) that are the same as those of the adjacent region 35 do not have to be acquired. In the lower divided region 32b, the divided streams of the numbers (2) and (3) that are the same as those of the adjacent region 34 do not have to be acquired. That is, the region 32 is divided by the boundary line 33 to be the same region as the adjacent regions 34 and 35. As a result, in the divided region 32a, the divided stream of the number (2) necessary for the adjacent region 35 is acquired. Furthermore, in the divided region 32b, the divided stream of the number (4) necessary for the adjacent region 34 is acquired. As a result, in a case where the viewing position is moved between the regions of the identification region map, a response delay due to switching of the divided stream can be suppressed. FIG. 19 is a diagram for describing an example of movement of the viewing position. FIG. 19 illustrates an identification region map similar to that of FIG. 18. For example, in a case where the viewing position is moved from the region 34 to the region 35, the viewing position passes through the assimilated divided regions 32a and 32b. Therefore, the viewing position passes through the divided region 32a before entering the region 35, and the divided stream of the number (2) is thus acquired. As a result, since the acquisition of the divided stream of the number (2) is already started when the viewing position enters the region 35, it is possible to cover the response delay for the switching of the divided stream by a width of the divided region 32a.

Figure 20A:
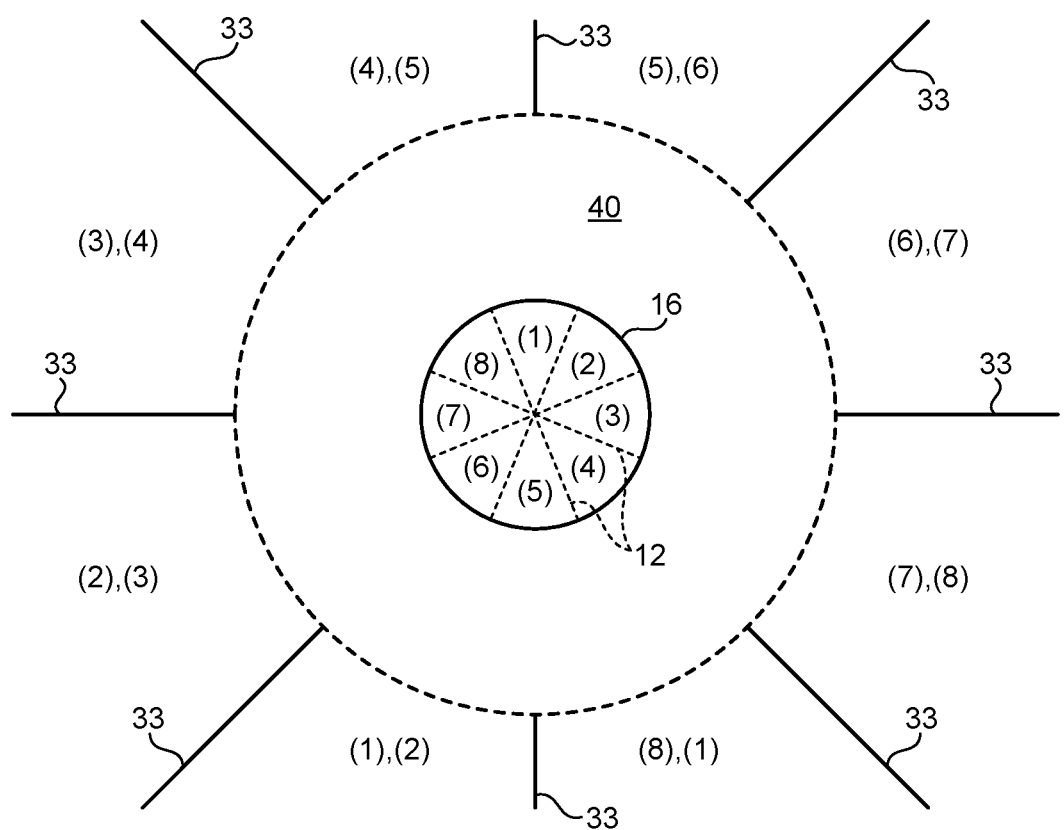
FIG. 20A is a diagram for describing the identification region map according to the second embodiment.
Figure 20B:
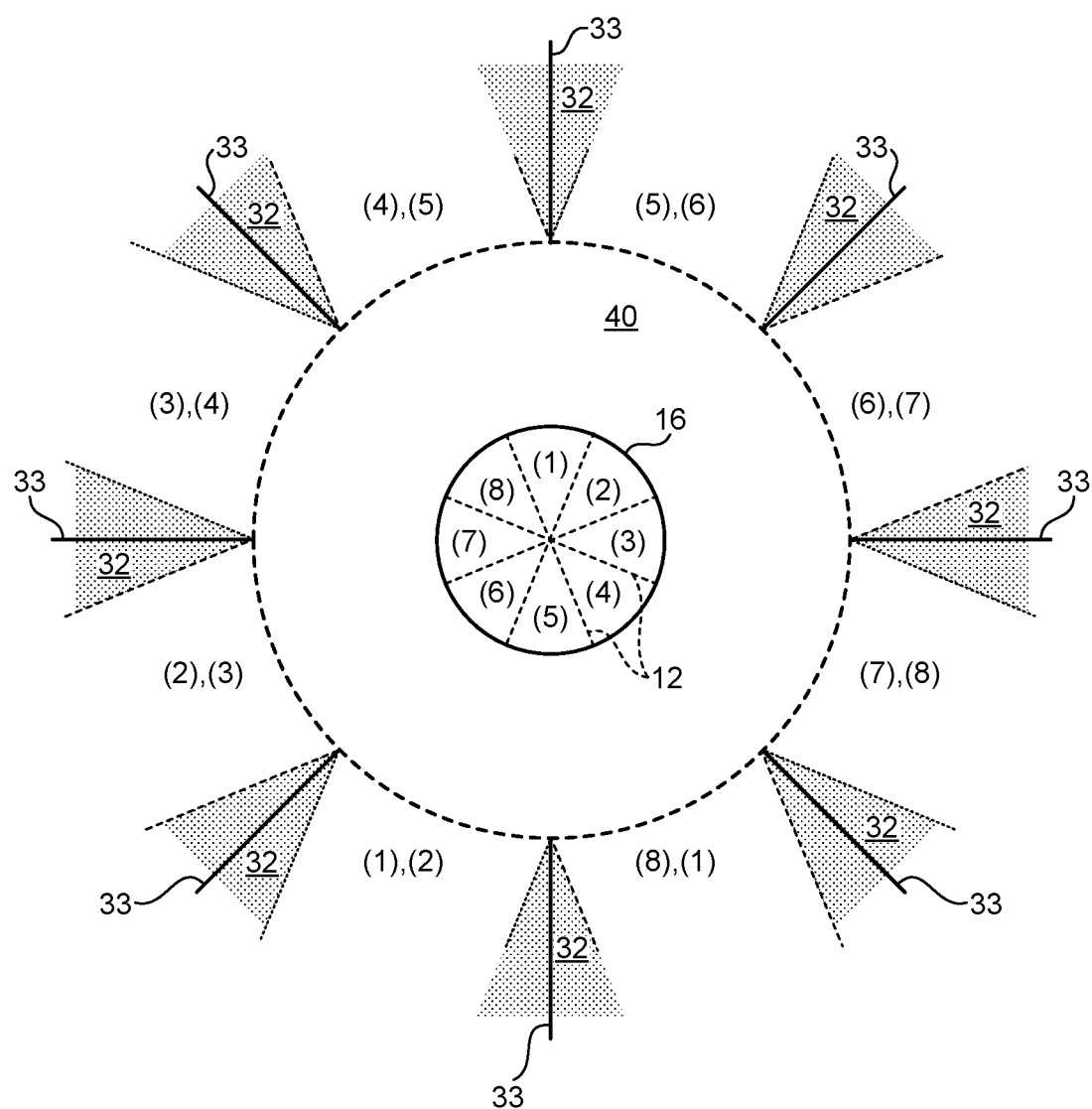
FIG. 20B is a diagram illustrating a region assimilated into an adjacent region in the identification region map according to the second embodiment.

FIG. 20A is a diagram for describing the identification region map according to the second embodiment. FIG. 20A illustrates an identification region map optimized by introducing the full acquisition region 40 and the switching margin region. FIG. 20B is a diagram illustrating the region 32 assimilated into the adjacent region in the identification region map according to the second embodiment. As illustrated in FIG. 20A, in the identification region map according to the second embodiment, the region 32 serving as the margin region does not directly exist, but as illustrated in FIG. 20B, the switching margin region (region 32) practically exists around the new boundary line 33. In the switching margin region, the divided stream can be switched without affecting the viewing video.

In a case where the switching of the divided stream according to the operation of the viewing position can be completed while the viewing position is located in the switching margin region, the switching can be performed without affecting the viewing video. However, in a case where the viewing position is operated at a moving speed that is too high to complete the switching of the divided stream, the switching response delay cannot be covered, and image quality degradation occurs. In particular, in the operation of the viewing position, the viewing direction (angle) is switched in a shorter time in a case of the movement of the object 10 by a short distance even at the same moving speed as compared with the movement by a long distance. In a region for solving the problem, the full acquisition region 40 is provided at the center.

The full acquisition region 40 is arranged at the center. For example, the full acquisition region 40 is arranged in the vicinity of the circumscribed sphere 16. A size of the full acquisition region 40 (a distance to the object 10) is adjusted to an appropriate size by the client on the basis of setting of the moving speed of the viewing position of the client. The full acquisition region 40 is a region where the response delay cannot be covered even with the switching margin region. Therefore, in the full acquisition region 40, all the divided streams are always acquired without performing adaptive acquisition of the divided stream according to the viewing direction in which switching of the divided stream is required. As a result, the full acquisition region 40 can cope with any viewing position/direction operation so that viewing can be performed without image quality degradation.

Figure 21:
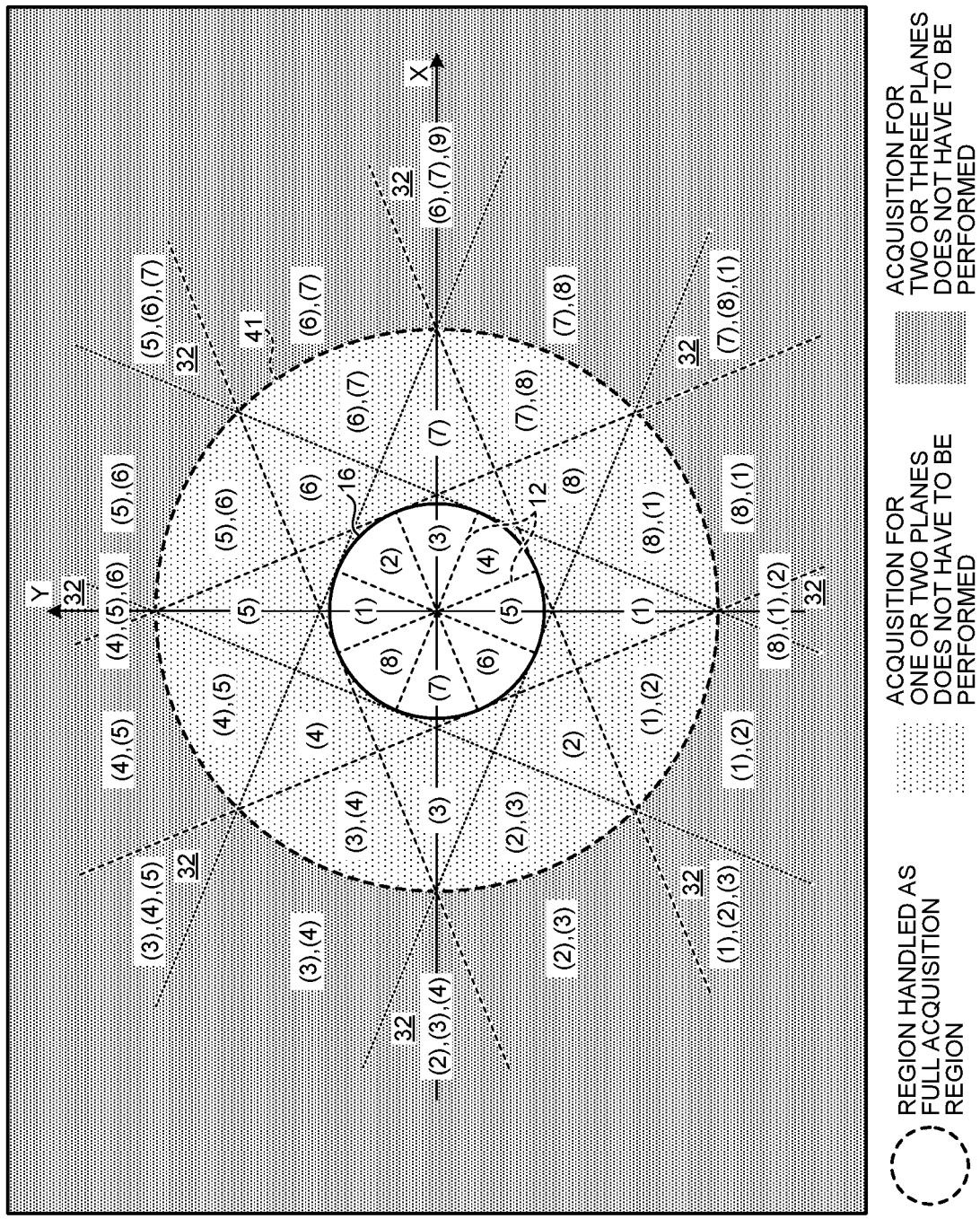
FIG. 21 is a diagram illustrating a region handled as a full acquisition region in the identification region map according to the second embodiment.

The full acquisition region 40 may be adjustable in size. FIG. 21 is a diagram illustrating a region handled as the full acquisition region 40 in the identification region map according to the second embodiment. In each region handled as the full acquisition region 40, the original number of divided streams that do not have to be acquired is one or two.

In each region around the full acquisition region 40, the original number of divided streams that do not have to be acquired is two or three. In FIG. 21, the pattern is changed depending on the number of divided streams that do not have to be acquired.

As illustrated in FIG. 21, regions in the vicinity of the object 10 include a region where the number of divided streams that do not have to be acquired is one and a region where the number of divided streams that do not have to be acquired is two, and regions outside a certain circular boundary line include a region where the number of divided streams that do not have to be acquired is two and a region where the number of divided streams that do not have to be acquired is three. For example, regions inside a circular boundary line 41 connecting vertexes of regions where the number of divided streams that do not have to be acquired is three on the circumscribed sphere 16 side include a region where the number of divided streams that do not have to be acquired is one and a region where the number of divided streams that do not have to be acquired is two. Regions outside the boundary line 41 include a region where the number of divided streams that do not have to be acquired is two and a region where the number of divided streams that do not have to be acquired is three. In an example of optimization of the identification region map illustrated in FIG. 16B, the circular boundary line 41 is used as the boundary line of the full acquisition region 40, and the region having a low reduction rate inside the boundary line 41 is set as the full acquisition region 40. In addition, region division is performed so that, among the regions outside the boundary line 41 where the number of divided streams that do not have to be acquired is two or three, the region 32 where the number of divided streams that do not have to be acquired is three is set as the switching margin region, and only the region where the number of divided streams that do not have to be acquired is two remains.

In the identification region map as illustrated in FIG. 16B, when the full acquisition region 40 is to be adjusted to be small, it is not sufficient to simply reduce a diameter of the full acquisition region 40 while keeping the current shape. When the full acquisition region 40 is reduced from the current size, a region where the number of divided streams that do not have to be acquired is one or two appears. The switching margin region where the number of divided streams that do not have to be acquired is one may be provided for a region where the number of divided streams that do not have to be acquired is two by the same method as the generation of the switching margin region described above. Then, the size of the full acquisition region 40 may be reduced by forming a layer including only a region where the number of divided streams that do not have to be acquired is one.

Figure 22A:
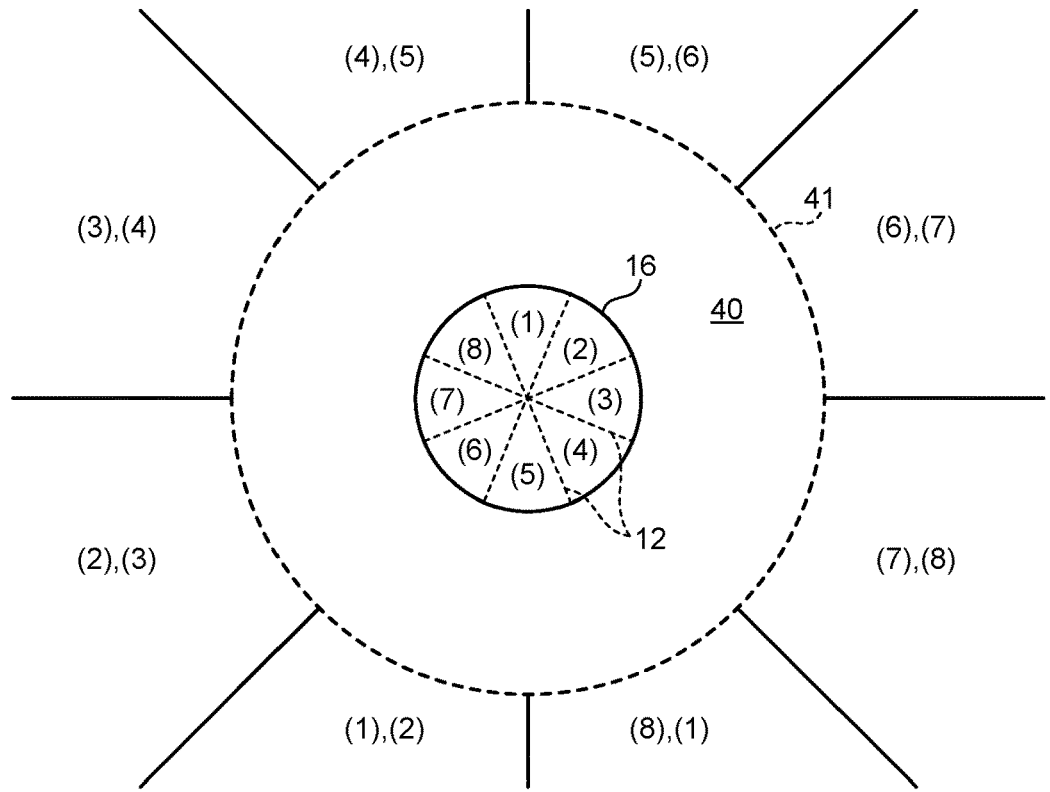
FIG. 22A is a diagram for describing the identification region map before reducing a size of the full acquisition region.
Figure 22B:
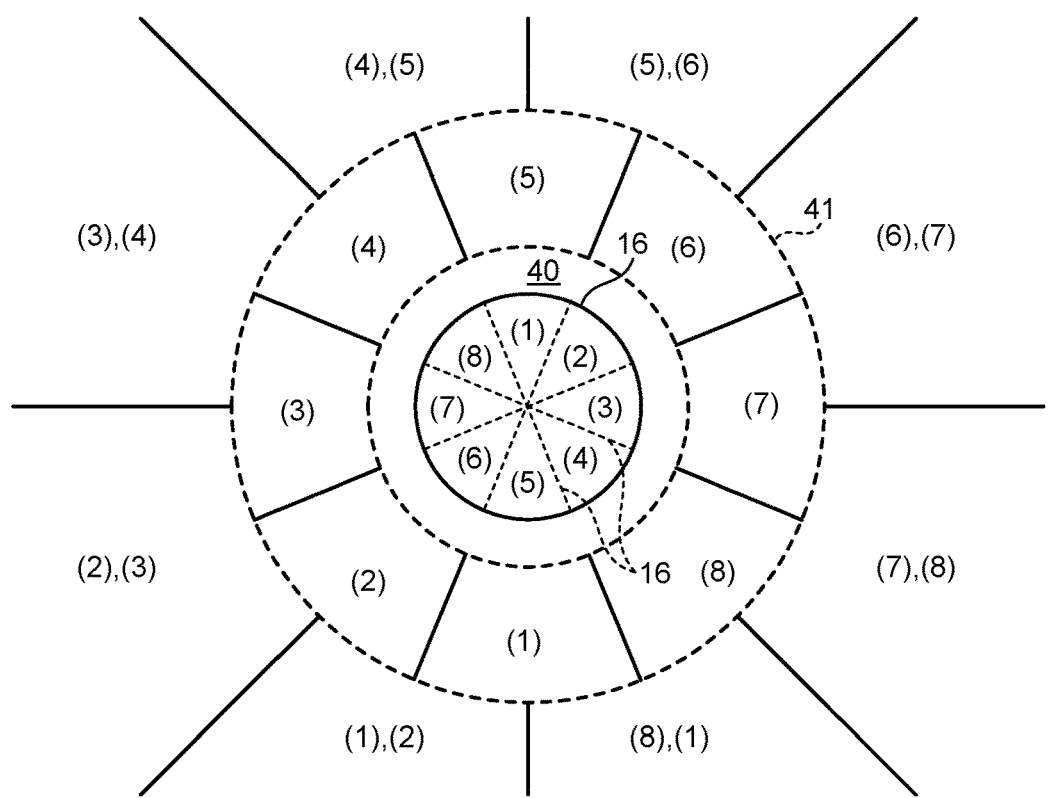
FIG. 22B is a diagram for describing an identification region map in which the size of the full acquisition region is reduced.

FIG. 22A is a diagram for describing the identification region map before reducing the size of the full acquisition region 40. FIG. 22B is a diagram for describing an identification region map in which the size of the full acquisition region 40 is reduced. FIG. 22B illustrates the identification region map in which the size of the full acquisition region 40 of the identification region map is reduced and having a two-layer structure.

Figure 23A:
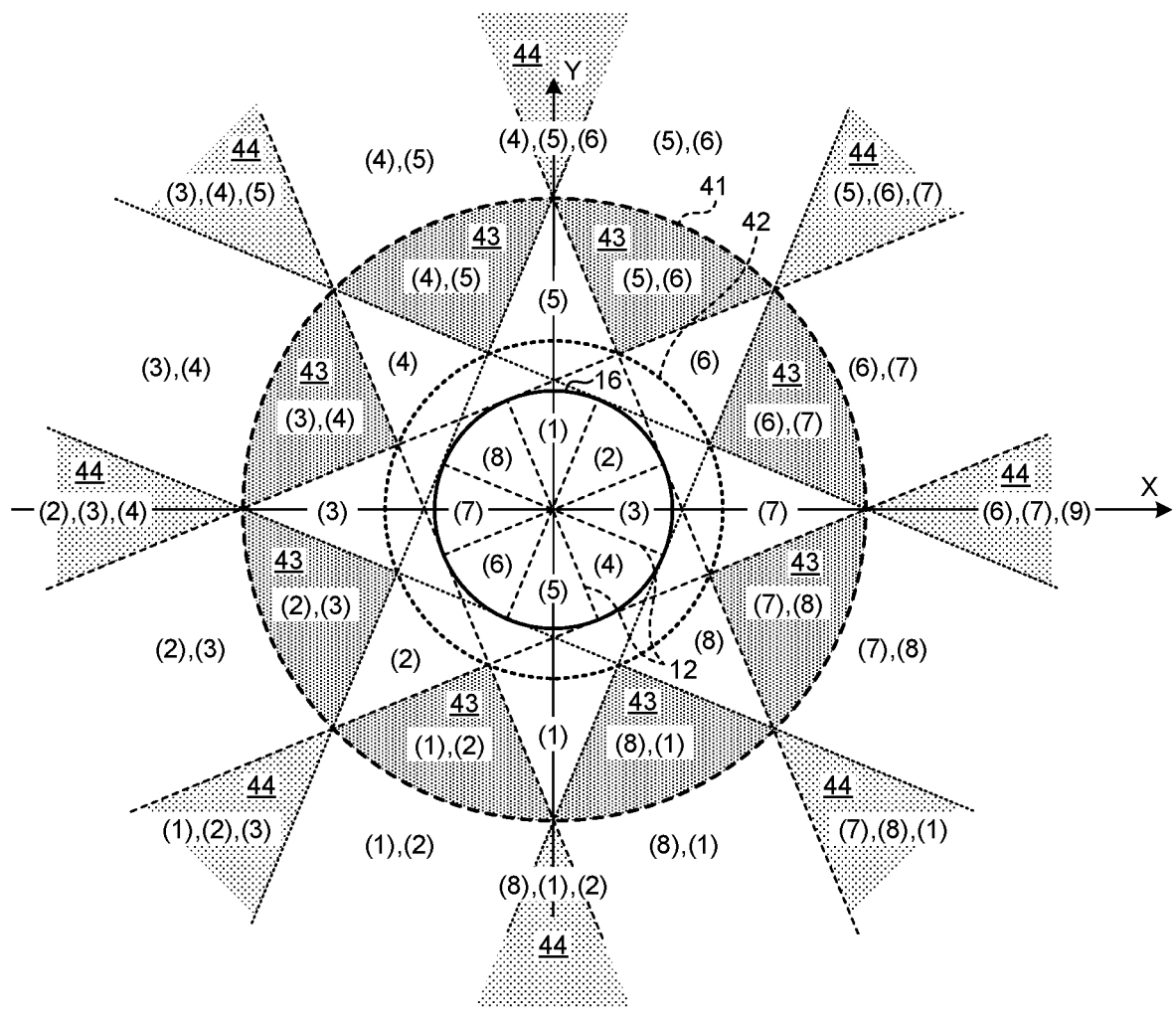
FIG. 23A is a diagram for describing generation of the identification region map having a two-layer structure according to the second embodiment.
Figure 23B:
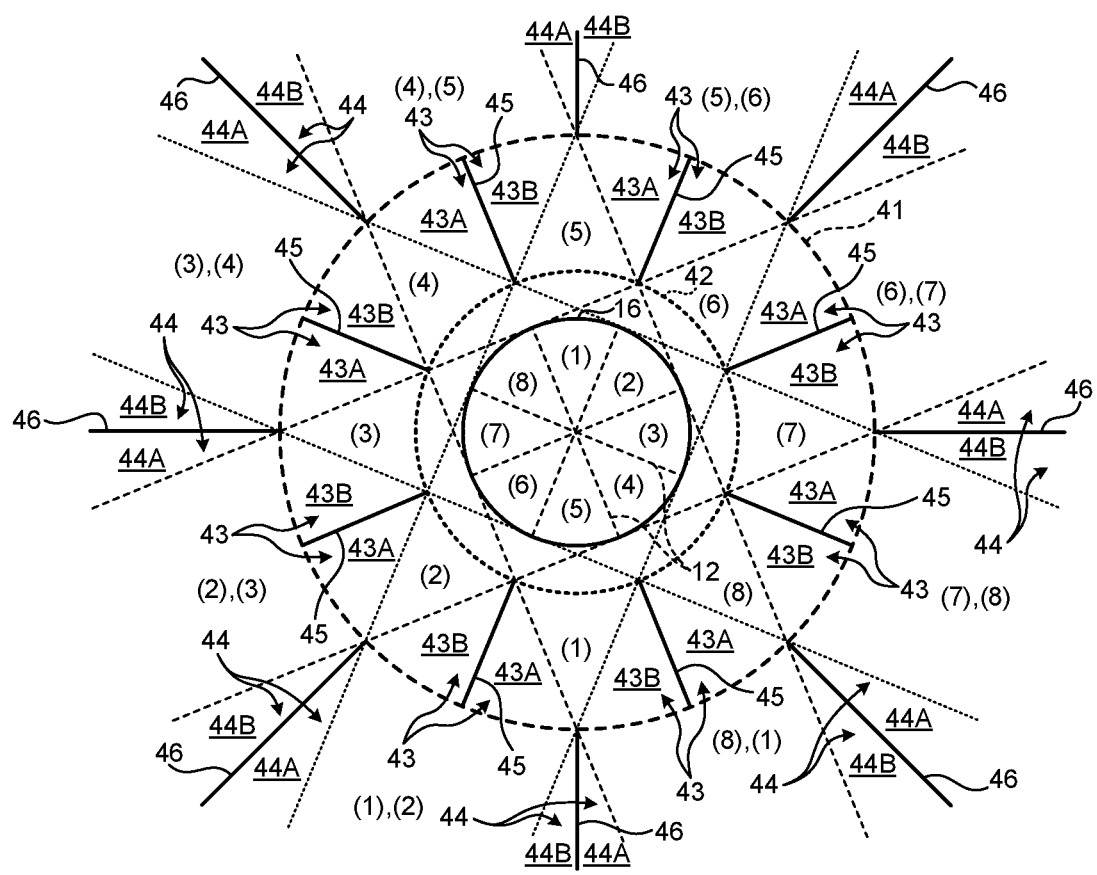
FIG. 23B is a diagram for describing generation of the identification region map having a two-layer structure according to the second embodiment.

A portion of the identification region map illustrated in FIG. 22A set as the full acquisition region 40 and a portion set as the identification region map will be described with reference to FIGS. 23A and 23B. FIGS. 23A and 23B are diagrams for describing generation of the identification region map having a two-layer structure according to the second embodiment. FIGS. 23A and 23B illustrates the identification region map illustrated in FIG. 16A.

In the identification region map illustrated in FIG. 23A, a region surrounded by a dotted line 42 is set as the full acquisition region 40 in the identification region map before optimization illustrated in FIG. 16A. In addition, a region 43 indicated by a dark dot pattern is handled as the switching margin region of the first layer, and a region 44 indicated by a light dot pattern is handled as the switching margin region of the second layer. A method of setting the region 43 as the switching margin region of the first layer is similar to the method of creating the switching margin region illustrated in FIGS. 18 and 19. As illustrated in FIG. 23B, a new boundary line 45 is drawn on a middle line of the region 43, and the region 43 is divided into divided regions 43a and 43b with the boundary line 45 as a boundary. Each of the divided regions 43a and 43b is changed so as to acquire in advance the stream that becomes visible when the viewing position is moved to an adjacent region. For example, the divided stream that does not have to be acquired in each of the divided regions 43a and 43b is the same as that in an adjacent region. Similarly, for the region 44 of the second layer, a new boundary line 46 is drawn on a middle line of the region 44, and the region 44 is divided into divided regions 44a and 44b with the boundary line 46 as a boundary. Each of the divided regions 44a and 44b is changed so as to acquire in advance the stream that becomes visible when the viewing position is moved to an adjacent region. As a result, it is possible to create the identification region map having the two-layer structure in which the size of the full acquisition region 40 is reduced as illustrated in FIG. 22B. In the identification region map having the two-layer structure illustrated in FIG. 22B, the divided stream does not have to be acquired even in the first layer, such that the network band can be more effectively utilized than in the identification region map having a single-layer structure illustrated in FIG. 22A in which the size of the full acquisition region 40 is large. For example, in a case where the speed of the operation of the viewing position is set to be low and the full acquisition region 40 need not have a large size, the client can utilize the network band more effectively by using the identification region map having the two-layer structure as compared with a case of using the identification region map having the single-layer structure in which the full acquisition region 40 has a large size.

Figure 24:
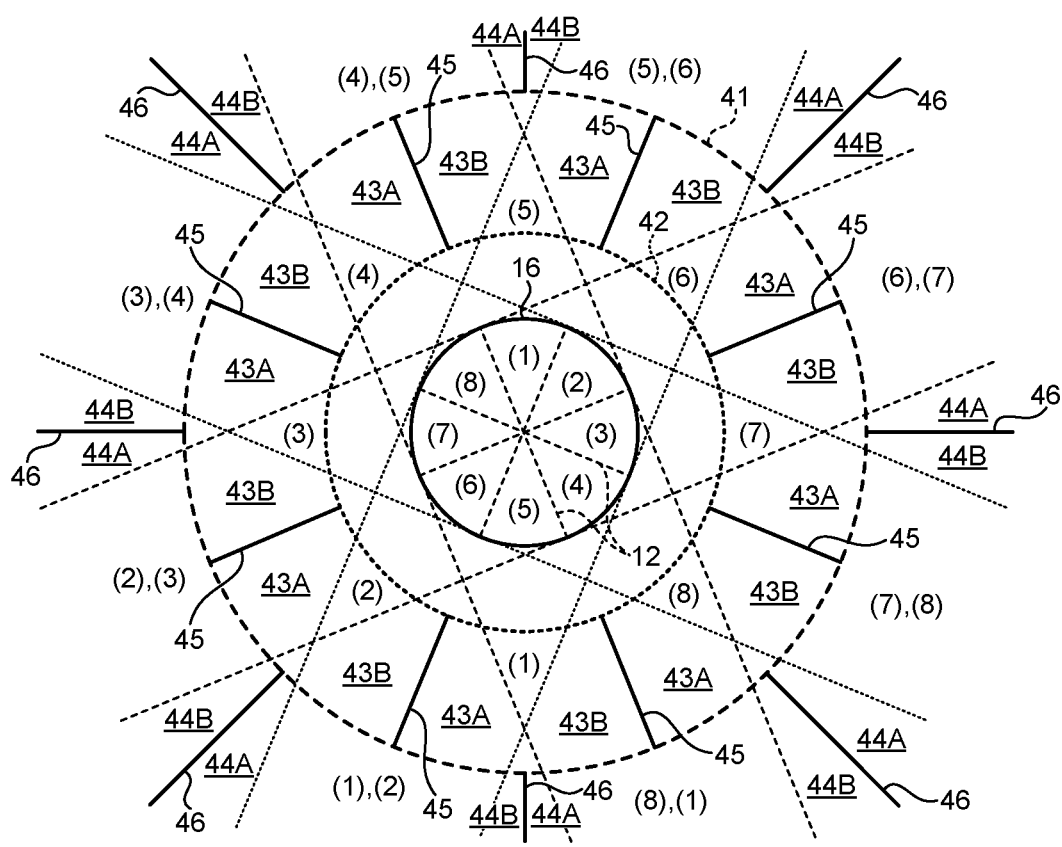
FIG. 24 is a diagram for describing generation of the identification region map having a two-layer structure according to the second embodiment.

Here, the example of the identification region map having the single-layer structure and the identification region map having the two-layer structure has been described. However, the size adjustment is not limited to these two options, and sizes of rings indicated by the boundary line 41 and the dotted line 42 can be changed in each layered structure to perform adjustment to an appropriate size. FIG. 24 is a diagram for describing generation of the identification region map having the two-layer structure according to the second embodiment. FIG. 24 illustrates an example in which the sizes of the rings of the boundary line 41 and the dotted line 42 in the optimized identification region map having the two-layer structure illustrated in FIG. 22B are slightly increased.

As described above, the identification region map can be optimized to have various shapes and sizes, that is, the identification region map can be optimized to have the single-layer structure or the two-layer structure, and the size of each ring can be finely adjusted. After generating the identification region map described in the first embodiment, the client optimizes the identification region map to have an optimum configuration capable of coping with the response delay for the switching of the divided stream from static parameters such as the setting of the moving speed of the viewing position of the client on the basis of the identification region map. Then, the client identifies the divided stream corresponding to the invisible direction on the basis of the optimized identification region map, and does not acquire the invisible divided stream or acquires the invisible divided stream with low definition.

Figure 25:
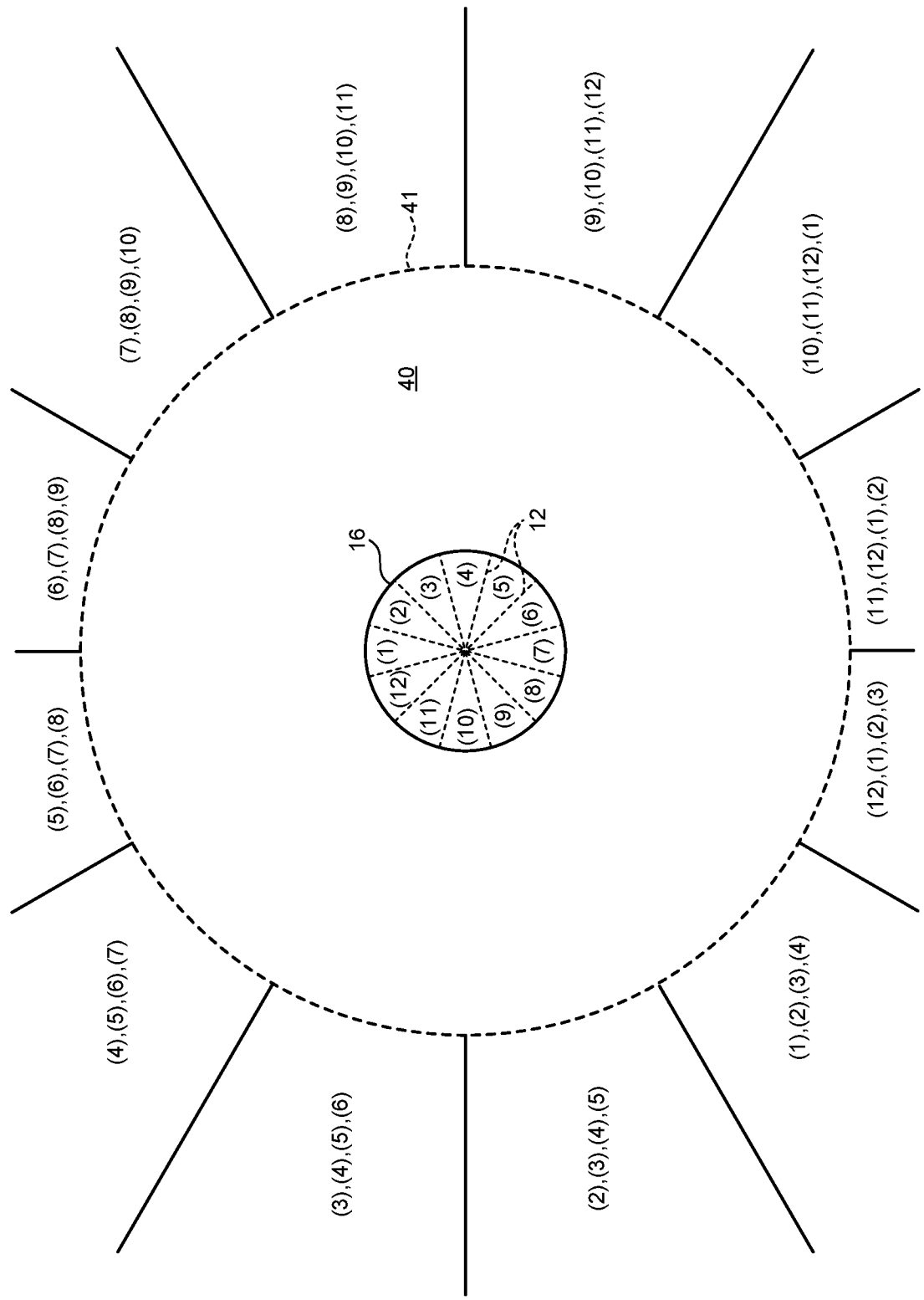
FIG. 25 is a diagram illustrating another example of the identification region map according to the second embodiment.
Figure 26:
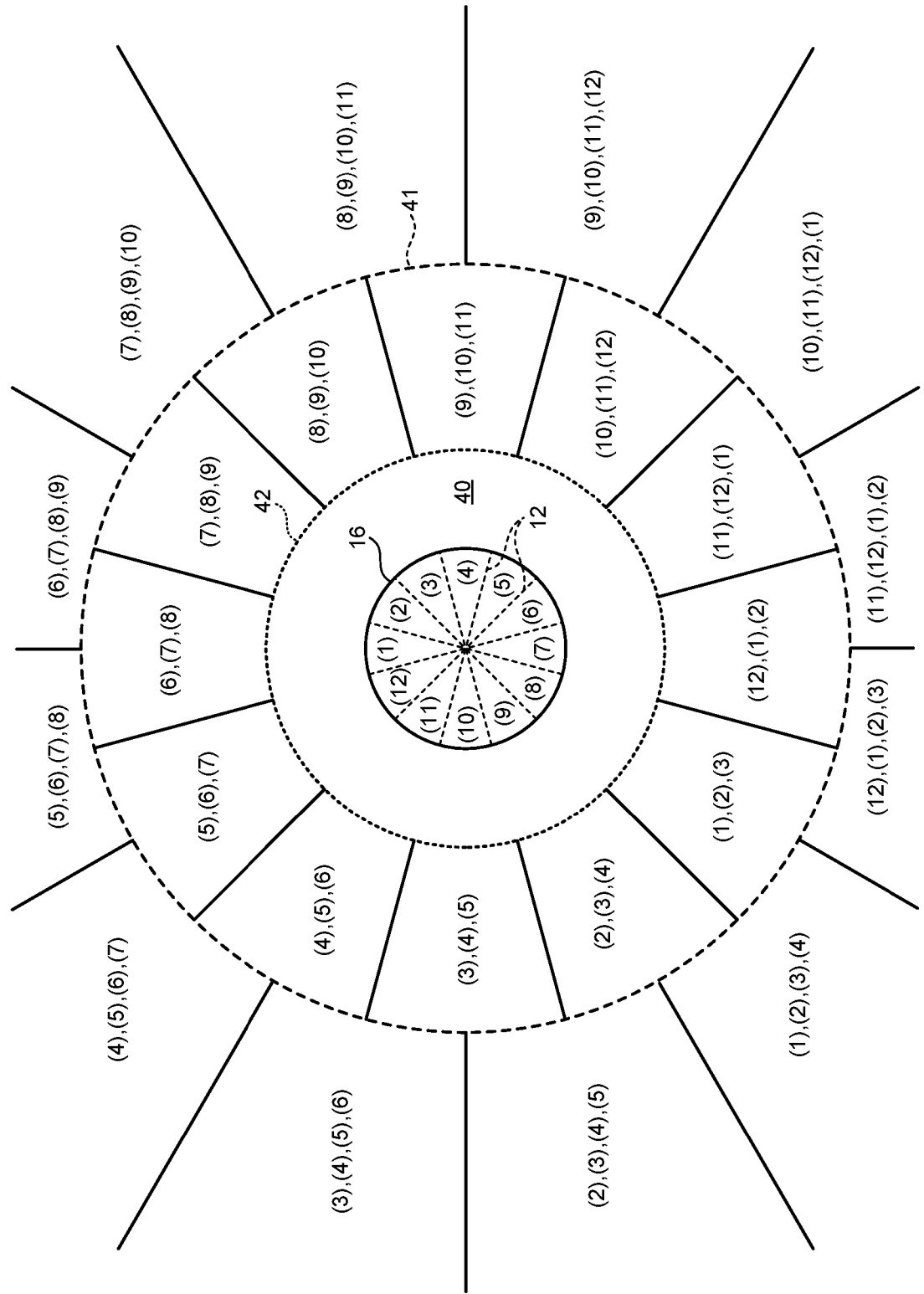
FIG. 26 is a diagram for describing the identification region map having a two-layer structure according to the second embodiment.

2-2. Another Example of Identification Region Map According to Second Embodiment Another example of the identification region map according to the second embodiment will be described. FIG. 25 is a diagram illustrating another example of the identification region map according to the second embodiment. FIG. 25 illustrates the identification region map of the 14-plane division illustrated in FIG. 12 to which the above-described two measures, (a) and (b), are applied. Numbers (1) to (12) indicating 12 divided streams corresponding to 12 projection planes in the horizontal direction are illustrated in the circumscribed sphere 16. The division boundary vector 12 serving as a boundary for projection on the respective projection planes is illustrated between the numbers (1) to (12) illustrated in the circumscribed sphere 16. In the respective regions, the numbers (1) to (12) of the divided streams that do not have to be acquired are indicated. FIG. 26 is a diagram for describing the identification region map having the two-layer structure according to the second embodiment. FIG. 26 illustrates the identification region map in which the size of the full acquisition region 40 of the identification region map illustrated in FIG. 25 is reduced and having the two-layer structure. A method of optimizing the identification region map illustrated in FIG. 26 can be similar to the method described with reference to FIGS. 23A and 23B, and fine adjustment of the size of the full acquisition region 40 as illustrated in FIG. 24 can be similarly performed.

2-3. Example of Configuration of Data Reproduction Device

Since a data reproduction device 100 according to the second embodiment has a configuration similar to the configuration of the data reproduction device 100 according to the first embodiment illustrated in FIG. 14, a description of the same parts will be omitted, and differences will be mainly described.

The generation unit 111 optimizes the generated identification region map, and generates the identification region map including a switching region for suppressing an influence of the switching of the divided stream according to a change of the viewing position on the image quality.

For example, in a case where the divided stream that does not need to be viewed in a first region of the identification region map needs to be viewed in a second region adjacent to the first region, the generation unit 111 generates the identification region map in which the switching margin region is provided as the switching region on a side of the first region that is adjacent to the second region. For example, the generation unit 111 generates the identification region map in which the divided stream that needs to be viewed in an adjacent region is acquired for a region where the number of divided streams that do not have to be acquired is larger than that in the adjacent region. For example, as illustrated in FIGS. 18 and 19, the generation unit 111 divides the region 32 where the number of divided streams that do not have to be acquired is the largest into the divided regions 32a and 32b. Then, the generation unit 111 generates the identification region map in which the divided regions 32a and 32b are set as the switching margin regions, and the divided streams that need to be viewed in the adjacent regions 34 and 35 are acquired.

Furthermore, for example, the generation unit 111 generates the identification region map in which the full acquisition region where the divided streams of all the projection planes are acquired is provided as the switching region. For example, as illustrated in FIG. 16B, the generation unit 111 generates the identification region map in which the vicinity of the circumscribed sphere 16 of the object 10 is set as the full acquisition region 40. The generation unit 111 outputs the generated identification boundary map to the acquisition unit 110.

In a case where the identification boundary map is input from the generation unit 111, the acquisition unit 110 selects and acquires the divided stream according to the viewing position by using the identification region map. For example, the acquisition unit 110 uses the identification region map to identify the divided stream corresponding to the invisible direction according to a region in which the viewing position is located. Then, the acquisition unit 110 acquires the visible divided stream with high definition, and does not acquire the invisible divided stream or acquires the invisible divided stream with low definition.

2-4. Flow of Reproduction Processing

Figure 27:
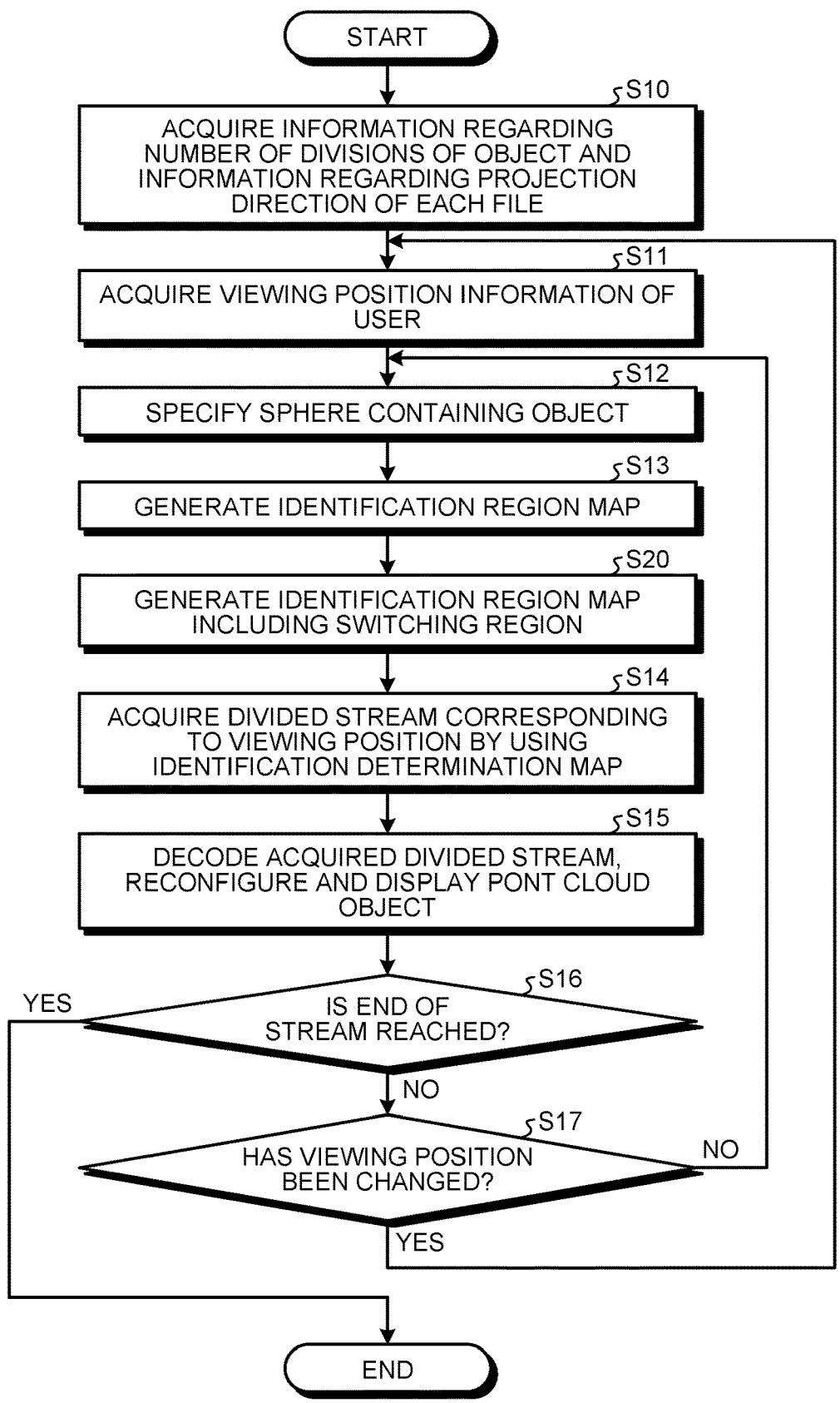
FIG. 27 is a flowchart for describing reproduction processing according to the second embodiment.

Next, a flow of reproduction processing according to the second embodiment will be described. FIG. 27 is a flowchart for describing the reproduction processing according to the second embodiment. Since the reproduction processing according to the second embodiment is partially the same as the reproduction processing according to the first embodiment illustrated in FIG. 15, the same processings are denoted by the same reference signs, a description thereof is omitted, and differences between the processings will be mainly described.

After Step S13, the generation unit 111 optimizes the generated identification region map, and generates the identification region map including the switching region for suppressing an influence of the switching of the divided stream on the image quality (Step S20). For example, in a case where the divided stream that does not need to be viewed in the first region of the identification region map needs to be viewed in the second region adjacent to the first region, the generation unit 111 generates the identification region map in which the switching margin region is provided as the switching region on a side of the first region that is adjacent to the second region. Furthermore, for example, the generation unit 111 generates the identification region map in which the full acquisition region 40 where the divided streams of all the projection planes are acquired is provided as the switching region.

2-5. Effects of Second Embodiment

As described above, in the data reproduction device 100 according to the second embodiment, the generation unit 111 generates the identification region map including the switching region for suppressing an influence of the switching of the divided stream according to a change of the viewing position on the image quality. As a result, even in a case where the divided stream is switched on the basis of the identification region map, the data reproduction device 100 can suppress the influence of the switching of the divided stream on the image quality.

Furthermore, in a case where the divided stream that does not need to be viewed in the first region of the identification region map needs to be viewed in the second region adjacent to the first region, the generation unit 111 generates the identification region map in which the switching margin region is provided as the switching region on a side of the first region that is adjacent to the second region. In the switching margin region, the divided stream that does not need to be viewed is acquired. As a result, the data reproduction device 100 can start acquisition of the divided stream that needs to be viewed in the second region, in the switching margin region when the viewing position is moved from the first region to the second region, such that it is possible to suppress the influence of the switching of the divided stream on the image quality.

In addition, the generation unit 111 generates the identification region map in which the full acquisition region where the divided streams of all the projection planes are acquired is provided as the switching region. Since the divided streams of all the projection planes are acquired in the full acquisition region 40, it is possible to suppress the influence on the image quality even in a case where the speed of the movement of the viewing position is high.

3. Third Embodiment

Next, a third embodiment will be described. In the third embodiment, a case where the shape of the identification region map is dynamically switched according to the operation speed of the viewing position and a network band situation will be described.

Meanwhile, the appropriate sizes of the switching margin region and the full acquisition region 40 described in the second embodiment dynamically vary according to the moving speed of the viewing position and the network band. Therefore, in a static identification region map in which a region is statically determined, image quality degradation may occur without being able to cope with the movement of the viewing position, and overall image quality reduction, reproduction interruption, and the like may occur due to the unnecessary use of the network band.

Therefore, in the third embodiment, the sizes of the switching margin region and the full acquisition region 40 are dynamically switched to appropriate sizes/shapes in accordance with the moving speed of the viewing position and the situation of the network band and the like, and the divided stream is selected on the basis of the identification region map.

3-1. Characteristics of Identification Region Map

Figure 28A:
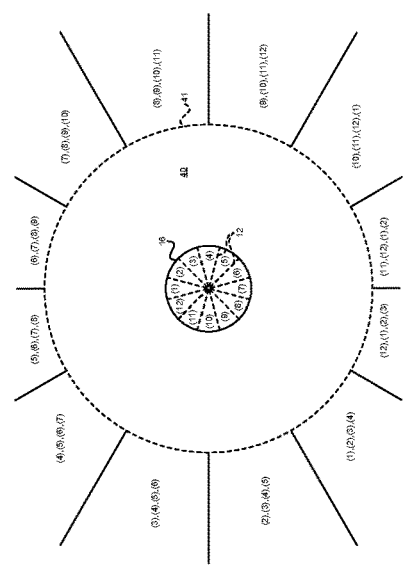
FIGS. 28A, 28B and 28C are diagrams for describing characteristics of the identification region map.
Figure 28B:
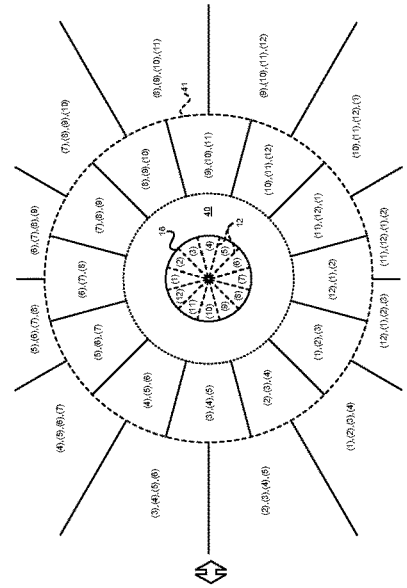
Figure 28C:
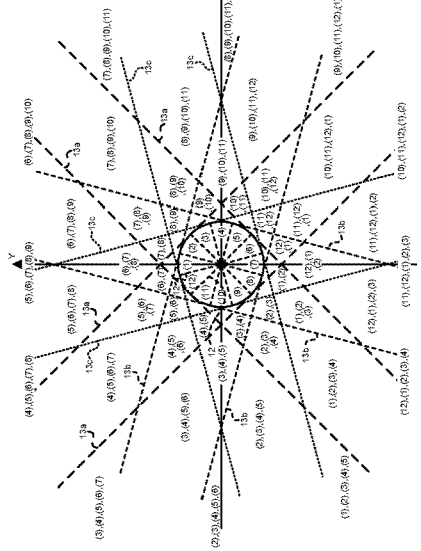

FIGS. 28A, 28B and 28C are diagrams for describing characteristics of the identification region map. FIGS. 28A, 28B and 28C illustrate identification region maps, respectively. FIG. 28(A) illustrates the identification region map of the 14-plane division illustrated in FIG. 12. FIG. 28(B) illustrates the identification region map having the two-layer structure of the 14-plane division illustrated in FIG. 26. FIG. 28(C) illustrates the identification region map having the single-layer structure of the 14-plane division illustrated in FIG. 25.

In the identification region map of FIG. 28 (A), in a case where the divided stream is switched according to the viewing position by using the identification region map, image quality degradation may occur during the switching response delay. However, in the identification region map of FIG. 28 (A), the reduction rate of the divided stream is the highest, and the network band can be most effectively utilized. Therefore, the identification region map of FIG. 28 (A) is suitable for a case where the movement of the object 10 or the viewing position is small or a case where there is no margin in the network band.

In the identification region map of FIG. 28(B), as the size of the full acquisition region 40 having the two-layer structure is reduced, the reduction rate of the divided stream is improved. The identification region map of FIG. 28(B) is less likely to cause image quality degradation due to the switching response delay, and is balanced with performance in effective utilization of the network band. Therefore, the identification region map of FIG. 28(B) is suitable for a case where the object 10 or the viewing position is moved to some extent or a case where there is a margin in the network band to some extent.

In the identification region map of FIG. 28(C), the size of the full acquisition region 40 is increased to cope with the quick operation of the viewing position. In the identification region map of FIG. 28(C), an effect as viewing direction adaptive distribution is the smallest as the size of the full acquisition region 40 is large. However, the identification region map of FIG. 28(C) can cope with the quick operation of the viewing position, and the risk of the image quality degradation is the smallest. Therefore, the identification region map of FIG. 28(C) is suitable for a case where the object 10 and the viewing position move much or a case where there is a margin in the network band.

As described above, suitability of the identification region map varies depending on the shape of each region. A factor that influences the suitability of the identification region map includes the moving speed of the viewing position and the network band, which vary dynamically. The client selects the divided stream on the basis of the identification region map while dynamically switching the identification region map to an appropriate shape in accordance with the moving speed of the viewing position and the dynamic variation of the network band. For example, the client monitors whether or not the moving speed of the viewing position operated by the user can be covered by the switching margin region of the current identification region map. For example, the client determines whether or not the divided stream can be switched within the switching margin region when the viewing position is moved at the moving speed. In a case where the divided stream cannot be switched within the switching margin region, the client determines that the moving speed cannot be covered by the switching margin region. In a case where the viewing position is moved at the moving speed that cannot be covered by the switching margin region, the client increases the size of the full acquisition region 40 such that the current viewing position becomes the full acquisition region 40. That is, the identification region map is switched from adaptive acquisition to full acquisition.

In addition, during the movement of the viewing position, the client always measures a staying time of the viewing position in each region obtained by performing region division in the original identification region map. In a case where the viewing position stays in the same region for a certain period of time or more determined by the client, the client determines that the movement of the viewing position is stopped in the staying region. The client releases the full acquisition regions 40 for the viewing position whose movement is stopped, returns to the original identification region map before the switching, and selects and acquires the divided stream corresponding to the viewing position in the original identification region map before the switching.

Figure 29A:
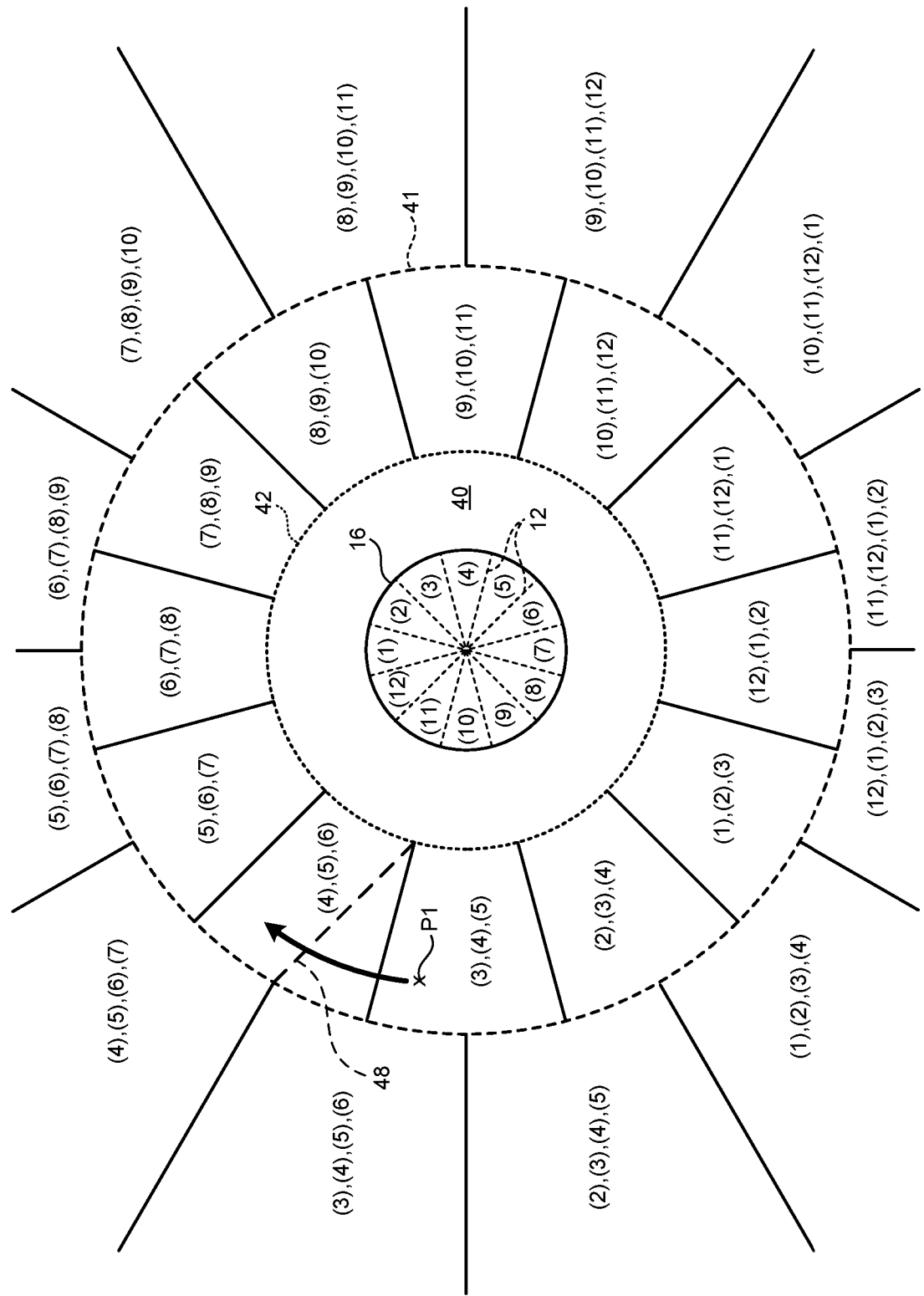
FIG. 29A is a diagram for describing dynamic switching of the identification region map.

<3-2. Dynamic Switching of Identification Region Map>FIGS. 29A, 29B and 29C are diagrams for describing dynamic switching of the identification region map. FIGS. 29A, 29B and 29C illustrate an example of the dynamical switching of the identification region map. A case where the viewing position is moved from a position P1 is illustrated. For example, the client monitors whether or not the moving speed of the viewing position can be covered by the switching margin region in the identification region map of FIG. 29A. For example, the client determines whether or not the divided stream has been switched up to a margin boundary 48 set in a region 43 set as the switching margin region. Note that the client may monitor whether or not the moving speed of the viewing position can be covered by the switching margin region by using another method.

In a case where the viewing position is moved at a moving speed that cannot be covered by the switching margin region, the client switches the identification region map so that the current viewing position is in the full acquisition region 40 as illustrated in FIG. 29B. In a case where the viewing position stays in the same region for a certain period of time or more, the client determines that the movement of the viewing position is stopped in the region, and switches the identification region map as illustrated in FIG. 29C. Note that the identification region maps for dynamic switching is not limited to those three in FIGS. 29A, 29B and 29C. For example, switching from FIG. 29C to the identification region map in which the size of the full acquisition region 40 is larger may be performed.

As described above, the client dynamically varies the shape of the identification region map according to the situation, such that it is possible to suppress image quality degradation due to the response delay for the switching of the divided stream while reducing the used band.

3-3. Example of Configuration of Data Reproduction Device

Since a data reproduction device 100 according to the third embodiment has a configuration similar to the configuration of the data reproduction device 100 according to the first embodiment illustrated in FIG. 14, a description of the same parts will be omitted, and differences will be mainly described.

The generation unit 111 generates the identification region map by adjusting the size and shape of the switching region according to the variation of the viewing position. The generation unit 111 dynamically adjusts the sizes of the switching margin region and the full acquisition region 40 to balanced appropriate sizes according to the moving speed of the viewing position and the band of the network with the server.

For example, the generation unit 111 monitors whether or not the moving speed of the viewing position can be covered by the switching margin region. For example, the generation unit 111 determines whether or not the divided stream has been switched up to the margin boundary 48 set in the region 43 set as the switching margin region. In a case where the viewing position is moved at a moving speed that cannot be covered by the switching margin region, the generation unit 111 switches the identification region map so that the current viewing position is in the full acquisition region 40.

In addition, in a case where the viewing position stays in the same region for a certain period of time or more, the generation unit 111 releases the full acquisition region 40 for the viewing position and returns to the original identification region map before the switching.

Furthermore, in a case where the network band is narrow and there is no margin for a divided stream communication amount, the generation unit 111 generates the identification region map in which the switching region is reduced in size or eliminated. The generation unit 111 outputs the identification boundary map to the acquisition unit 110.

In a case where the identification boundary map is input from the generation unit 111, the acquisition unit 110 selects and acquires the divided stream according to the viewing position by using the identification region map. For example, the acquisition unit 110 uses the identification region map to identify the divided stream corresponding to the invisible direction according to a region in which the viewing position is located. Then, the acquisition unit 110 acquires the visible divided stream with high definition, and does not acquire the invisible divided stream or acquires the invisible divided stream with low definition.

3-4. Flow of Reproduction Processing

Figure 30:
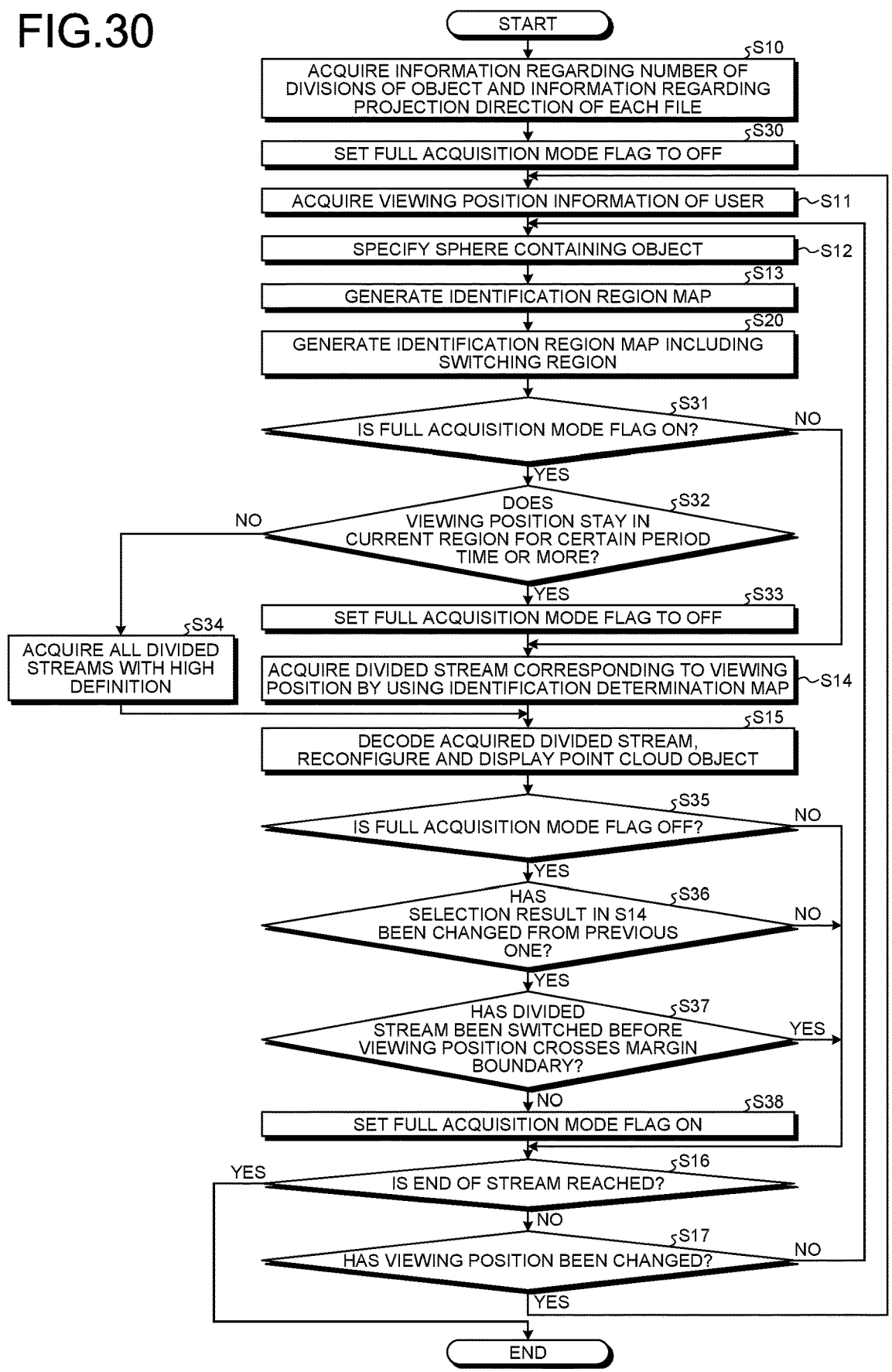
FIG. 30 is a flowchart illustrating reproduction processing according to a third embodiment.

Next, a flow of reproduction processing according to the third embodiment will be described. FIG. 30 is a flowchart illustrating reproduction processing according to the third embodiment. Since the reproduction processing according to the third embodiment is partially the same as the reproduction processing according to the second embodiment illustrated in FIG. 27, the same processings are denoted by the same reference signs, a description thereof is omitted, and differences between the processings will be mainly described.

After Step S10, the generation unit 111 sets a full acquisition mode flag to OFF (Step S30). Here, in the reproduction processing according to the third embodiment, by turning on and off the full acquisition mode flag, the viewing position is switched to the full acquisition region 40 in a pseudo manner without actually changing the identification region map.

After Step S20, the generation unit 111 determines whether or not the full acquisition mode flag is ON (Step S31). In a case where the full acquisition mode flag is OFF (Step S31: No), the processing proceeds to Step S14.

On the other hand, in a case where the full acquisition mode flag is ON (Step S31: Yes), the generation unit 111 determines whether or not the viewing position stays in the same region for a certain period of time or more (Step S32). In a case where the viewing position stays in the same region for a certain period of time or more (Step S32: Yes), the generation unit 111 sets the full acquisition mode flag to OFF (Step S33), and proceeds to Step S14.

On the other hand, in a case where the viewing position does not stay in the same region for a certain period of time or more (Step S32: No), the acquisition unit 110 acquires all the divided streams with high definition (Step S34), and proceeds to Step S15.

After Step S15, the generation unit 111 determines whether or not the full acquisition mode flag is OFF (Step S35). In a case where the full acquisition mode flag is ON (Step S35: No), the processing proceeds to Step S16.

On the other hand, in a case where the full acquisition mode flag is OFF (Step S35: Yes), the generation unit 111 determines whether or not the divided stream selection result in Step S14 has been changed from the previous one (Step S36). In a case where the selection result has not been changed from the previous one (Step S36: No), the processing proceeds to Step S16.

In a case where the selection result has been changed from the previous one (Step S36: Yes), the generation unit 111 determines whether or not the divided stream has been switched up to the margin boundary 48 (Step S37). In a case where the divided stream has been switched (Step S37: Yes), the processing proceeds to Step S16.

On the other hand, in a case where the divided stream has not been switched (Step S37: No), the generation unit 111 sets the full acquisition mode flag to ON (Step S38), and proceeds to Step S16.

3-5. Effects of Third Embodiment

As described above, in the data reproduction device 100 according to the third embodiment, the generation unit 111 generates the identification region map by adjusting the size and shape of the switching region according to the variation of the viewing position. As a result, in the data reproduction device 100, even in a case where the change of the viewing position fluctuates, it is possible to suppress the degradation of the image quality of the viewing video while reducing the network band used in the distribution of the divided stream. In addition, the data reproduction device 100 can suppress image quality degradation caused by the change of the viewing position that cannot be coped with by the static identification region map and the unnecessary use of the network band.

4. Fourth Embodiment

Next, a fourth embodiment will be described. In the fourth embodiment, a case of optimizing an acquisition order of the divided streams in order to minimize image quality degradation in a case where the identification region map is dynamically switched to full acquisition.

In the third embodiment, the shape of the identification region map is dynamically switched, and dynamic switching from a region where the invisible divided stream does not have to be acquired to the full acquisition region is performed according to the operation of the viewing position/direction of the user. However, in a case where all the divided streams that have not been acquired so far or have been acquired with low definition start to be acquired at the same time, a long switching time is required, and a time for which image quality degradation occurs becomes longer accordingly.

Therefore, in the fourth embodiment, a case of performing acquisition from the divided stream that becomes visible (affects the video) in a moving direction (moving destination) of a user operation in a case where the divided stream that has not been acquired so far or has been acquired with low definition is acquired will be described.

Figure 31:
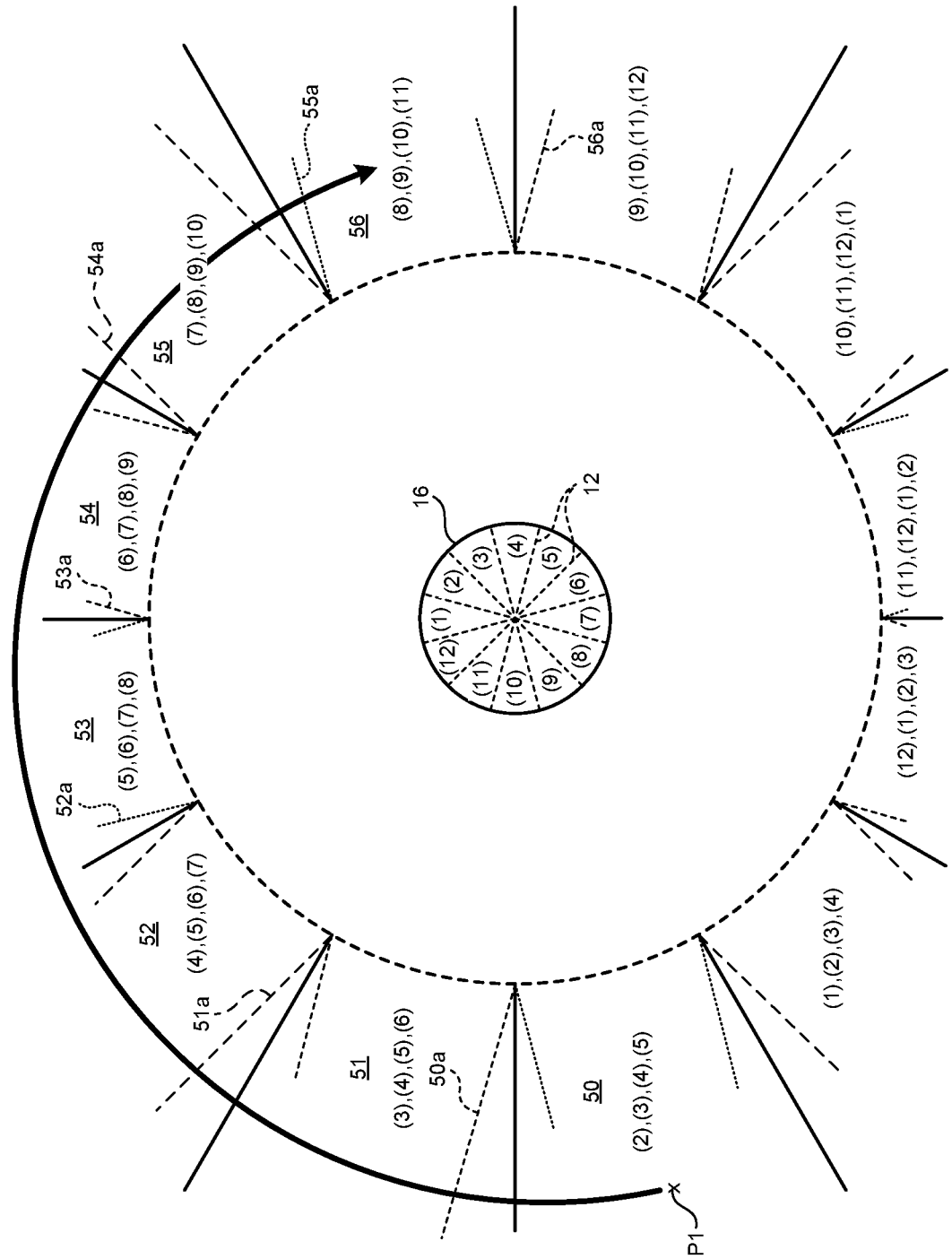
FIG. 31 is a diagram for describing an acquisition order of divided streams in a case where the identification region map is dynamically switched to full acquisition.

FIG. 31 is a diagram for describing an acquisition order of the divided streams in a case where the identification region map is dynamically switched to full acquisition. Numbers (1) to (12) indicating 12 divided streams corresponding to 12 projection planes in the horizontal direction are illustrated in the circumscribed sphere 16. In the respective regions, the numbers (1) to (12) of the divided streams that do not have to be acquired are indicated.

FIG. 31 illustrates an example in which the viewing position is moved from a position P1 to regions 50 to 56 at a high speed, and switching from adaptive acquisition (the divided streams (2), (3), (4), and (5) do not have to be acquired) according to the region 50 to full acquisition is performed. The client attempts to acquire the divided streams (2), (3), (4), and (5) that have not been acquired so far or have been acquired with low definition in the region 50, with high definition. However, in a case where the client starts acquisition of all the divided streams (2), (3), (4), and (5) with high definition at the same time, a long acquisition time is required, and accordingly, a time for which image quality degradation occurs becomes longer. On the other hand, in the movement of the viewing position illustrated in FIG. 31, the divided streams (2)→(3)→(4)→(5) are viewed in this order with respect to the moving direction. FIG. 31 illustrates a boundary line 50a requiring the stream (2), a boundary line 51a requiring the stream (3), a boundary line 52a requiring the stream (4), and a boundary line 53a requiring the stream (5).

In a case where the acquisition of the stream (2) is not completed before the position P1 crosses the nearest boundary line 50a, image quality degradation occurs. Therefore, it is necessary to complete the acquisition of the stream (2) immediately. On the other hand, in a case where the acquisition of the stream (5) is completed before the position P1 crosses the boundary line 53a, image quality degradation does not occur. Therefore, it is not necessary to immediately start the acquisition of the stream (5). The client does not start acquisition of all the streams (2), (3), (4), and (5) with high definition at the same time, but acquires the divided streams in order of visibility (necessity) with respect to the moving direction of the viewing position according to the user operation. In FIG. 31, since the divided streams (2), (3), (4), and (5) need to be viewed in this order, the client acquires the divided streams (2), (3), (4), and (5) in this order. As a result, the client can implement dynamic switching to full acquisition in which the time for which the image quality degradation in the viewing video occurs is minimized.

4-1. Example of Configuration of Data Reproduction Device

Since a data reproduction device 100 according to the fourth embodiment has a configuration similar to the configuration of the data reproduction device 100 according to the first embodiment illustrated in FIG. 14, a description of the same parts will be omitted, and differences will be mainly described.

In a case where viewing of a plurality of divided streams that do not need to be viewed becomes necessary due to the movement of the viewing position, the acquisition unit 110 acquires the divided streams in order of necessity of viewing caused by the movement of the viewing position. For example, in a case where the identification region map has been dynamically switched to full acquisition, but acquisition of all the divided streams with high definition has not been made, the acquisition unit 110 acquires the divided streams with high definition in order of necessity of high definition with respect to the moving direction of the viewing position.

4-2. Flow of Reproduction Processing

Figure 32:
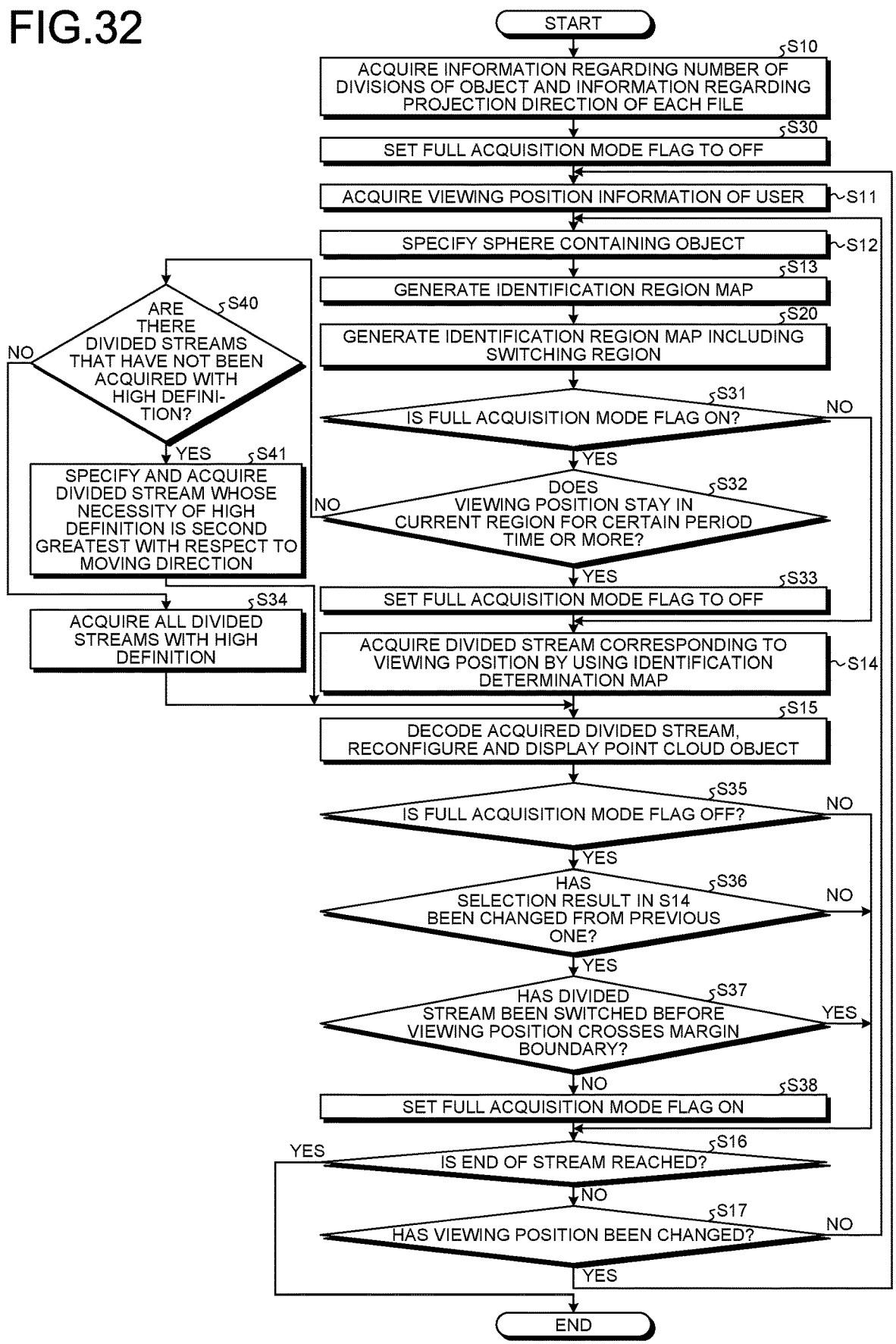
FIG. 32 is a flowchart for describing reproduction processing according to a fourth embodiment.

Next, a flow of reproduction processing according to the fourth embodiment will be described. FIG. 32 is a flowchart for describing the reproduction processing according to the fourth embodiment. Since the reproduction processing according to the fourth embodiment is partially the same as the reproduction processing according to the third embodiment illustrated in FIG. 30, the same processings are denoted by the same reference signs, a description thereof is omitted, and differences between the processings will be mainly described.

In a case where the viewing position does not stay in the same region for a certain period of time or more (Step S32: No), the acquisition unit 110 determines whether or not there are divided streams that have not been acquired with high definition (Step S40). In a case where all the divided streams have been acquired with high definition (Step S40: No), the processing proceeds to Step S34.

On the other hand, in a case where there are divided streams that have not been acquired with high definition (Step S40: Yes), the acquisition unit 110 acquires the divided streams in order of necessity of high definition with respect to the moving direction of the viewing position (Step S41), and the processing proceeds to Step S15. For example, the acquisition unit 110 specifies the divided stream whose necessity of high definition is the second greatest with respect to the moving direction of the viewing position among the divided streams that have not been acquired with high definition. The acquisition unit 110 acquires the specified divided stream and the divided stream originally acquired with high definition, with high definition, and does not acquire the remaining divided streams or acquires the remaining divided streams with low definition.

4-3. Effects of Fourth Embodiment

As described above, in the data reproduction device 100 according to the fourth embodiment, in a case where viewing of a plurality of divided streams that do not need to be viewed becomes necessary due to the movement of the viewing position, the acquisition unit 110 acquires the divided streams in order of necessity of viewing caused by the movement of the viewing position. As a result, in the data reproduction device 100, it is possible to reduce the time for which image quality degradation occurs in the viewing video due to the movement of the viewing position.

5. Fifth Embodiment

Next, a fifth embodiment will be described. In the first to fourth embodiments, a case where the number of divisions of the object 10 is changed, such as the 6-plane division, the 10-plane division, and the 14-plane division, has been described. In the fifth embodiment, a case where the client requests the server to change the number of divisions of the object 10 will be described.

Meanwhile, the client has the number of divisions of the object 10 suitable for processing. For example, the optimization processing performed on the identification region map described in the second embodiment copes with image quality degradation due to the switching response delay by partially sacrificing the reduction rate of the region with a high reduction rate. For this reason, in a case of 6-plane division distribution in which the number of planes on which data that does not have to be acquired is projected is only one at the maximum, the client cannot perform the optimization processing on the identification region map described in the second embodiment and cannot cope with the image quality degradation due to the switching response delay.

Therefore, in the fifth embodiment, the server can change the number and arrangement of the projection planes of the object 10 as designated by the client. The acquisition unit 110 transmits a change request designating the number and arrangement of the projection planes. For example, the acquisition unit 110 requests the server for the number of divisions desired to be used. For example, in a case of divided stream distribution of the 6-plane division, the client requests the server for the number of divisions desired to be used, by a query parameter of a URL or the like. The server generates the divided stream according to the requested number of divisions, signals the corresponding projection direction to the divided stream, and distributes the divided stream. The acquisition unit 110 receives the distributed divided stream corresponding to the number of divisions desired to be used, and selects the divided stream on the basis of the identification region map while performing generation of the identification region map according to the number of divisions, optimization of the identification region map, dynamic switching of the identification region map, and the like.

5-1. Change Sequence of Number of Divisions

FIG. 33 is a sequence diagram for describing the change of the number of divisions according to the fifth embodiment.

On the client side, the acquisition unit 110 transmits a request for acquisition of a content including the object 10 in the three-dimensional space to the server (Step S50).

In response to the request from the client, the server divides the object 10 of the content by a predetermined number of divisions, signals projection direction information to the divided streams, and distributes the divided streams (Step S51).

On the client side, the acquisition unit 110 determines whether or not the number of divisions for the distributed divided streams is the number of divisions desired to be used (Step S52). In a case where the number of divisions for the distributed divided streams is the number of divisions desired to be used (Step S52: Yes), the processing proceeds to Step S56 as described later.

On the other hand, in a case where the number of divisions for the distributed divided streams is not the number of divisions desired to be used (Step S52: No), on the client side, the acquisition unit 110 requests the server for the number of divisions desired to be used (Step S53). In the example of FIG. 33, "divN=14" is added to the request to request the 14-plane division.

The server starts generation of the divided streams corresponding to the number of divisions that has been requested by the client (Step S54), and distributes the divided streams (Step S55).

The client performs the above-described reproduction processing on the basis of the divided streams corresponding to the number of divisions desired to be used, and performs generation of the identification region map according to the number of divisions, optimization of the identification region map, dynamic switching of the identification region map, and the like (Step S56). In addition, the client selects the divided stream on the basis of the identification region map (Step S57). For example, the client requests the server to acquire the divided stream required in the identification region map with high definition, and not to acquire an unnecessary divided stream or to acquire an unnecessary divided stream with low definition.

In this manner, the client requests the number of divisions for which the optimization processing can be performed, and on the server side, the divided streams corresponding to the requested number of divisions are generated and distributed to the client, such that the client can optimize the identification region map. As a result, the client can perform adaptive acquisition of the divided stream according to the viewing position while minimizing the occurrence of image quality degradation due to the switching response delay.

5-2. Effects of Fifth Embodiment

As described above, in the data reproduction device 100 according to the fifth embodiment, the acquisition unit 110 transmits the change request designating the number and arrangement of the projection planes to the server, and acquires the divided stream of the projection plane on which the object 10 is projected according to the designated number and arrangement of the projection planes. As a result, even in a situation where the number of divisions of the object 10 originally distributed by the server is not the desired number of divisions, the data reproduction device 100 can acquire the divided streams corresponding to the desired number of divisions by requesting the desired number of divisions. As a result, the data reproduction device 100 can implement viewing direction adaptive distribution with the desired number of divisions.

Although the preferred embodiments of the present disclosure have been described above in detail with reference to the appended drawings, the present technology is not limited to such examples. It will be apparent to those skilled in the art to which the present disclosure pertains that various modifications or alterations can be conceived within the scope of the technical idea described in the claims and it is naturally understood that these modifications or alterations fall within the technical scope of the present disclosure.

For example, in the embodiments, the V-PCC stream has been described as an example, but the generation of the identification region map and the viewing direction adaptive distribution (acquisition) using the same are not limited to the V-PCC stream, and any method can be adapted as long as the divided stream is distributed by dividing the object according to the orientation of the normal vector similarly to the V-PCC. For example, the generation of the identification region map and the viewing direction adaptive distribution using the same of the present disclosure may be applied to geometry-based PCC.

In addition, all or some of the processings described for the data reproduction device 100 may be implemented by causing a processor such as a CPU included in the data reproduction device 100 to execute a program corresponding to each processing. For example, the program corresponding to each processing in the above description may be stored in a memory, and the program may be read from the memory and executed by the processor. Furthermore, the program may be stored in a program server connected to the data reproduction device 100 via an arbitrary network, and may be downloaded from the program server to the data reproduction device 100 and executed. Furthermore, the program may be stored in a recording medium readable by the data reproduction device 100, read from the recording medium, and executed. Examples of the recording medium readable by the data reproduction device 100 include portable storage media such as a memory card, a USB memory, an SD card, a flexible disk, a magneto-optical disk, a CD-ROM, a DVD, and a Blu-ray (registered trademark) disk. In addition, the program is a data processing method described in an arbitrary language or by an arbitrary description method, and may be in any format such as a source code or a binary code. In addition, the program is not necessarily limited to a single program, and includes a program configured in a distributed manner as a plurality of modules or a plurality of libraries, and a program that achieves a function thereof in cooperation with a separate program represented by an operating system (OS).

Furthermore, the effects described in the present specification are merely illustrative or exemplary and are not restrictive. That is, the technology according to the present disclosure can exhibit, in addition to or in place of the above-described effects, other effects obvious to those skilled in the art from the description of the present specification.

Furthermore, the technology of the disclosure can also adopt the following configurations.

REFERENCE SIGNS LIST

10 OBJECT
100 DATA REPRODUCTION DEVICE
101 CONTROL UNIT
102 REPRODUCTION PROCESSING UNIT
110 ACQUISITION UNIT
111 GENERATION UNIT
112 DISPLAY CONTROL UNIT
113 DATA ANALYSIS/DECODING UNIT
114 DISPLAY UNIT
120 DECODING UNIT
121 DISPLAY INFORMATION GENERATION UNIT

The invention claimed is:

1. An information processing device, comprising:
a central processing unit (CPU) configured to generate, in a video-based point cloud compression, a first identification region map with a tangential plane as a boundary for each projection plane on which an object is projected, wherein
the first identification region map indicates:
whether each divided object data is visible from each position in a three-dimensional space, and
a region where viewing of divided object data projected on the projection plane is not necessary,
the generation of the first identification region map is based on information regarding orientation of a normal vector dividing an object in the three-dimensional space and information regarding an outline of the object,
the information regarding the outline of the object is sphere information regarding a sphere containing the object in the three-dimensional space,
the tangential plane is associated with the sphere indicated by the sphere information, and
the tangential plane is orthogonal to a boundary vector serving as a reference for which the projection plane and a region of a surface of the object is to be projected.

2. The information processing device according to claim 1, wherein
the CPU is further configured to generate, for each projection plane, a second identification region map in which, on an opposite side of the sphere indicated by the sphere information from the projection plane, view of the divided object data of the projection plane is unnecessary in a region on an opposite side of each tangential plane of the sphere,
each of the tangential plane of the sphere is orthogonal to each boundary vector, and
each of the boundary vector serves as a reference for projection on the projection plane from the projection plane.

3. The information processing device according to claim 1, wherein
the CPU is further configured to select and acquire divided object data of each projection plane based on the first identification region map generated, and
each of the plane is based on a viewing position in the three-dimensional space.

4. The information processing device according to claim 3, wherein
the CPU is further configured to generate a third identification region map including a switching region for suppression of an influence of switching of divided object data based on a change of the viewing position on image quality.

5. The information processing device according to claim 4, wherein
the CPU is further configured to acquire divided object data that does not need to be viewed,
in a case where divided object data that does not need to be viewed in a first region of the third identification region map needs to be viewed in a second region adjacent to the first region, the CPU is further configured to generate a fourth identification region map in which a switching margin region is the switching region on a side of the first region that is adjacent to the second region, and
the switching margin region includes the acquired divided object data that does not need to be viewed.

6. The information processing device according to claim 4, wherein
the CPU is further configured to:
acquire divided object data of all the projection planes, and
generate a fourth identification region map in which a full acquisition region is the switching region, and
the full acquisition region includes the acquired divided object data of all the projection planes.

7. The information processing device according to claim 4, wherein
the CPU is further configured to generate a fourth identification region map based on adjustment of a size and a shape of the switching region, and
the adjustment of the size and the shape of the switching region is based on according to variation of the viewing position.

8. The information processing device according to claim 3, wherein
in a case where viewing of a plurality of pieces of divided object data that do not need to be viewed becomes necessary due to movement of the viewing position, the CPU is further configured to acquire the pieces of divided object data in order of necessity of viewing caused by the movement of the viewing position.

9. The information processing device according to claim 3, wherein the CPU is further configured to:
transmit a change request designating a number and arrangement of the projection planes to a server that distributes the divided object data, and
acquire the divided object data of the projection plane on which the object is projected based on the designated number and arrangement of the projection planes.

10. An information processing method, comprising:
generating, by a central processing unit (CPU), in a video-based point cloud compression, an identification region map with a tangential plane as a boundary for each projection plane on which an object is projected, wherein
the identification region map indicates:
whether each divided object data is visible from each position in a three-dimensional space, and
a region where viewing of divided object data projected on the projection plane is not necessary,
the generation of the identification region map is based on information regarding orientation of a normal vector dividing an object in the three-dimensional space and information regarding an outline of the object,
the information regarding the outline of the object is sphere information regarding a sphere containing the object in the three-dimensional space,
the tangential plane is associated with the sphere indicated by the sphere information, and
the tangential plane is orthogonal to a boundary vector serving as a reference for which the projection plane and a region of a surface of the object is to be projected.

11. A non-transitory computer-readable medium having stored thereon, computer-executable instructions which, when executed by a processor, cause the processor to execute operations, the operations comprising:
generating, in a video-based point cloud compression, an identification region map with a tangential plane as a boundary for each projection plane on which an object is projected, wherein
the identification region map indicates:
whether each divided object data is visible from each position in a three-dimensional space, and
a region where viewing of divided object data projected on the projection plane is not necessary,
the generation of the identification region map is based on information regarding orientation of a normal vector dividing an object in the three-dimensional space and information regarding an outline of the object,
the information regarding the outline of the object is sphere information regarding a sphere containing the object in the three-dimensional space,
the tangential plane is associated with the sphere indicated by the sphere information, and
the tangential plane is orthogonal to a boundary vector serving as a reference for which the projection plane and a region of a surface of the object is to be projected.

* * * * *